United States Patent
Delfeld et al.

(10) Patent No.: US 10,063,295 B2
(45) Date of Patent: Aug. 28, 2018

(54) TOMLINSON-HARASHIMA PRECODING IN AN OTFS COMMUNICATION SYSTEM

(71) Applicant: Cohere Technologies, Inc., Santa Clara, CA (US)

(72) Inventors: Jim Delfeld, Santa Clara, CA (US); Shlomo Selim Rakib, Santa Clara, CA (US)

(73) Assignee: COHERE TECHNOLOGIES, INC.

(*) Notice: Subject to any disclaimer, the term of this patent is extended or adjusted under 35 U.S.C. 154(b) by 0 days.

(21) Appl. No.: 15/478,174

(22) Filed: Apr. 3, 2017

(65) Prior Publication Data
US 2017/0288710 A1 Oct. 5, 2017

Related U.S. Application Data

(60) Provisional application No. 62/317,489, filed on Apr. 1, 2016.

(51) Int. Cl.
*H04B 1/04* (2006.01)
*H04B 7/0456* (2017.01)
(Continued)

(52) U.S. Cl.
CPC ......... *H04B 7/0456* (2013.01); *H04L 5/0048* (2013.01); *H04L 25/0222* (2013.01); *H04L 27/265* (2013.01)

(58) Field of Classification Search
CPC ...... H04B 1/04; H04B 7/0452; H04B 7/0456; H04B 27/26; H04B 25/02; H04B 5/00
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| EP | 1432168 A1 | 6/2004 |
| JP | 2011-127910 | 6/2011 |

(Continued)

OTHER PUBLICATIONS

Office Action for U.S. Appl. No. 13/117,119, dated Aug. 5, 2013, 5 pages.

(Continued)

*Primary Examiner* — David S Huang
(74) *Attorney, Agent, or Firm* — Cooley LLP

(57) ABSTRACT

A method for signal transmission using precoded symbol information involves estimating a two-dimensional model of a communication channel in a delay-Doppler domain. A perturbation vector is determined in a delay-time domain wherein the delay-time domain is related to the delay-Doppler domain by an FFT operation. User symbols are modified based upon the perturbation vector so as to produce perturbed user symbols. A set of Tomlinson-Harashima precoders corresponding to a set of fixed times in the delay-time domain may then be determined using a delay-time model of the communication channel. Precoded user symbols are generated by applying the Tomlinson-Harashima precoders to the perturbed user symbols. A modulated signal is then generated based upon the precoded user symbols and provided for transmission over the communication channel.

10 Claims, 44 Drawing Sheets

(51) Int. Cl.
*H04L 25/02* (2006.01)
*H04L 5/00* (2006.01)
*H04L 27/26* (2006.01)

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 7,327,812 B2 | 2/2008 | Auer |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2004/0044715 A1 | 3/2004 | Aldroubi et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0253465 A1 | 11/2007 | Muharemovic et al. |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286498 A1* | 11/2011 | Abrishamkar ...... H04L 25/0234 375/148 |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0320994 A1 | 12/2012 | Loghin et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0128932 A1* | 5/2013 | Huang ............... H04L 5/0048 375/219 |
| 2013/0230010 A1 | 9/2013 | Kim et al. |
| 2013/0260787 A1 | 10/2013 | Hashimoto |
| 2013/0279627 A1 | 10/2013 | Wu et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |

(56) References Cited

U.S. PATENT DOCUMENTS

| | | | |
|---|---|---|---|
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |

FOREIGN PATENT DOCUMENTS

| | | |
|---|---|---|
| WO | WO 2007/004297 | 1/2007 |
| WO | WO 2011/137699 | 11/2011 |
| WO | WO 2011/150315 | 12/2011 |
| WO | WO 2013/148546 | 10/2013 |
| WO | WO 2014/004585 | 1/2014 |
| WO | WO 2016/014596 | 1/2016 |
| WO | WO 2016/014598 | 1/2016 |
| WO | WO 2016/176642 | 11/2016 |
| WO | WO 2016/183230 | 11/2016 |
| WO | WO 2016/183240 | 11/2016 |
| WO | WO 2016/209848 | 12/2016 |
| WO | WO 2017/003952 | 1/2017 |
| WO | WO 2017/011478 | 1/2017 |

OTHER PUBLICATIONS

Notice of Allowance for U.S. Appl. No. 13/117,119, dated Feb. 28, 2014, 13 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Examination Report No. 1 for Australian Application No. 2013280487, dated May 2, 2016, 3 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Office Action for Japanese Application No. 2015-518647, dated Jul. 7, 2015, 10 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Office Action for U.S. Appl. No. 14/754,596, dated Apr. 19, 2016, 18 pages.
Office Action for U.S. Appl. No. 14/809,129, dated Jul. 19, 2016, 5 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
International Search Report and Written Opinion for International Application No. PCT/US2016/030259, dated Aug. 4, 2016, 13 pages.
International Search Report and Written Opinion for International Application No. PCT/US2016/031928, dated Oct. 7, 2016, 10 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
International Search Report and Written Opinion for International Application No. PCT/US2016/039662, dated Nov. 29, 2016, 14 pages.
International Search Report and Written Opinion for International Application No. PCT/US2016/041940, dated Oct. 20, 2016, 8 pages.
Patent Examination Report No. 1 for Australian Application No. 2013239970, dated Dec. 8, 2015, 3 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.

(56) References Cited

OTHER PUBLICATIONS

Catt, "UL ACK/NACK transmission methods for LTE-A," 3GPP TSG RAN WG1 Meeting #60bis, R1-102453, Beijing, China, Apr. 12-16, 2010, 8 pages.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 15 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

Rusek, F. et al., "Scaling Up MIMO, Opportunities and Challenges with Very Large Arrays," IEEE Signal Processing Magazine, pp. 40-60 (2013).

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Vodafone, "Cellular Internet of Things: Architectural Aspects," RP-150869, 3GPP RAN#68, Malmo, Sweden (Jun. 9, 2015), 19 pages.

Office Action for U.S. Appl. No. 14/605,957, dated Jun. 22, 2017, 6 pages.

International Search Report and Written Opinion for International Application No. PCT/US2017/025797, dated Jun. 21, 2017, 6 pages.

Office Action for U.S. Appl. No. 15/152,464, dated Apr. 6, 2017, 10 pages.

Office Action for U.S. Appl. No. 15/188,946, dated May 8, 2017, 14 pages.

Office Action for U.S. Appl. No. 15/194,494, dated May 5, 2017, 16 pages.

Office Action for U.S. Appl. No. 15/436,653, dated Jun. 2, 2017, 10 pages.

\* cited by examiner

Trajectory of Time Varying
Impulse Response for Accelerating Reflector

"Levels of Abstraction: Signaling over the (i) actual channel with a signaling waveform (ii) the time-frequency Domain (iii) the delay-Doppler Domain Notation Used to Denote Signals at Various Stages of Transmitter and Receiver Conceptual Implementation of the Heisenberg Transform in the Transmitter and the Wigner Transform in the Receiver Discrete Impulse in the OTFS Domain Used for Channel Estimation Multiplexing Three Users in the Time-Frequency Domain with Interleaving $$\frac{\text{SNR}_{\text{ZFP}}}{\text{SNR}_{\text{DFE}}} = -0.54\,\text{dB}$$

$$\frac{\text{SNR}_{\text{ZFP}}}{\text{SNR}_{\text{DFE}}} = -6.0\,\text{dB}$$

$$\frac{SNR_{ZFP}}{SNR_{DFE}} = -9.6 \, dB$$

TOMLINSON-HARASHIMA PRECODING IN AN OTFS COMMUNICATION SYSTEM

CROSS-REFERENCE TO RELATED APPLICATIONS

The present application claims the benefit of priority under 35 U.S.C. § 119(e) of U.S. Provisional Application No. 62/317,489, entitled SYSTEM AND METHOD FOR IMPROVING OFDM COMMUNICATION SYSTEMS USING OTFS CHANNEL ESTIMATES, filed Apr. 1, 2016, the content of which is hereby incorporated by reference in its entirety for all purposes.

FIELD

This disclosure generally relates to communication systems and, more particularly, to systems and methods for Tomlinson-Harashima precoding point-to-multipoint and other communication systems.

BACKGROUND

There has recently been considerable investment made in the development of high-rate wireless transmission systems. This has involved the development of multiple-input/multiple output (MIMO) systems in which information symbols are transmitted over parallel data streams. The constituent streams may be associated with a single user or may belong to multiple, independent users.

One challenge in transmitting information over MIMO channels lies in the separation or equalization of the parallel data streams. One approach to such equalization involves employing a decision feedback equalizer (DFE) on the receiver side of the communication channel. However, the use of a DFE within a receiver may be computationally costly and give rise to error propagation.

SUMMARY

The disclosure is directed to a method for signal transmission using precoded symbol information. The method includes estimating a two-dimensional model of a communication channel in a delay-Doppler domain wherein the two-dimensional model of the communication channel is a function of time delay and frequency shift. A perturbation vector is determined in a delay-time domain wherein the delay-time domain is related to the delay-Doppler domain by an FFT operation. The method further includes modifying user symbols based upon the perturbation vector so as to produce perturbed user symbols. A set of Tomlinson-Harashima precoders corresponding to a set of fixed times in the delay-time domain may then be determined using a delay-time model of the communication channel. The method also includes generating precoded user symbols by applying the Tomlinson-Harashima precoders to the perturbed user symbols. A modulated signal is then generated based upon the precoded user symbols and provided for transmission over the communication channel.

In one implementation the Tomlinson-Harashima precoders are applied to the perturbed user symbols using FFT operations. The Tomlinson-Harashima precoders may be determined at least in part by performing a decomposition of the delay-time model of the communication channel. This decomposition may be an LQD decomposition where L is a lower triangular matrix, D is a diagonal matrix, and Q is a unitary matrix.

The disclosure also pertains to a communication apparatus including a plurality of antennas and a processor. The processor is configured to estimate a two-dimensional model of a communication channel in a delay-Doppler domain wherein the two-dimensional model of the communication channel is a function of time delay and frequency shift. The process is further configured to determine a perturbation vector in a delay-time domain wherein the delay-time domain is related to the delay-Doppler domain by an FFT operation. User symbols may then be modified by the processor based upon the perturbation vector so as to produce perturbed user symbols. A set of Tomlinson-Harashima precoders corresponding to a set of fixed times in the delay-time domain may then be determined by the processor using a delay-time model of the communication channel. The processor is further configured to generate precoded user symbols by applying the Tomlinson-Harashima precoders to the perturbed user symbols. The communication apparatus further includes a transmitter configured to provide, based upon the precoded user symbols, a modulated signal to the plurality of antennas for transmission over the communication channel.

In another aspect the disclosure relates to a communication device including an antenna and a receiver configured to receive, from the antenna, signals representative of data that has been two-dimensionally spread and transmitted over a communication channel. The receiver processes the signals to determine equalization coefficients based upon a two-dimensional time-frequency impulse response of the communication channel. The receiver also performs a two-dimensional signal equalization procedure using the equalization coefficients.

In a further aspect the disclosure relates to a method of receiving communication signals. The method includes receiving signals representative of data that has been two-dimensionally spread and transmitted over a communication channel. The method further includes processing the signals to determine equalization coefficients based upon a two-dimensional time-frequency impulse response of the communication channel. A two-dimensional signal equalization procedure is then performed using the equalization coefficients.

BRIEF DESCRIPTION OF THE DRAWINGS

For a better understanding of the nature and objects of various embodiments of the invention, reference should be made to the following detailed description taken in conjunction with the accompanying drawings, wherein.

DETAILED DESCRIPTION

As is discussed below, embodiments of orthogonal time frequency space (OTFS) modulation involve transmitting each information symbol by modulating a two-dimensional (2D) basis function on the time-frequency plane. In exemplary embodiments the modulation basis function set is specifically derived to best represent the dynamics of the time varying multipath channel. In this way OTFS transforms the time-varying multipath channel into a time invariant delay-Doppler two dimensional convolution channel. This effectively eliminates the difficulties in tracking time-varying fading in, for example, communications involving high speed vehicles.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-Doppler channel representation is very compact, OTFS enables massive MIMO and beamforming with CSI at the transmitter for four, eight, and more antennas in moving vehicle applications. The CSI information needed in OTFS is a fraction of what is needed to track a time varying channel.

As will be appreciated from the discussion below, one characteristic of OTFS is that a single QAM symbol may be spread over multiple time and/or frequency points. This is a key technique to increase processing gain and in building penetration capabilities for IoT deployment and PSTN replacement applications. Spreading in the OTFS domain allows spreading over wider bandwidth and time durations while maintaining a stationary channel that does not need to be tracked over time.

These benefits of OTFS will become apparent once the basic concepts behind OTFS are understood. There is a rich mathematical foundation of OTFS that leads to several variations; for example it can be combined with OFDM or with multicarrier filter banks. Prior to proceeding to a detailed discussion of OTFS, various drawbacks of communication systems predicated on one-dimensional channel models are first described.

Figure 1A:
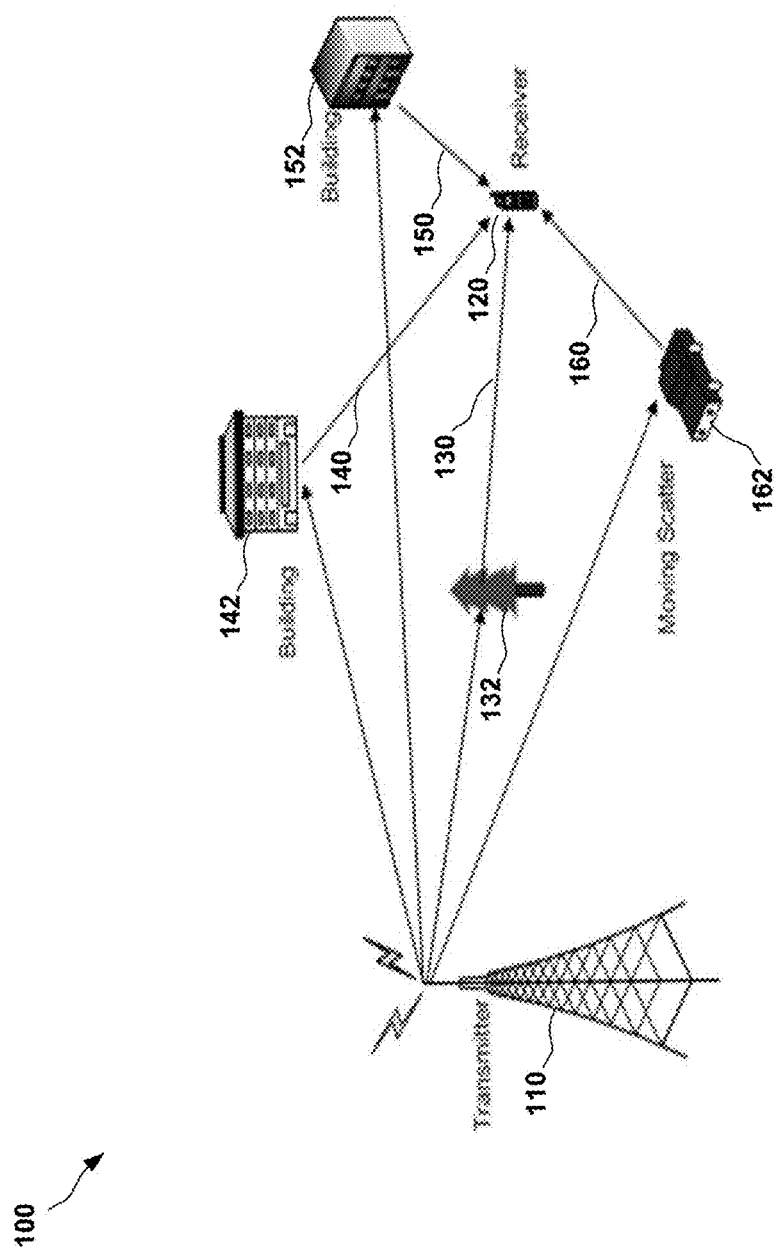
FIG. 1A illustrates an example of a wireless communication system that may exhibit time/frequency selective fading.

FIG. 1A illustrates an example of a wireless communication system 100 that may exhibit time/frequency selective fading. The system 100 includes a transmitter 110 (e.g., a cell phone tower) and a receiver 120 (e.g., a cell phone). The scenario illustrated in FIG. 1 includes multiple pathways (multi-path) that the signal transmitted from the transmitter 100 travels through before arriving at the receiver 100. A first pathway 130 reflects through a tree 132, second pathway 140 reflects off of a building 142 and a third pathway 150 reflects off of a second building 152. A fourth pathway 160 reflects off of a moving car 162. Because each of the pathways 130, 140, 150 and 160 travels a different distance, and is attenuated or faded at a different level and at a different frequency, when conventionally configured the receiver 120 may drop a call or at least suffer low throughput due to destructive interference of the multi-path signals.

Figure 1B:
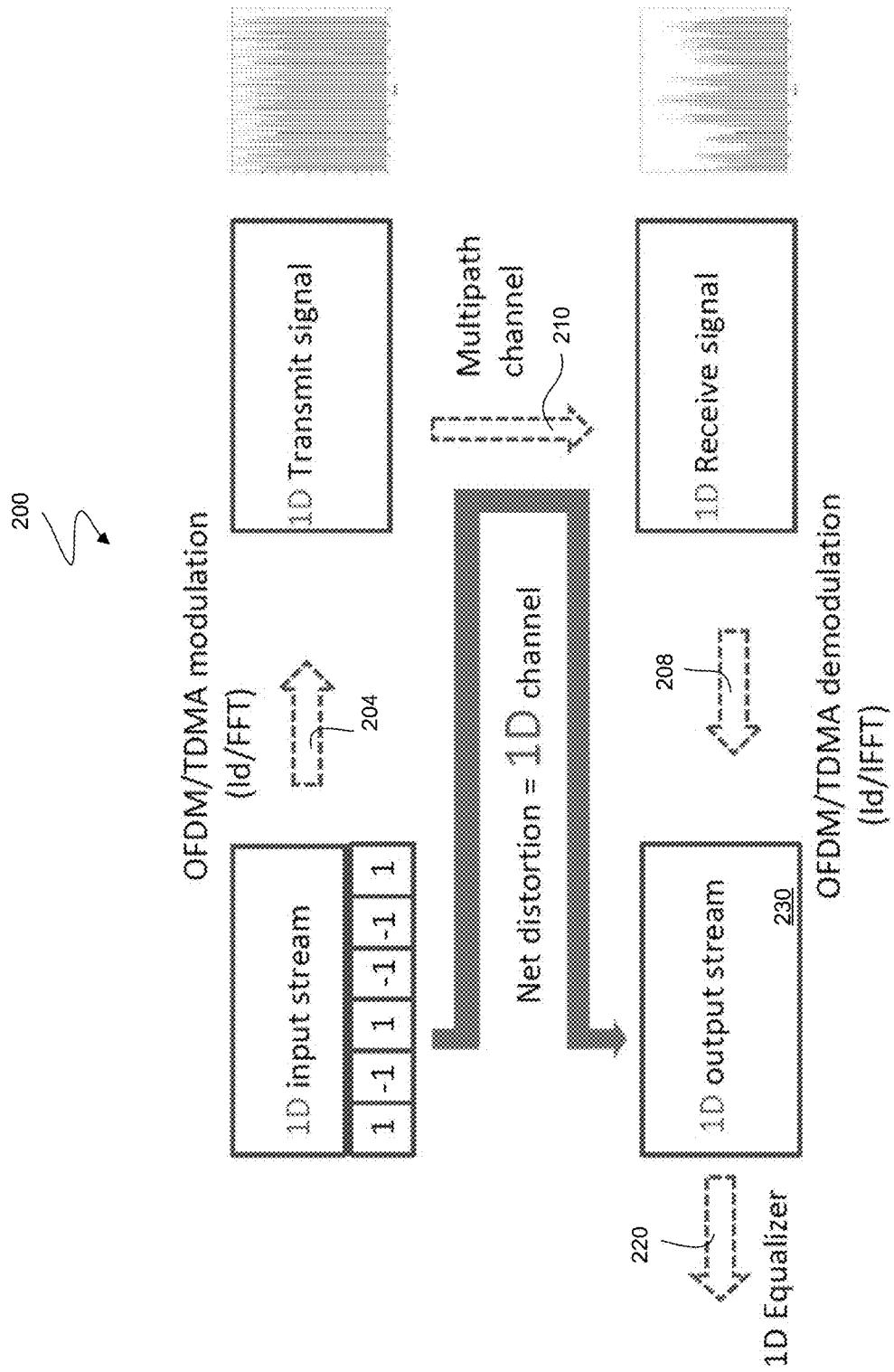
FIG. 1B provides a high-level representation of a conventional transceiver which could be utilized in the wireless communication system of FIG. 1A.

Turning now to FIG. 1B, a high-level representation is provided of a conventional transceiver 200 which could be utilized in the wireless communication system 100 of FIG. 1A. The transceiver 200 could, for example, operate in accordance with established protocols for time-division multiple access (TDMA), code-division multiple access (CDMA) or orthogonal frequency-division multiple access (OFDM) systems. In conventional wireless communication systems such as TDMA, CDMA, and OFDM systems, the multipath communication channel 210 between a transmitter 204 and a receiver 208 is represented by a one-dimensional model. In these systems channel distortion is characterized using a one-dimensional representation of the impulse response of the communication channel. The transceiver 200 may include a one-dimensional equalizer 220 configured to at least partially remove this estimated channel distortion from the one-dimensional output data stream 230 produced by the receiver 208.

Unfortunately, use of a one-dimensional channel model presents a number of fundamental problems. First, the one-dimensional channel models employed in existing communication systems are non-stationary; that is, the symbol-distorting influence of the communication channel changes from symbol to symbol. In addition, when a channel is modeled in only one dimension it is likely and possible that certain received symbols will be significantly lower in energy than others due to "channel fading". Finally, one-dimensional channel state information (CSI) appears random and much of it is estimated by interpolating between channel measurements taken at specific points, thus rendering the information inherently inaccurate. These problems are only exacerbated in multi-antenna (MIMO) communication systems. As is discussed below, embodiments of the OTFS method described herein can be used to substantially overcome the fundamental problems arising from use of a one-dimensional channel model.

The multipath fading channel is commonly modeled one-dimensionally in the baseband as a convolution channel with a time varying impulse response $$r(t) = \int h(\tau,t)s(t-\tau)d\tau \tag{1}$$

where s(t) and r(t) represent the complex baseband channel input and output respectively and where $h(\tau,t)$ is the complex baseband time varying channel response.

This representation, while general, does not give us insight into the behavior and variations of the time varying impulse response. A more useful and insightful model, which is also commonly used for Doppler multipath doubly fading channels is $$r(t) = \iint h(\tau,v)e^{j2\pi v(t-\tau)}s(t-\tau)dvd\tau \tag{2}$$

In this representation, the received signal is a superposition of reflected copies of the transmitted signal, where each copy is delayed by the path delay $\tau$, frequency shifted by the Doppler shift v and weighted by the time-independent delay-Doppler impulse response $h(\tau,v)$ for that $\tau$ and v. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$h(\tau,t) = \int h(\tau,v)e^{j2\pi vt}dt \tag{3}$$

Figure 2A:
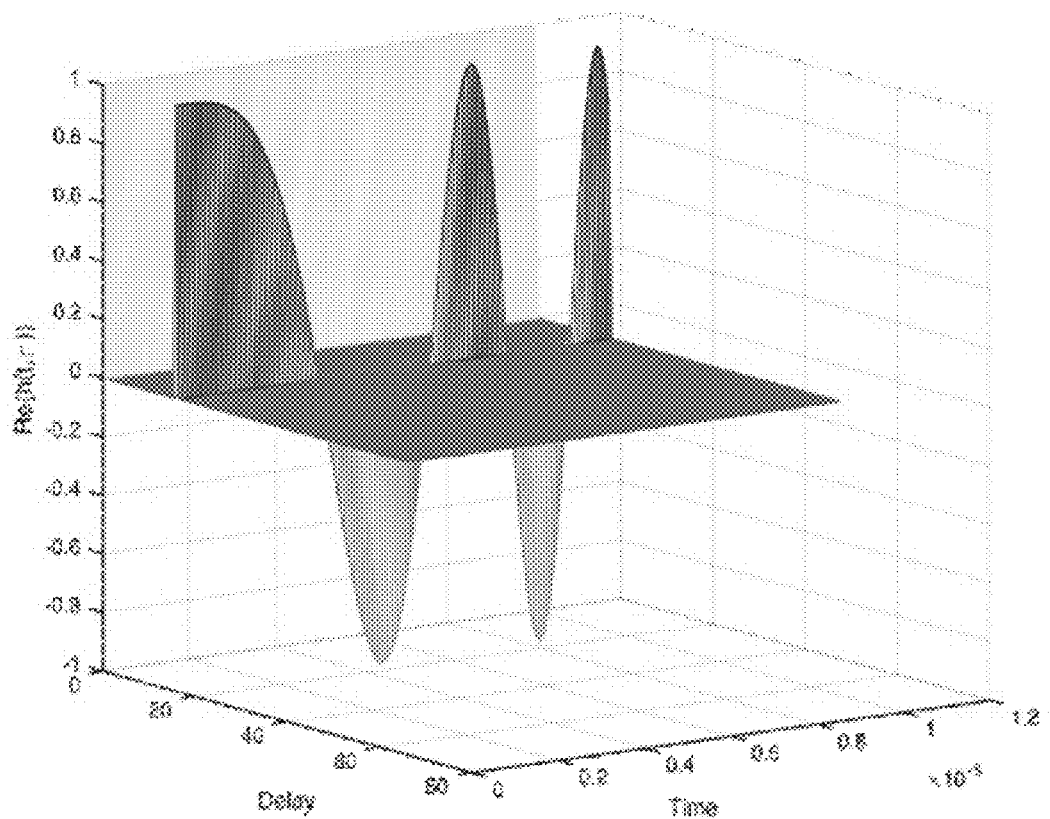
FIG. 2A shows the time-varying impulse response for an accelerating reflector in a channel represented by a one-dimensional channel model in a ($\tau$,t) coordinate system.
Figure 2B:
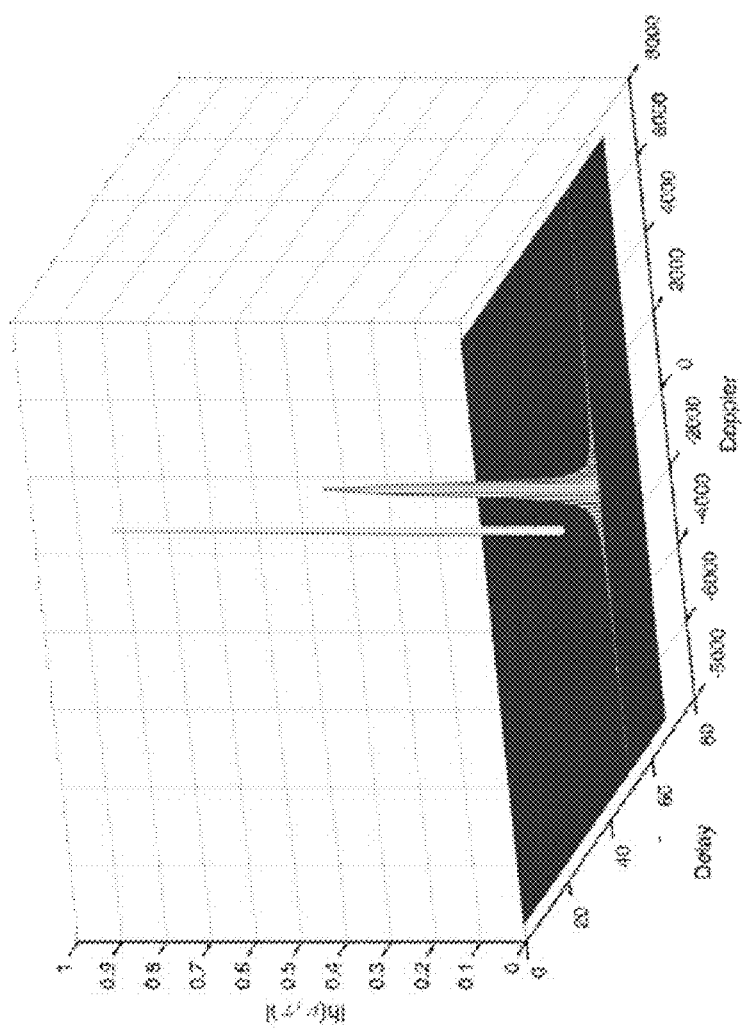
FIG. 2B shows the same channel represented using a time invariant impulse response in a delay-Doppler ($\tau$,v) coordinate system.

Substituting (3) in (1) we obtain Eq. (2) after some manipulation. As an example, FIG. 2A shows the time-varying impulse response for an accelerating reflector in the $(\tau,t)$ coordinate system, while FIG. 2B shows the same channel represented as a time invariant impulse response in the $(\tau,v)$ coordinate system.

An important feature revealed by these two figures is how compact the $(\tau,v)$ representation is compared to the $(\tau,t)$ representation. This has important implications for channel estimation, equalization and tracking as will be discussed later.

Notice that while $h(\tau,v)$ is, in fact, time-independent, the operation on s(t) is still time varying, as can be seen by the effect of the explicit complex exponential function of time in Eq. (2). In implementation the disclosed modulation scheme contemplates an appropriate choice of orthogonal basis functions that render the effects of this channel to become truly time-independent in the domain defined by those basis functions. The proposed scheme has the following high level outline.

First, let us consider a set of orthonormal basis functions $\phi_{\tau,v}(t)$ indexed by $\tau,v$ which are orthogonal to translation and modulation, i.e., $$\phi_{\tau,v}(t-\tau_0) = \phi_{\tau+\tau_0,v}(t)$$

$$e^{j2\pi v_0 t}\phi_{\tau,v}(t) = \phi_{\tau,v-v_0}(t) \tag{4}$$

and let us consider the transmitted signal as a superposition of these basis functions $$s(t) = \iint x(\tau,v)\phi_{\tau,v}(t)d\tau dv \tag{5}$$

where the weights $x(\tau,v)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau,v)e^{j2\pi v(t-\tau)}s(t-\tau)dvd\tau \tag{6}$$

$$= \iint \phi_{\tau,v}(t)\{h(\tau,v) * x(\tau,v)\}d\tau dv$$

where * denotes two dimensional convolution. Eq. (6) can be thought of as a generalization of the convolution relationship for linear time invariant systems, using one dimensional exponentials as basis functions. Notice that the term in brackets can be recovered at the receiver by matched filtering against each basis function $\phi_{\tau,v}(t)$. In this way a two dimensional channel relationship is established in the $(\tau,v)$ domain $$y(\tau,v) = h(\tau,v) * x(\tau,v) \tag{7}$$

where $y(\tau,v)$ is the receiver two dimensional matched filter output. Notice also, that in this domain the channel is described by a time invariant two-dimensional convolution.

A final different interpretation of the wireless channel will also be useful in what follows. Let us consider s(t) and r(t) as elements of the Hilbert space of square integrable functions H. Then Eq. (2) can be interpreted as a linear operator on H acting on the input s(t), parametrized by the impulse response $h(\tau,v)$, and producing the output r(t):

$$r = \Pi_h(s): s(t) \in \mathcal{H} \xrightarrow{\Pi_h(\cdot)} r(t) \in \mathcal{H}. \qquad (8)$$

Notice that although the operator is linear, it is not time-invariant. If there is no Doppler, i.e., if $h(v,r)=h(0,\tau)\delta(v)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input s(t), (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

One important point of Eq. (8) is that the operator $\pi_h(\bullet)$ can be compactly parametrized by a two dimensional function $h(\tau,v)$, providing an efficient, time-independent description of the channel. Typical channel delay spreads and Doppler spreads are a very small fraction of the symbol duration and subcarrier spacing of multicarrier systems.

The representation of time varying systems defined by equations (2) and (8) may be characterized as a Heisenberg representation. In this regard it may be shown that every linear operator (eq. (8)) can be parameterized by some impulse response as in equation (2).

OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. We herein develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced.

Figure 3A:
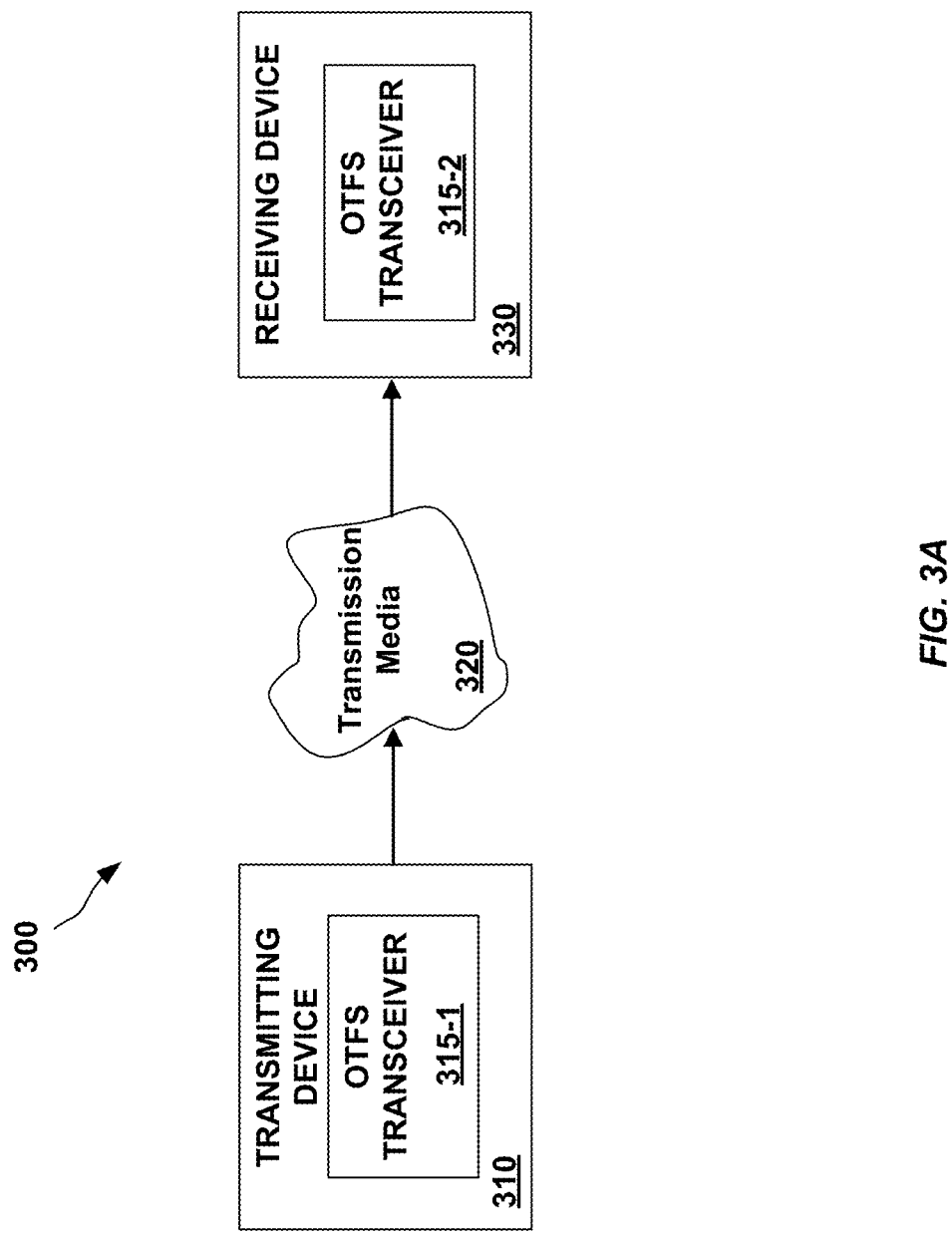
FIG. 3A is a block diagram of components of an exemplary OTFS communication system.

FIG. 3 is a block diagram of components of an exemplary OTFS communication system 300. As shown, the system 300 includes a transmitter 310 and a receiver 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein. Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Figure 3B:
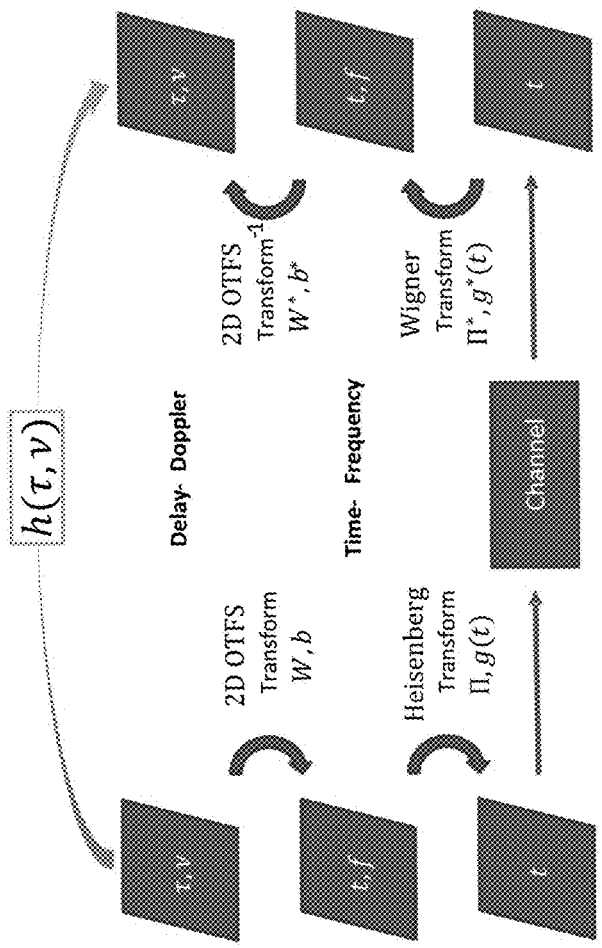
FIG. 3B provides a pictorial view of two transformations constituting an exemplary form of OTFS modulation.
Figure 3C:
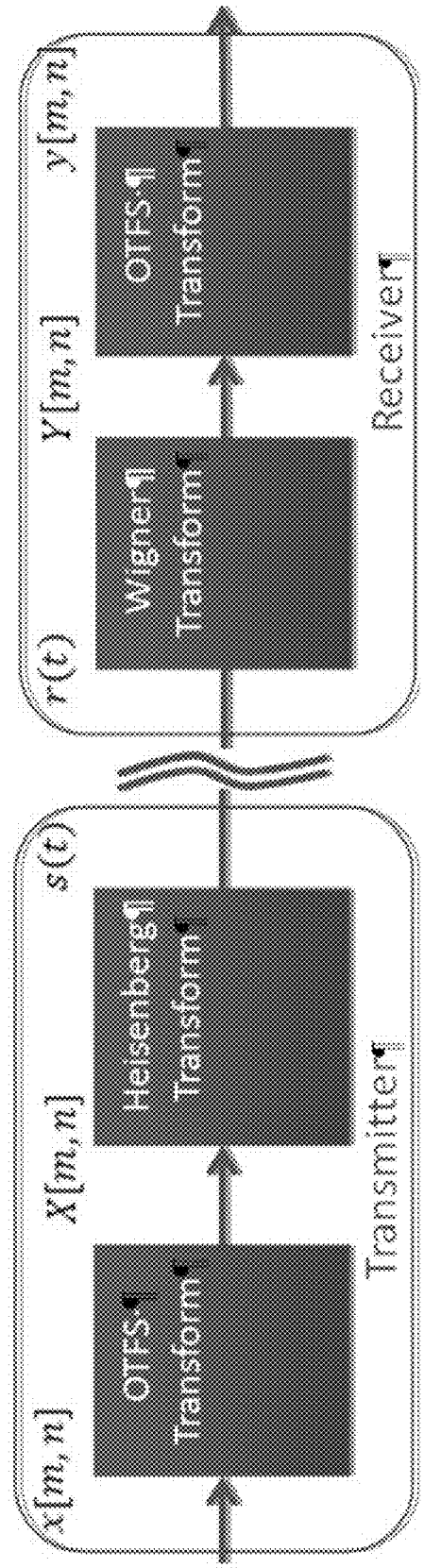
FIG. 3C shows a block diagram of different processing stages at an OTFS transmitter and an OTFS receiver.

Referring now to FIG. 3B, there is provided a pictorial view of the two transformations that constitute an exemplary form of OTFS modulation. It shows at a high level the signal processing steps that are required at a transmitter, such as the transmitter 310, and a receiver, such as the receiver 330. It also includes the parameters that define each step, which will become apparent as we further expose each step. Further, FIG. 3C shows a block diagram of the different processing stages at the transmitter and receiver and establishes the notation that will be used for the various signals.

We initially describe the transform which relates the waveform domain to the time-frequency domain.

The Heisenberg Transform

Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties: (i) the channel is orthogonalized on the time-frequency grid; and (ii) the channel time variation is simplified on the time-frequency grid and can be addressed with an additional transform. Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:

A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \qquad (9)$$

A packet burst with total duration NT sees and total bandwidth $M\Delta f$ Hz

A set of modulation symbols X[n,m], n=0, ..., N−1, m=0, ..., M−1 we wish to transmit over this burst A transmit pulse $g_{tr}(t)$ with the property of being orthogonal to translations by T and modulations by $\Delta f$ (generally required if the receiver uses the same pulse as the transmitter)

$$<g_{tr}(t), g_{tr}(t-nT)e^{j2\pi m\Delta f(t-nT)}> = \int g_{tr}^*(t)g_{tr}(t-nT)e^{j2\pi m\Delta f(t-nT)}dt \qquad (10)$$
$$= \delta(m)\delta(n)$$

Given the above components, the time-frequency modulator is a Heisenberg operator on the lattice Λ, that is, it maps the two dimensional symbols X[n,m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n,m]g_{tr}(t-nT)e^{j2\pi m\Delta f(t-nT)} \quad (11)$$

More formally $$X = \Pi_x(g_{tr}): \; g_{tr}(t) \in \mathcal{H} \xrightarrow{\Pi_X(\cdot)} y(t) \in \mathcal{H} \quad (12)$$

where we denote by $\pi_X(\cdot)$ the "discrete" Heisenberg operator, parameterized by discrete values X[n, m].

Notice the similarity of (12) with the channel equation (8). This is not by coincidence, but rather because we apply a modulation effect that mimics the channel effect, so that the end effect of the cascade of modulation and channel is more tractable at the receiver. It is not uncommon practice; for example, linear modulation (aimed at time invariant channels) is in its simplest form a convolution of the transmit pulse g(t) with a delta train of QAM information symbols sampled at the Baud rate T.

$$s(t) = \sum_{n=0}^{N-1} X[n]g(t-nT) \quad (13)$$

In the present case, aimed at the time varying channel, we convolve-and-modulate the transmit pulse (c.f. the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$; namely, its time-frequency localization. In order for the orthogonality condition of (10) to hold for a frequency spacing Δf, the time spacing must be T≥1/Δf. The critical sampling case of T=1/Δf is generally not practical and refers to limiting cases, for example to OFDM systems with cyclic prefix length equal to zero or to filter banks with $g_{tr}(t)$ equal to the ideal Nyquist pulse.

Some examples illustrate these principles:

Example 1: OFDM Modulation

Let us consider an OFDM system with M subcarriers, symbol length $T_{OFDM}$, cyclic prefix length $T_{CP}$ and subcarrier spacing $1/T_{OFDM}$. If we substitute in Equation (11) symbol duration $T=T_{OFDM}+T_{CP}$, number of symbols N=1, subcarrier spacing $\Delta f=1/T_{OFDM}$ and $g_{tr}(t)$ a square window that limits the duration of the subcarriers to the symbol length T $$g_{tr}(t) = \begin{cases} 1/\sqrt{T-T_{CP}}, & -T_{CP} < t < T - T_{CP} \\ 0, & \text{else} \end{cases} \quad (14)$$

then we obtain the OFDM formula $$x(t) = \sum_{m=-M/2}^{M/2-1} X[n,m]g_{tr}(t)e^{j2\pi m\Delta f t} \quad (15)$$

Technically, the pulse of Eq. (14) is not orthonormal but is orthogonal to the receive filter (where the CP samples are discarded).

Example 2: Single Carrier Modulation

Equation (11) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB)

Equation (11) describes a MCFB if $g_{tr}(t)$ is a square root raised cosine Nyquist pulse with excess bandwidth α, T is equal to the Baud period and $\Delta f=(1+\alpha)/T$.

Expressing the modulation operation as a Heisenberg transform as in Eq. (12) may be counterintuitive. That is, modulation is usually perceived as a transformation of the modulation symbols X[m,n] to a transmit waveform s(t). The Heisenberg transform instead, uses X[m,n] as weights/parameters of an operator that produces s(t) when applied to the prototype transmit filter response $g_{tr}(t)$—c.f. Eq. (12). While counterintuitive, this formulation is useful in pursuing an abstraction of the modulation-channel-demodulation cascade effects in a two dimensional domain where the channel can be described as time invariant.

Attention is turned next to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1:

Let two Heisenberg transforms as defined by Eqs. (8), (2) be parametrized by impulse responses $h_1(\tau,v)$, $h_2(\tau,v)$ and be applied in cascade to a waveform $g(t) \in \mathcal{H}$. Then $$\pi_{h_2}(\pi_{h_1}(g(t))) = \pi_h(g(t)) \quad (16)$$

where $h(\tau,v) = h_2(\tau,v) \odot h_1(\tau,v)$ is the "twisted" convolution of $h_1(\tau,v)$, $h_2(\tau,v)$ defined by the following convolve-and-modulate operation $$h(\tau,v) = \iint h_2(\tau',v')h_1(\tau-\tau',v-v')e^{j2\pi v'(\tau-\tau')}d\tau'dv' \quad (17)$$

Applying the above result to the cascade of the modulation and channel Heisenberg transforms of (12) and (8), one can show that the received signal is given by the Heisenberg transform $$r(t) = \pi_f(g_{tr}(t)) + v(t) = \iint f(\tau,v)e^{j2\pi v(t-\tau)}g_{tr}(t-\tau)dv d\tau + v(t) \quad (18)$$

where v(t) is additive noise and f(τ,v), the impulse response of the combined transform, is given by the twisted convolution of X[n,m] and h(τ,v)

$$f(\tau, v) = h(\tau, v) \odot X[n, m] = \quad (19)$$

$$\sum_{m=-M/2}^{M/2-1} \sum_{n=0}^{N-1} X[n,m]h(\tau-nT, v-m\Delta f)e^{j2\pi(v-m\Delta f)nT}$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine exemplary receiver processing steps.

Receiver Processing and the Wigner Transform

Typical communication system design generally requires that the receiver perform a matched filtering operation, taking the inner product of the received waveform with the transmitter pulse, appropriately delayed or otherwise distorted by the channel. In the present case, we have used a collection of delayed and modulated transmit pulses, and a matched filtering operation is typically performed with respect to each one of them.

Figure 4:
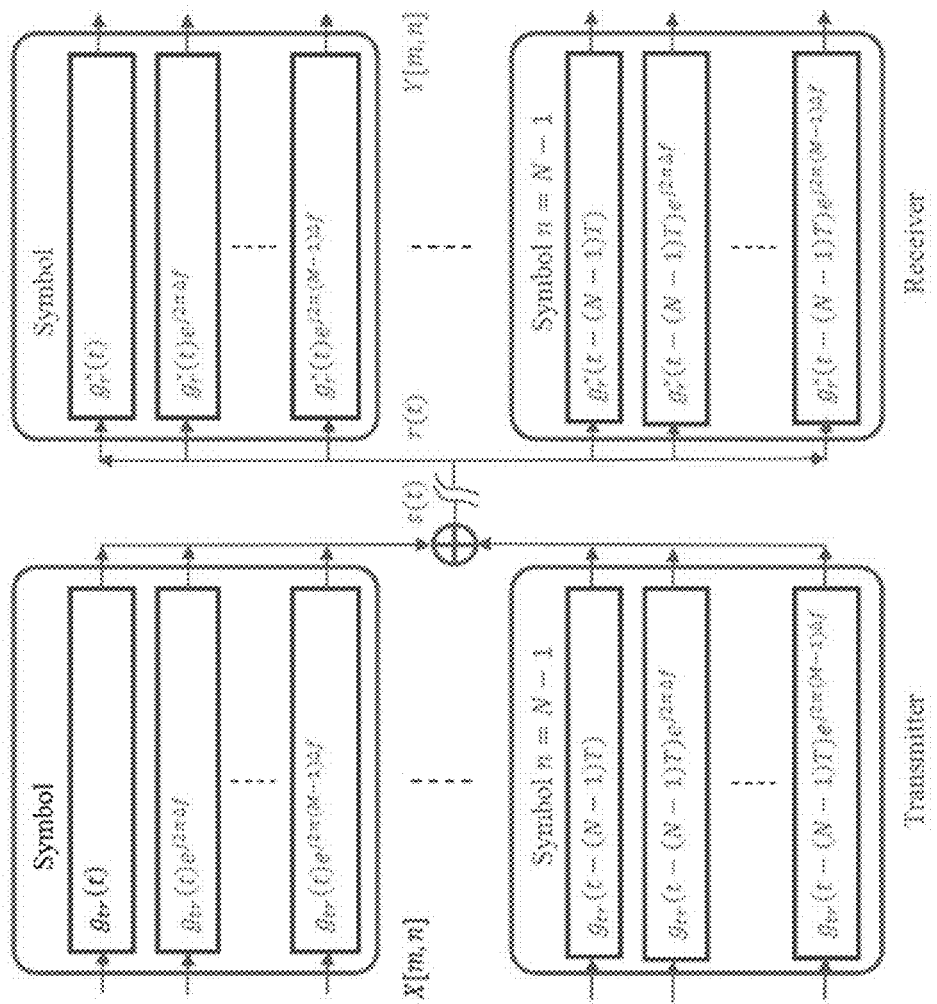
FIG. 4 represents a conceptual implementation of a Heisenberg transform in an OTFS transmitter and a Wigner transform in an OTFS receiver.

FIG. 4 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

In actual embodiments of an OTFS receiver, this matched filtering may be implemented in the digital domain using an FFT or a polyphase transform for OFDM and MCFB respectively. However, for purposes of the present discussion, we will consider a generalization of this matched filtering by taking the inner product $<g_r(t-\tau)e^{j2\pi v(t-\tau)}, r(t)>$ of the received waveform with the delayed and modulated versions of the receiver pulse for arbitrary time and frequency offset $(\tau,v)$. While likely not necessarily a practical implementation, it allows us to view the operations of FIG. 4 as a two dimensional sampling of this more general inner product.

Let us define the inner product $$A_{g_r,r}(\tau,v) = <g_r(t-\tau)e^{j2\pi v(t-\tau)}, r(t)> = \int g_r^*(t-\tau)e^{-j2\pi v(t-\tau)} r(t) dt \quad (20)$$

The function $A_{g_r,r}(\tau,v)$ is known as the cross-ambiguity function and yields the matched filter output if sampled at $\tau=nT$, $v=m\Delta f$ (on the lattice $\Lambda$), i.e., $$Y[n,m] = A_{g_r,r}(\tau,v)|_{\tau=nT,v=m\Delta f} \quad (21)$$

The ambiguity function is related to the inverse of the Heisenberg transform, namely the Wigner transform. FIG. 4 provides an intuitive feel for that, as the receiver appears to invert the operations of the transmitter. More formally, if we take the cross-ambiguity or the transmit and receive pulses $A_{g_r,g_{tr}}(\tau,v)$, and use it as the impulse response of the Heisenberg operator, then we obtain the orthogonal cross-projection operator $$\pi A_{g_r,g_{tr}}(y(t)) = g_{tr}(t)<g_r(t),y(t)>$$

In words, the coefficients that come out of the matched filter, if used in a Heisenberg representation, will provide the best approximation to the original y(t) in the sense of minimum square error.

One key question to be addressed is the relationship is between the matched filter output Y[n,m] (or more generally $Y(\tau,v)$) and the transmitter input X[n,m]. We have already established in (18) that the input to the matched filter r(t) can be expressed as a Heisenberg representation with impulse response $f(\tau,v)$ (plus noise). The output of the matched filter then has two contributions $$Y(\tau,v) = A_{g_r,r}(\tau,v) = A_{g_r,[\pi_f(g_{tr})+v]}(\tau,v) = A_{g_r,\pi_f(g_{tr})}(\tau,v) + A_{g_r,v}(\tau,v) \quad (22)$$

The last term is the contribution of noise, which we will denote $V(\tau,v) = A_{g_r,v}(\tau,v)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau,v)$ with the cross-ambiguity function (or two dimensional cross correlation) of the transmit and receive pulses.

The following theorem summarizes the key result.

Theorem 1:

(Fundamental time-frequency domain channel equation). If the received signal can be expressed as $$\pi_f(g_{tr}(t)) = \iint f(\tau,v)e^{j2\pi v(t-\tau)} g_{tr}(t-\tau) dv d\tau \quad (23)$$

Then the cross-ambiguity of that signal with the receive pulse $g_{tr}(t)$ can be expressed as $$A_{g_r,\pi_f(g_{tr})}(\tau,v) = f(\tau,v) \odot A_{g_r,g_{tr}}(\tau,v) \quad (24)$$

Recall from (19) that $f(\tau,v) = h(\tau,v) \odot X[n,m]$, that is, the composite impulse response is itself a twisted convolution of the channel response and the modulation symbols.

Substituting $f(\tau,v)$ from (19) into (22) we obtain the end-to-end channel description in the time frequency domain $$Y(\tau,v) = A_{g_r,\pi_f(g_{tr})}(\tau,v) + V(\tau,v) = h(\tau,v) \odot X[n,m] \odot A_{g_r,g_{tr}}(\tau,v) + V(\tau,v) \quad (25)$$

where $V(\tau,v)$ is the additive noise term. Eq. (25) provides an abstraction of the time varying channel on the time-frequency plane. It states that the matched filter output at any time and frequency point $(\tau,v)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (25) on the lattice $\Lambda$ we obtain the matched filter output modulation symbol estimates $$\hat{X}[m,n] = Y[n,m] = Y(\tau,v)|_{\tau=nT,v=m\Delta f} \quad (26)$$

In order to get more intuition on Equations (25), (26). let us first consider the case of an ideal channel, i.e., $h(\tau,v) = \delta(\tau)\delta(v)$. In this case by direct substitution we get the convolution relationship $$Y[n,m] = \sum_{m'=-M/2}^{M/2-1} \sum_{n'=0}^{N-1} X[n',m'] A_{g_r,g_{tr}}((n-n')T,(m-m')\Delta f) + V[m,n] \quad (27)$$

In order to simplify Eq. (27) we will use the orthogonality properties of the ambiguity function. Since we use a different transmit and receive pulses we will modify the orthogonality condition on the design of the transmit pulse we stated in (10) to a bi-orthogonality condition $$<g_{tr}(t),g_r(t-nT)e^{j2\pi m\Delta f(t-nT)}> = \int g_{tr}^*(t)g_r(t-nT)e^{j2\pi m\Delta f(t-nT)}dt = \delta(m)\delta(n) \quad (28)$$

Under this condition, only one term survives in (27) and we obtain $$Y[n,m]=X[n,m]+V[n,m] \quad (29)$$

where V[n,m] is the additive white noise. Eq. (29) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (29).

Theorem 2:

(End-to-end time-frequency domain channel equation):

If $h(\tau,v)$ has finite support bounded by $(\tau_{max},v_{max})$ and if $A_{g_r,g_{tr}}(\tau,v)=0$ for $\tau \in (nT-\tau_{max},nT+\tau_{max})$, $v \in (m\Delta f-v_{max}, m\Delta f+v_{max})$, that is, the ambiguity function bi-orthogonality property of (28) is true in a neighborhood of each grid point $(m\Delta f,nT)$ of the lattice $\Lambda$ at least as large as the support of the channel response $h(\tau,v)$, then the following equation holds $$Y[n,m]=H[n,m]X[n,m]$$

$$H[n,m]=\iint h(\tau,v)e^{j2\pi vnT}e^{-j2\pi(v+m\Delta f)\tau}dvd\tau \quad (30)$$

If the ambiguity function is only approximately bi-orthogonal in the neighborhood of $\Lambda$ (by continuity), then (30) is only approximately true. Eq. (30) is a fundamental equation that describes the channel behavior in the time-frequency domain. It is the basis for understanding the nature of the channel and its variations along the time and frequency dimensions.

Some observations are now in order on Eq. (30). As mentioned before, there is no interference across X[n,m] in either time n or frequency m.

The end-to-end channel distortion in the modulation domain is a (complex) scalar that needs to be equalized.

If there is no Doppler, i.e. $h(\tau,v)=h(\tau,0)\delta(v)$, then Eq. (30) becomes $$Y[n,m] = X[n,m]\int h(\tau,0)e^{-j2\pi m\Delta f\tau}d\tau \quad (31)$$

$$= X[n,m]H(0,m\Delta f)$$

which is the well-known multicarrier result, that each subcarrier symbol is multiplied by the frequency response of the time invariant channel evaluated at the frequency of that subcarrier.

If there is no multipath, i.e. $h(\tau,v)=h(0,v)\delta(\tau)$, then Eq. (30) becomes $$Y[n,m]=X[n,m]\int h(v,0)e^{j2\pi vnT}d\tau \quad (32)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

Some examples of this general framework are provided below.

Example 3: (OFDM Modulation)

In this case the fundamental transmit pulse is given by (14) and the fundamental receive pulse is $$g_r(t) = \begin{cases} 0 & -T_{CP} < t < 0 \\ \frac{1}{\sqrt{T-T_{CP}}} & 0 < t < T - T_{CP} \\ 0 & \text{else} \end{cases} \quad (33)$$

i.e., the receiver zeroes out the CP samples and applies a square window to the symbols comprising the OFDM symbol. It is worth noting that in this case, the bi-orthogonality property holds exactly along the time dimension.

Example 4: (MCFB Modulation)

In the case of multicarrier filter banks $g_{tr}(t)=g_r(t)=g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, one of the two transforms defining OTFS has now been described. Specifically, an explanation has been provided of how the transmitter and receiver apply appropriate operators on the fundamental transmit and receive pulses and orthogonalize the channel according to Eq. (30). Examples have also been provided to illustrate how the choice of the fundamental pulse affects the time and frequency localization of the transmitted modulation symbols and the quality of the channel orthogonalization that is achieved. However, Eq. (30) shows that the channel in this domain, while free of intersymbol interference, suffers from fading across both the time and the frequency dimensions via a complicated superposition of linear phase factors.

In what follows we start from Eq. (30) and describe the second transform that defines OTFS; we will show how that transform defines an information domain where the channel does not fade in either dimension.

The 2D OTFS Transform

Notice that the time-frequency response H[n,m] in (30) is related to the channel delay-Doppler response $h(\tau,v)$ by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (30) points in the direction of using complex exponentials as basis functions on which to modulate the information symbols; and only transmit on the time-frequency domain the superposition of those modulated complex exponential bases. As is discussed below, this approach exploits Fourier transform properties and effectively translates a multiplicative channel in one Fourier domain to a convolution channel in the other Fourier domain.

Given the difficulties of Eq. (30) mentioned above, we need to develop a suitable version of Fourier transform and associated sampling theory results. Let us start with the following definitions:

Definition 1: Symplectic Discrete Fourier Transform:

Given a square summable two dimensional sequence $X[m,n] \in \mathbb{C}(\Lambda)$ we define $$x(\tau, \nu) = \sum_{m,n} X[n,m] e^{-j2\pi(\nu nT - \tau m\Delta f)} \quad (34)$$
$$\triangleq SDFT(X[n,m])$$

Notice that the above 2D Fourier transform (known as the Symplectic Discrete Fourier Transform) differs from the more well known Cartesian Fourier transform in that the exponential functions across each of the two dimensions have opposing signs. This is necessary in this case, as it matches the behavior of the channel equation.

Further notice that the resulting $x(\tau,\nu)$ is periodic with periods $(1/\Delta f, 1/T)$. This transform defines a new two dimensional plane, which we will call the delay-Doppler plane, and which can represent a max delay of $1/\Delta f$ and a max Doppler of $1/T$. A one dimensional periodic function is also called a function on a circle, while a 2D periodic function is called a function on a torus (or donut). In this case $x(\tau,\nu)$ is defined on a torus Z with circumferences (dimensions) $(1/\Delta f, 1/T)$.

The periodicity of $x(\tau,\nu)$ (or sampling rate of the time-frequency plane) also defines a lattice on the delay-Doppler plane, which we will call the reciprocal lattice $$\Lambda^{\perp} = \left\{ \left( m\frac{1}{\Delta f}, n\frac{1}{T} \right), n, m \in \mathbb{Z} \right\} \quad (35)$$

The points on the reciprocal lattice have the property of making the exponent in (34), an integer multiple of $2\pi$.

The inverse transform is given by:

$$X[n,m] = \frac{1}{c} \int_0^{\frac{1}{\Delta f}} \int_0^{\frac{1}{T}} x(\tau,\nu) e^{j2\pi(\nu nT - \tau m\Delta f)} d\nu d\tau \quad (36)$$
$$\triangleq SDFT^{-1}(x(\tau,\nu))$$

where $c = T\Delta f$.

We next define a sampled version of $x(\tau,\nu)$. In particular, we wish to take M samples on the delay dimension (spaced at $1/M\Delta f$) and N samples on the Doppler dimension (spaced at $1/NT$). More formally, a denser version of the reciprocal lattice is defined so that $\Lambda^{\perp} \subseteq \Lambda_0^{\perp}$.

$$\Lambda_0^{\perp} = \left\{ \left( m\frac{1}{M\Delta f}, n\frac{1}{NT} \right), n, m \in \mathbb{Z} \right\} \quad (37)$$

We define discrete periodic functions on this dense lattice with period $(1/\Delta f, 1/T)$, or equivalently we define functions on a discrete torus with these dimensions $$Z_0^{\perp} = \left\{ \left( m\frac{1}{M\Delta f}, n\frac{1}{NT} \right), m = 0, \ldots, M-1, n = 0, \ldots N-1, \right\} \quad (38)$$

These functions are related via Fourier transform relationships to discrete periodic functions on the lattice $\Lambda$, or equivalently, functions on the discrete torus $$Z_0 = \{(nT, m\Delta f), m=0, \ldots, M-1, n=0, \ldots N-1,\} \quad (39)$$

We wish to develop an expression for sampling Eq. (34) on the lattice of (38). First, we start with the following definition.

Definition 2: Symplectic Finite Fourier Transform:

If $X_p[k,l]$ is periodic with period (N, M), then we define $$x_p[m,n] = \sum_{k=0}^{N-1} \sum_{l=-\frac{M}{2}}^{\frac{M}{2}-1} X_p[k,l] e^{-j2\pi\left(\frac{nk}{N} - \frac{ml}{M}\right)} \quad (40)$$
$$\triangleq SFFT(X[k,l])$$

Notice that $x_p[m,n]$ is also periodic with period [M, N] or, equivalently, it is defined on the discrete torus $Z_0^{\perp}$. Formally, the $SFFT(X[n,m])$ is a linear transformation from $\mathbb{C}(Z_0) \to \mathbb{C}(Z_0^{\perp})$.

Let us now consider generating $x_p[m,n]$ as a sampled version of (34), i.e., $$x_p[m,n] = x[m,n] = x(\tau,\nu)|_{\tau=\frac{m}{M\Delta f}, \nu=\frac{n}{NT}}.$$

Then we can show that (40) still holds where $X_p[m,n]$ is a periodization of $X[n,m]$ with period (N, M)

$$X_p[n,m] = \sum_{l,k=-\infty}^{\infty} X[n-kN, m-lM] \quad (41)$$

This is similar to the result that sampling in one Fourier domain creates aliasing in the other domain.

The inverse discrete (symplectic) Fourier transform is given by $$X_p[n,m] = \frac{1}{MN} \sum_{l,k} x[l,k] e^{j2\pi\left(\frac{nk}{N} - \frac{ml}{M}\right)} \quad (42)$$
$$\triangleq SFFT^{-1}(x[l,k])$$

where $l=0, \ldots, M-1$, $k=0, \ldots, N-1$. If the support of $X[n,m]$ is time-frequency limited to $Z_0$ (no aliasing in (41)), then $X_p[n,m] = X[n,m]$ for $n,m \in Z_0$, and the inverse transform (42) recovers the original signal.

The SDFT is termed "discrete" because it represents a signal using a discrete set of exponentials, while the SFFT is called "finite" because it represents a signal using a finite set of exponentials.

In the present context, an important property of the symplectic Fourier transform is that it transforms a multiplicative channel effect in one domain to a circular convolution effect in the transformed domain. This is summarized in the following proposition:

Proposition 2:

Let $X_1[n,m] \in \mathbb{C}(Z_0)$, $X_2[n,m] \in \mathbb{C}(Z_0)$ be periodic 2D sequences. Then $$SFFT(X_1[n,m]*X_2[n,m]) = SFFT(X_1[n,m]) \cdot SFFT(X_2[n,m]) \quad (43)$$

where * denotes two dimensional circular convolution. With this framework established we are ready to define the OTFS modulation.

Discrete OTFS Modulation:

Consider a set of NM QAM information symbols arranged on a 2D grid $x[l,k]$, $k=0, \ldots, N-1$, $l=0, \ldots, M-1$ we wish to transmit. We will consider $x[l,k]$ to be two dimensional periodic with period [N, M]. Further, assume a multicarrier modulation system defined by A lattice on the time frequency plane, that is a sampling of the time axis with sampling period T and the frequency axis with sampling period $\Delta f$ (c.f. Eq. (9)).

A packet burst with total duration NT sees and total bandwidth $M\Delta f$ Hz.

Transmit and receive pulses $g_{tr}(t)$, $g_{tr}(t) \in L_2(\mathbb{R})$ satisfying the bi-orthogonality property of (28)

A transmit windowing square summable function $W_{tr}[n,m] \in \mathbb{C}(\Lambda)$ multiplying the modulation symbols in the time-frequency domain A set of modulation symbols $X[n,m]$, $n=0, \ldots, N-1$, $m=0, \ldots, M-1$ related to the information symbols $x[k,l]$ by a set of basis functions $b_{k,l}[n,m]$ $$X[n,m] = \frac{1}{MN} W_{tr}[n,m] \sum_{k=0}^{N-1} \sum_{l=0}^{M-1} x[l,k] b_{k,l}[n,m] \quad (44)$$

$$b_{k,l}[n,m] = e^{j2\pi\left(\frac{ml}{M} - \frac{nk}{N}\right)}$$

where the basis functions $b_{k,l}[n,m]$ are related to the inverse symplectic Fourier transform (c.f., Eq. (42))

Given the above components, we define the discrete OTFS modulation via the following two steps $$x[n,m] = W_{tr}[n,m] SFFT^{-1}(x[k,l])$$

$$s(t) = \Pi_X(g_{tr}(t)) \quad (45)$$

The first equation in (45) describes the OTFS transform, which combines an inverse symplectic transform with a widowing operation. The second equation describes the transmission of the modulation symbols $X[n,m]$ via a Heisenberg transform of $g_{tr}(t)$ parameterized by $X[n,m]$. More explicit formulas for the modulation steps are given by Equations (42) and (11).

While the expression of the OTFS modulation via the symplectic Fourier transform reveals important properties, it is easier to understand the modulation via Eq. (44), that is, transmitting each information symbol $x[k,l]$ by modulating a 2D basis function $b_{k,l}[n,m]$ on the time-frequency plane.

Discrete OTFS Demodulation:

Let us assume that the transmitted signal s(t) undergoes channel distortion according to (8), (2) yielding r(t) at the receiver. Further, let the receiver employ a receive windowing square summable function $W_r[n,m]$. Then, the demodulation operation consists of the following steps:

(i) Matched filtering with the receive pulse, or more formally, evaluating the ambiguity function on $\Lambda$ (Wigner transform) to obtain estimates of the time-frequency modulation symbols $$Y[n,m] = A_{g_r,y}(\tau,v)|_{\tau=nT,v=m\Delta f} \quad (46)$$

(ii) windowing and periodization of Y[n,m]

$$Y_w[n,m] = W_r[n,m] Y[n,m] \quad (47)$$

$$Y_p[n,m] = \sum_{k,l=-\infty}^{\infty} Y_w[n-kN, m-lM]$$

(iii) and applying the symplectic Fourier transform on the periodic sequence $Y_p[n,m]$ $$\hat{x}[l,k] = y[l,k] = SFFT(Y_p[n,m]) \quad (48)$$

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l,k] = \sum_{m=0}^{M-1} \sum_{n=0}^{N-1} \hat{X}(n,m) b^*_{k,l}(n,m) \quad (49)$$

$$b^*_{k,l}(n,m) = e^{-j2\pi\left(\frac{lm}{L} - \frac{kn}{K}\right)}$$

The discrete OTFS modulation defined above points to efficient implementation via discrete-and-periodic FFT type processing. However, it potentially does not provide insight into the time and bandwidth resolution of these operations in the context of two dimensional Fourier sampling theory. We next introduce continous OTFS modulation and relate the more practical discrete OTFS as a sampled version of the continuous modulation.

Continuous OTFS Modulation:

Consider a two dimensional periodic function $x(\tau,v)$ with period $[1/\Delta f, 1/T]$ that we wish to transmit. The choice of the period may seem arbitrary at this point, but the rationale for its choice will become apparent after the discussion below. Further, assume a multicarrier modulation system defined by A lattice on the time frequency plane, that is a sampling of the time axis with sampling period T and the frequency axis with sampling period $\Delta f$ (c.f. Eq. (9)).

Transmit and receive pulses $g_{tr}(t)$, $g_{tr}(t) \in L_2(\mathbb{R})$ satisfying the bi-orthogonality property of (28)

A transmit windowing function $W_{tr}[n,m] \in \mathbb{C}(\Lambda)$ multiplying the modulation symbols in the time-frequency domain Given the above components, we define the continuous OTFS modulation via the following two steps $$X[n,m] = W_{tr}[n,m] SDFT^{-1}(x(\tau,v)) \quad (50)$$

$$s(t) = \Pi_X(g_{tr}(t))$$

The first equation describes the inverse discrete time-frequency symplectic Fourier transform [c.f. Eq. (36)] and the windowing function, while the second equation describes the transmission of the modulation symbols via a Heisenberg transform [c.f. Eq. (11)].

Continuous OTFS Demodulation:

Let us assume that the transmitted signal s(t) undergoes channel distortion according to (8), (2) yielding r(t) at the receiver. Further, let the receiver employ a receive windowing function $W_r[n,m] \in \mathbb{C}(\Lambda)$. Then, the demodulation operation consists of two steps:

(i) Evaluating the ambiguity function on Λ (Wigner transform) to obtain estimates of the time-frequency modulation symbols $$Y[n,m] = A_{g_r,y}(\tau,v)|_{\tau=nT, v=m\Delta f} \quad (51)$$

(ii) Windowing and applying the symplectic Fourier transform on the modulation symbols $$\hat{x}(\tau,v) = SDFT(W_r[n,m]Y[n,m]) \quad (52)$$

Notice that in (51), (52) there is no periodization of Y[n,m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l,k) = \hat{x}(\tau,v)|_{\tau=\frac{m}{M\Delta f}, v=\frac{n}{NT}}$$

Since performing a continuous symplectic Fourier transform is generally not practical we consider whether the same result can be obtained using SFFT. The answer is that SFFT processing will produce exactly the samples we are looking for if the input sequence is first periodized (aliased). See also equation (40) and (41).

We have now described each of the steps of an exemplary form of OTFS modulation. We have also discussed how the Wigner transform at the receiver inverts the Heisenberg transform at the transmitter [c.f. Eqs. (27), (29)], and similarly for the forward and inverse symplectic Fourier transforms.

Figure 5:
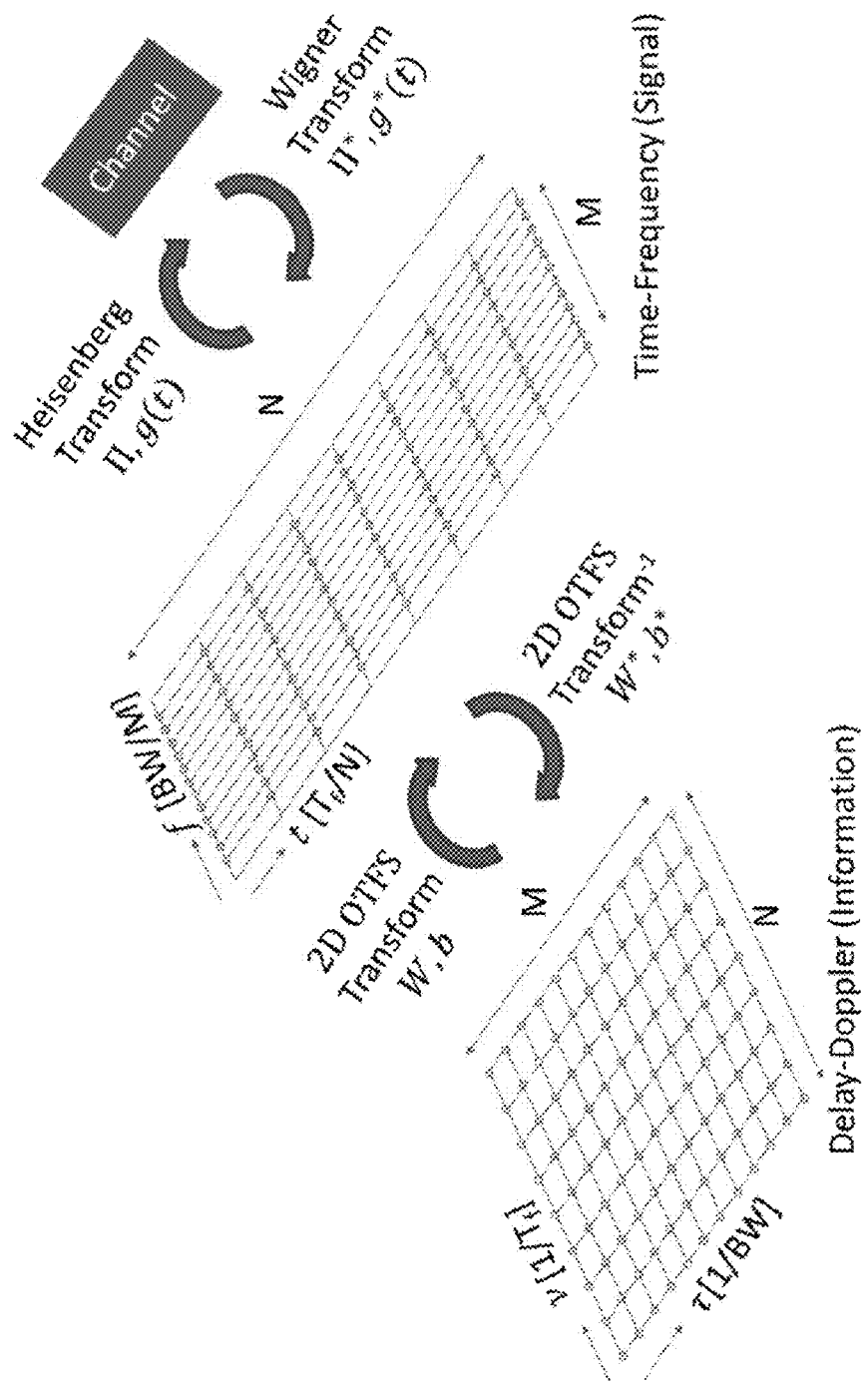
FIG. 5 illustratively represents an exemplary embodiment of OTFS modulation, including the transformation of the time-frequency plane to the Doppler-delay plane.

FIG. 5 illustratively represents an exemplary embodiment of OTFS modulation, including the transformation of the time-frequency plane to the Doppler-delay plane. In addition, FIG. 5 indicates relationships between sampling rate, delay resolution and time resolution. Referring to FIG. 5, in a first operation a Heisenberg transform translates a time-varying convolution channel in the waveform domain to an orthogonal but still time varying channel in the time frequency domain. For a total bandwidth BW and M subcarriers the frequency resolution is Δf=BW/M. For a total frame duration $T_f$ and N symbols the time resolution is $T=T_f/N$.

In a second operation a SFFT transform translates the time-varying channel in the time-frequency domain to a time invariant one in the delay-Doppler domain. The Doppler resolution is $1/T_f$ and the delay resolution is 1/BW. The choice of window can provide a tradeoff between main lobe width (resolution) and side lobe suppression, as in classical spectral analysis.

Channel Equation in the OTFS Domain

A mathematical characterization of the end-to-end signal relationship in an OTFS system when a non-ideal channel is between the transmitter and receiver will now be provided. Specifically, this section demonstrates how the time varying channel in (2), (8), is transformed to a time invariant convolution channel in the delay Doppler domain.

Proposition 3:

Consider a set of NM QAM information symbols arranged in a 2D periodic sequence x[l,k] with period [M,N]. The sequence x[k,l] undergoes the following transformations:

It is modulated using the discrete OTFS modulation of Eq. (45).

It is distorted by the delay-Doppler channel of Eqs. (2), (8).

It is demodulated by the discrete OTFS demodulation of Eqs. (46), (48).

The estimated sequence $\hat{x}[l,k]$ obtained after demodulation is given by the two dimensional periodic convolution $$\hat{x}[l,k] \simeq \frac{1}{MN} \sum_{m=0}^{M-1} \sum_{n=0}^{N-1} x[m,n] h_w\left(\frac{l-m}{M\Delta f}, \frac{k-n}{NT}\right) \quad (53)$$

of the input QAM sequence x[m,n] and a sampled version of the windowed impulse response $h_w(\cdot)$, $$h_w\left(\frac{l-m}{M\Delta f}, \frac{k-n}{NT}\right) = h_w(\tau', v')|_{\tau'=\frac{l-m}{M\Delta f}, v'=\frac{k-n}{NT}} \quad (54)$$

where $h_w(\tau',v')$ denotes the circular convolution of the channel response with a windowing function $$h_w(\tau',v') = \iint e^{-j2\pi v\tau} h(\tau,v) w(\tau'-\tau, v'-v) d\tau dv \quad (55)$$

To be precise, the window w(τ,v) is circularly convolved with a slightly modified version of the channel impulse response $e^{-j2\pi v\tau}h(\tau,v)$ (by a complex exponential) as can be seen in the equation. The windowing function w(τ,v) is the symplectic Fourier transform of the time-frequency window W[n,m]

$$w(\tau,v) = \sum_{m=0}^{M-1} \sum_{n=0}^{N-1} W[n,m] e^{-j2\pi(vnT-\tau m\Delta f)} \quad (56)$$

and where W[n,m] is the product of the transmit and receive window.

$$W[n,m] = W_{tr}[n,m] W_r[n,m] \quad (57)$$

In many cases, the windows in the transmitter and receiver are matched, i.e., $W_{tr}[n,m] = W_0[n,m]$ and $W_r[n,m] = W_0^*[n,m]$, hence $W[n,m] = |W_0[n,m]|^2$.

The window effect is to produce a blurred version of the original channel with a resolution that depends on the span of the frequency and time samples available. If one considers the rectangular (or trivial) window, i.e., W[n,m]=1, n=0, . . . , N−1, m=−M/2, . . . , M/2−1 and zero else, then its SDFT w(τ,v) in (56) is the two dimensional Dirichlet kernel with bandwidth inversely proportional to N and M.

There are several other uses of the window function. The system can be designed with a window function aimed at randomizing the phases of the transmitted symbols. This randomization may be more important for pilot symbols than data carrying symbols. For example, if neighboring cells use different window functions, the problem of pilot contamination is avoided.

Channel Estimation in the OTFS Domain

Figure 6:
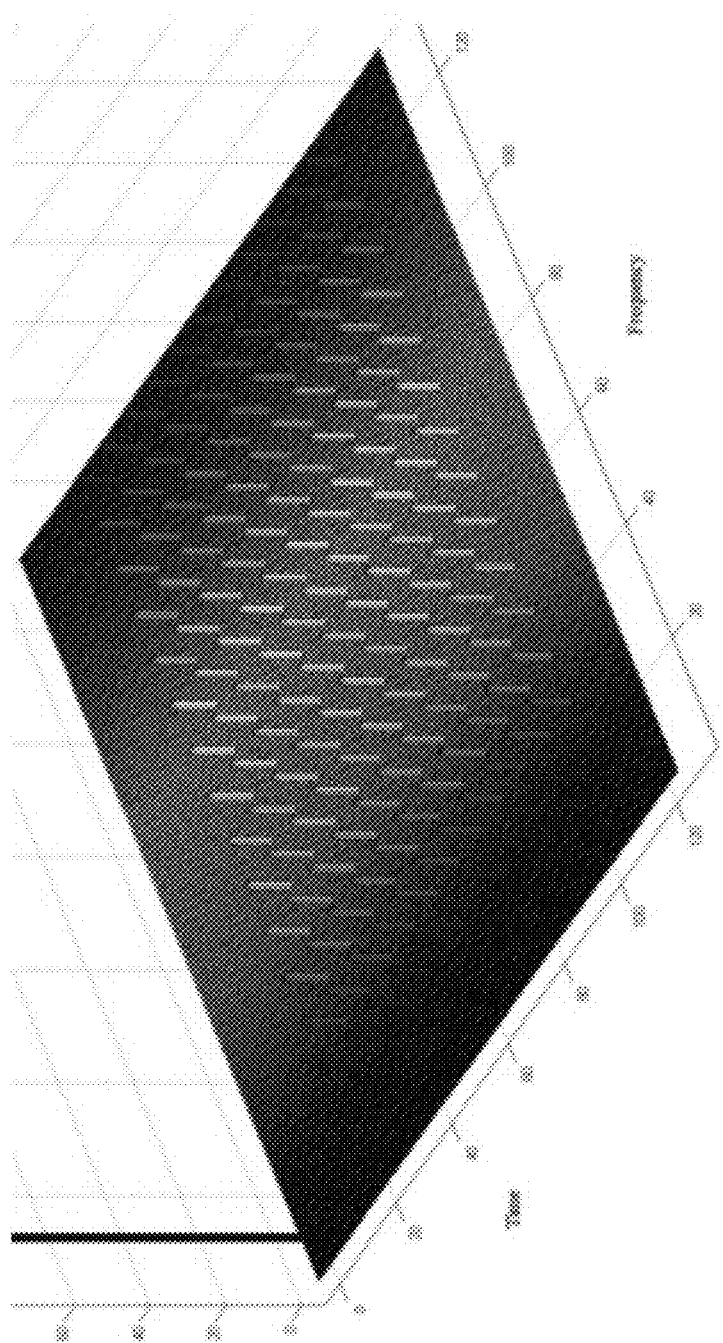
FIG. 6 shows a discrete impulse in the OTFS domain which is used for purposes of channel estimation.

There is a variety of different ways a channel estimation scheme could be designed for an OTFS system, and a variety of different implementation options and details A straightforward way to perform channel estimation entails transmitting a sounding OTFS frame containing a discrete delta function in the OTFS domain or, equivalently, a set of unmodulated carriers in the time frequency domain. From a practical standpoint, the carriers may be modulated with known, say BPSK, symbols which are removed at the receiver, as is common in many OFDM systems. FIG. 6 shows a discrete impulse in the OTFS domain which may be used for purposes of channel estimation.

However, this approach may be wasteful as the extent of the channel response is only a fraction of the full extent of the OTFS frame (1/T, 1/Δf). For example, in LTE systems 1/T≈15 KHz while the maximum Doppler shift $f_{d,max}$ is typically one to two orders of magnitude smaller. Similarly 1/Δf≈67 usec, while maximum delay spread $\tau_{max}$ is again one to two orders of magnitude less. We therefore can have a much smaller region of the OTFS frame devoted to channel estimation while the rest of the frame carries useful data. More specifically, for a channel with support ($\pm f_{d,max}$, $\pm\tau_{max}$) we need an OTFS subframe of length ($2f_{d,max}/T$, $2\tau_{max}/\Delta f$).

In the case of multiuser transmission, each UE can have its own channel estimation subframe positioned in different parts of the OTFS frame. However, this channel estimation subframe may be relatively limited in size. For example, if $\tau_{max}$ is 5% of the extent of the delay dimension and $f_{d,max}$ is 5% of the Doppler dimension, the channel estimation subframe need only be 5%×5%=0.25% of the OTFS frame.

Importantly, although the channel estimation symbols are limited to a small part of the OTFS frame, they actually sound the whole time-frequency domain via the corresponding two-dimensional time-frequency basis functions associated with these symbols.

A different approach to channel estimation is to devote pilot symbols on a subgrid in the time-frequency domain. The key question in this approach is the determination of the density of pilots that is sufficient for channel estimation without introducing aliasing. Assume that the pilots occupy the subgrid ($n_0T$, $m_0\Delta f$) for some integers $n_0, m_0$. Recall that for this grid the SDFT will be periodic with period ($1/n_0T$, $1/m_0\Delta f$). Then, applying the aliasing results discussed earlier to this grid, we obtain an alias-free Nyquist channel support region of ($\pm f_{d,max}$, $\pm\tau_{max}$)=($\pm\frac{1}{2}n_0T$, $\pm\frac{1}{2}m_0\Delta f$). The density of the pilots can then be determined from this relation given the maximum support of the channel. The pilot subgrid should extend to the whole time-frequency frame, so that the resolution of the channel is not compromised.

Figure 29:
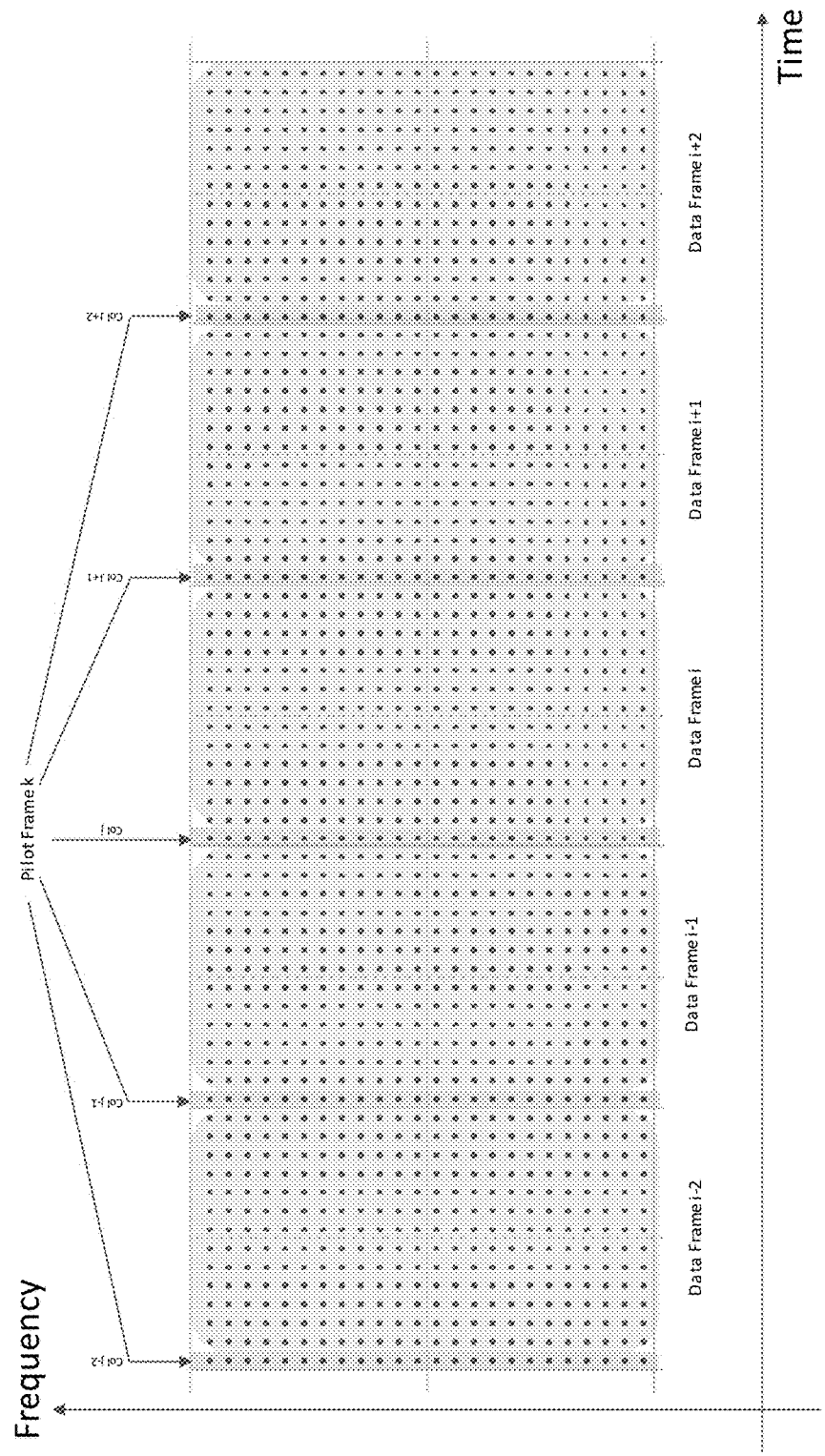
FIG. 29 depicts an exemplary interleaving of pilot frames among data frames on a time frequency grid.

FIG. 29 depicts an exemplary interleaving of pilot frames among data frames on a time frequency grid.

Figure 30:
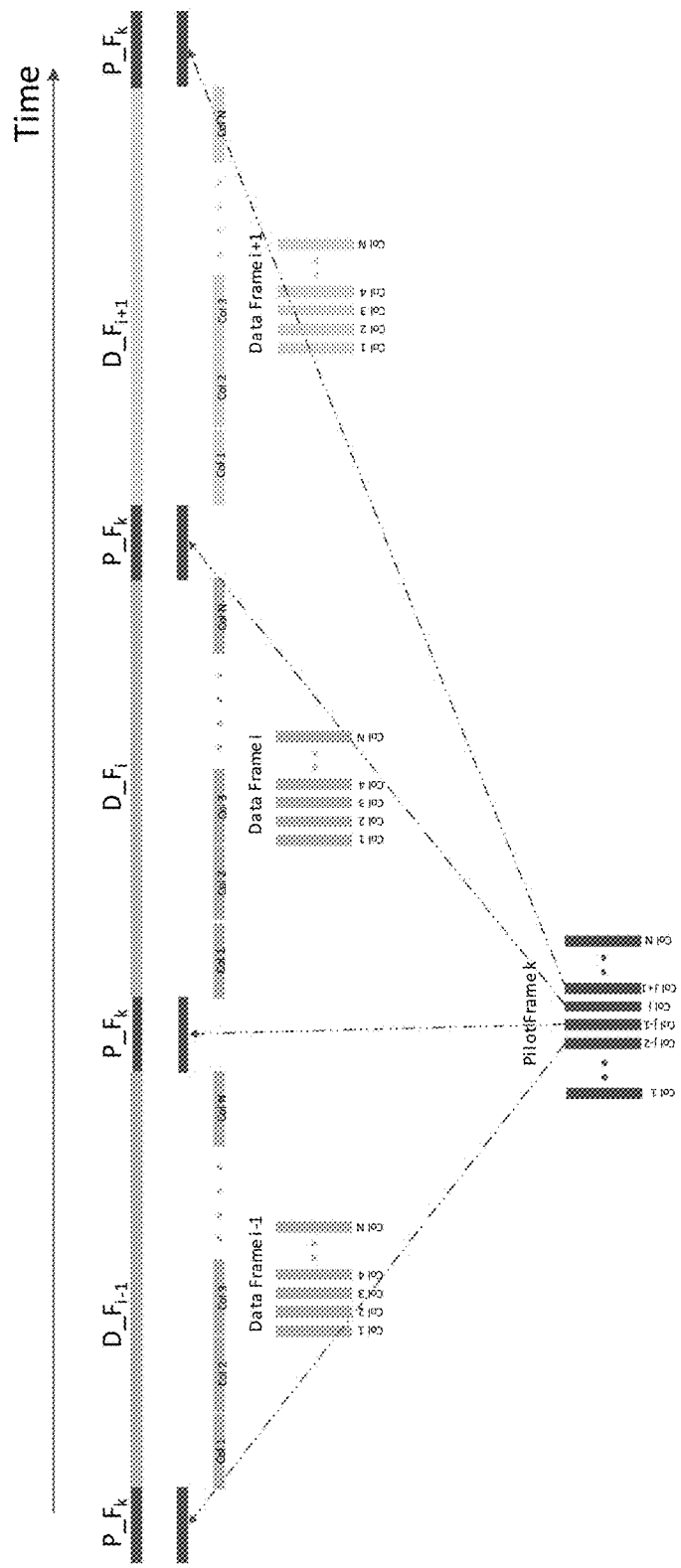
FIG. 30 depicts an exemplary interleaving of pilot and data frames in the time domain.

FIG. 30 depicts an exemplary interleaving of pilot and data frames in the time domain.

Figure 31:
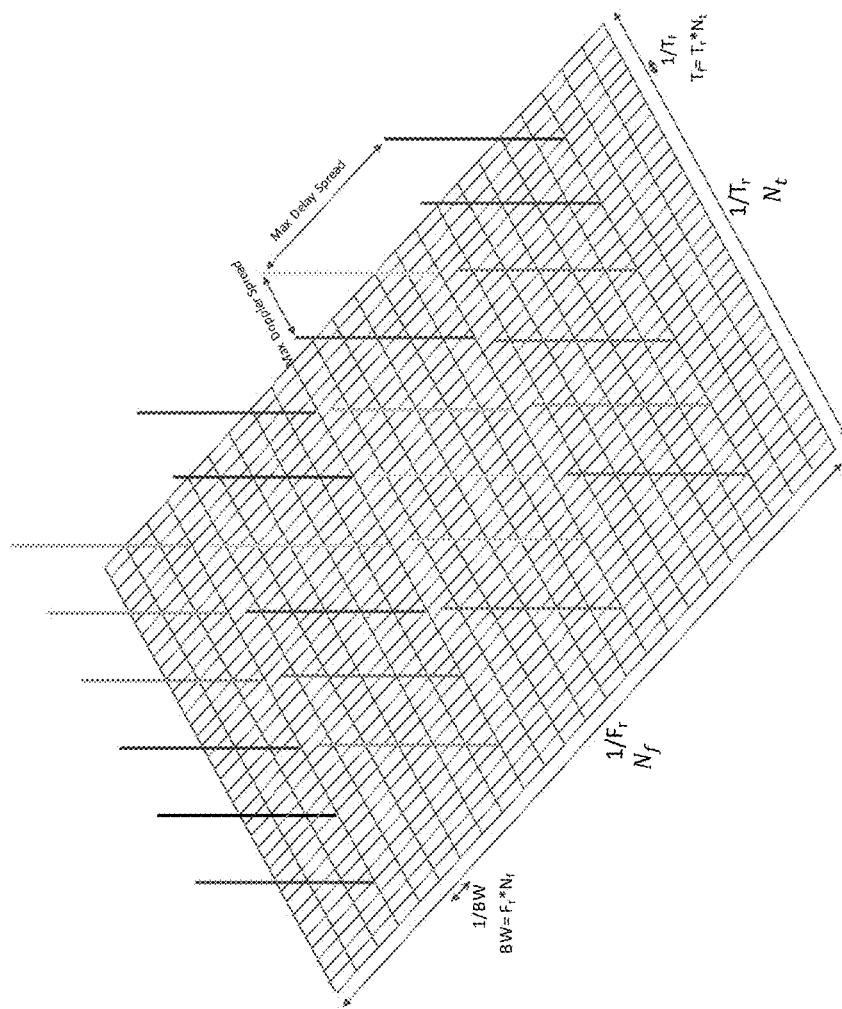
FIG. 31 depicts a set of reference signals corresponding to a set of antenna ports in the delay doppler grid.

FIG. 31 depicts a set of reference signals corresponding to a set of antenna ports in the delay doppler grid.

OTFS-Access: Multiplexing More than One User

There are a variety of ways to multiplex several uplink or downlink transmissions in one OTFS frame. Here we will briefly review the following multiplexing methods:

Multiplexing in the OTFS delay-Doppler domain
Multiplexing in the time-frequency domain
Multiplexing in the code speading domain
Multiplexing in the spatial domain 1. Multiplexing in the Delay-Doppler Domain:

This is potentially the most natural multiplexing scheme for downlink transmissions. Different sets of OTFS basis functions, or sets of information symbols or resource blocks, are given to different users. Given the orthogonality of the basis functions, the users can be separated at the UE receiver. The UE need only demodulate the portion of the OTFS frame that is assigned to it.

Figure 7:
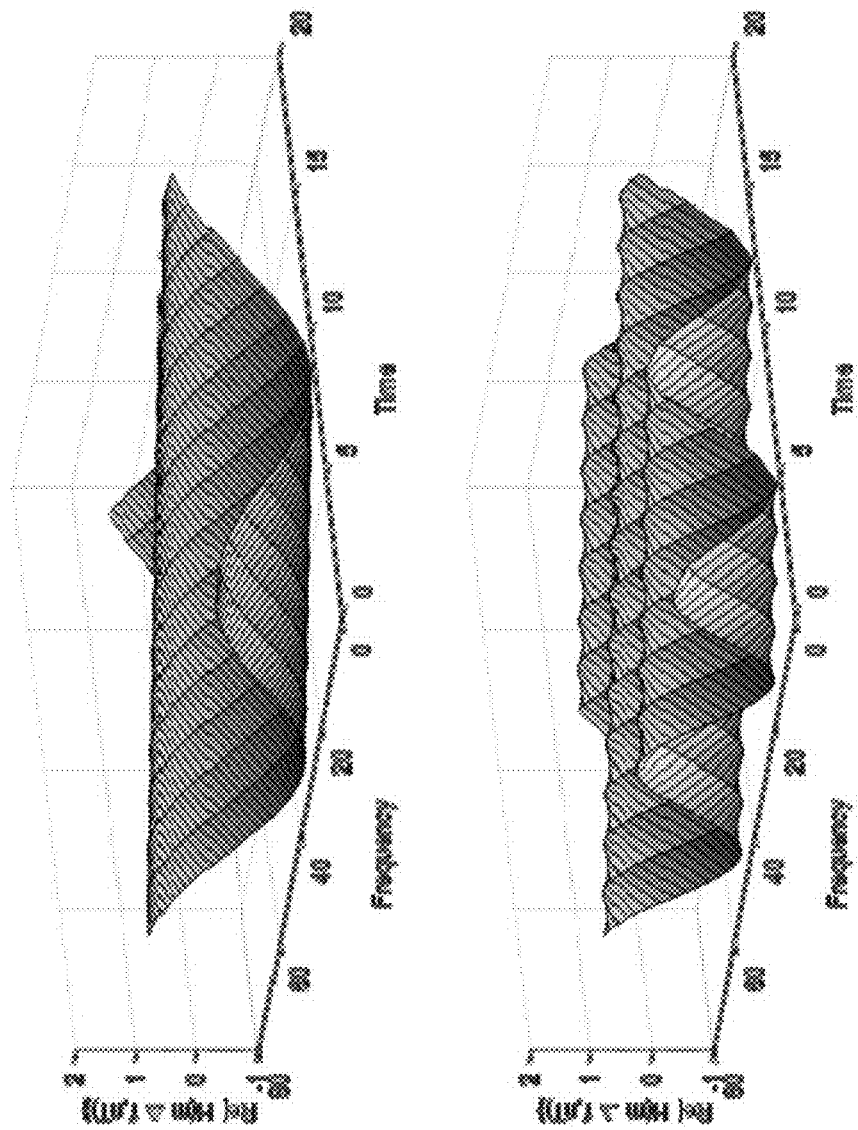
FIG. 7 illustrates two different basis functions belonging to different users, each of which spans the entire time-frequency frame.

In contrast to conventional communication systems, in an OTFS system even a small subframe or resource block in the OTFS domain will be transmitted over the whole time-frequency frame via two-dimensional basis functions and will experience the average channel response. FIG. 7 illustrates this point by showing two different basis functions belonging to different users. Because of this, there is no compromise on channel resolution for each user, regardless of the resource block or subframe size.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

Figure 8:
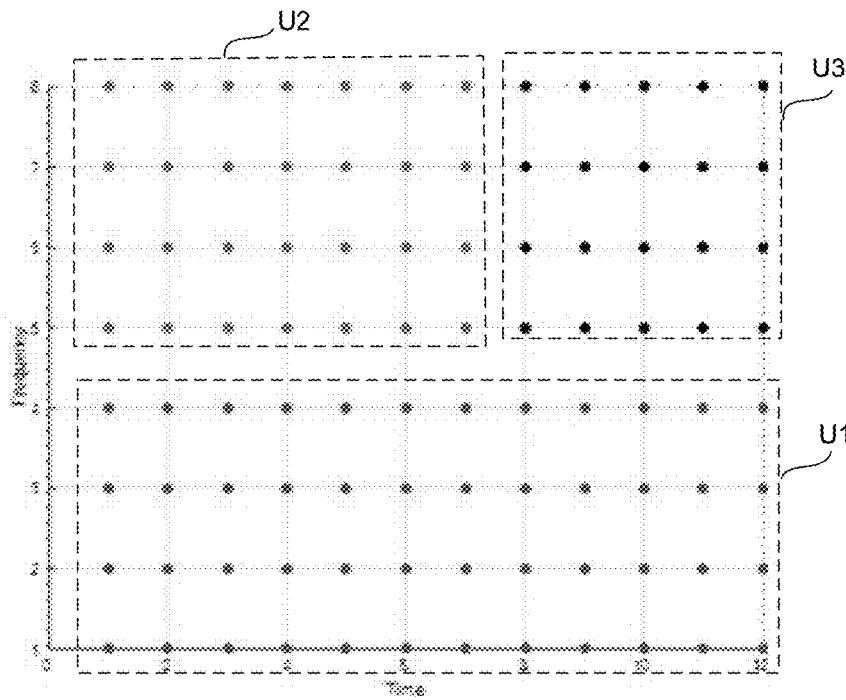
FIGS. 8 and 9 illustrate multiplexing multiple users in the time-frequency domain by allocating different resource blocks or subframes to different users in an interleaved manner.

2. Multiplexing in the Time-Frequency Domain:

In this approach, resource blocks or subframes are allocated to different users in the time-frequency domain. FIG. 8 illustrates this for a three user case. As shown in FIG. 8, a first user (U1) occupies the whole frame length but only half the available subcarriers. A second user (U2) and a third user (U3) occupy the other half subcarriers, and divide the total length of the frame between them.

Notice that in this case, each user employs a slightly different version of the OTFS modulation described. One difference is that each user i performs an SFFT on a subframe ($N_i$, $M_i$) $N_i \leq N$, $M_i \leq M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

Figure 9:
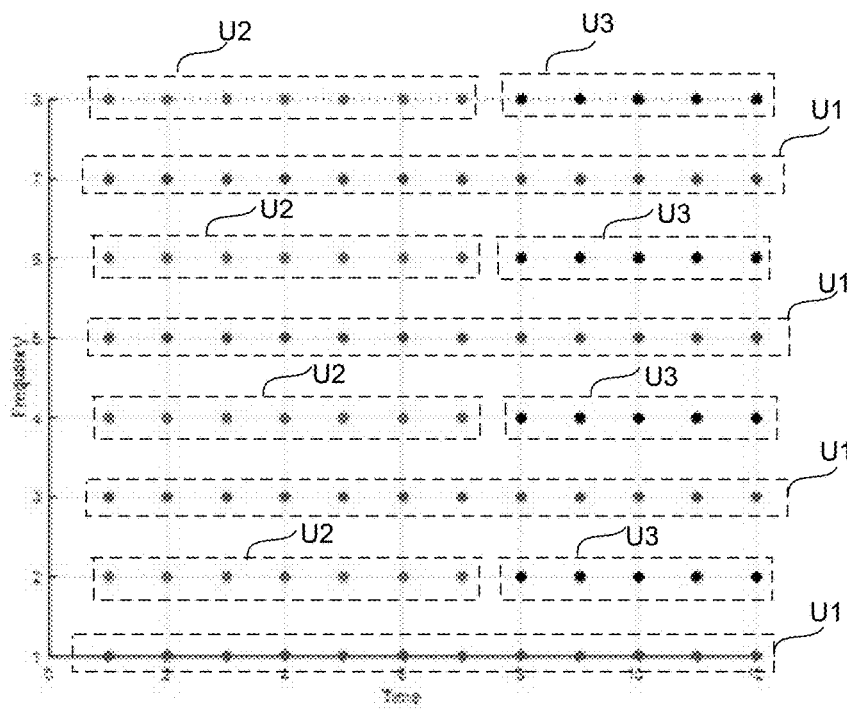

If it is desired to extract the maximum diversity of the channel and allocate users across the whole time-frequency frame, users can be multiplexed via interleaving. In this case, one user occupies a subsampled grid of the time-frequency frame, while another user occupies another subsampled grid adjacent to it. FIG. 9 shows the same three users as in FIG. 8, but interleaved on the subcarrier dimension. Of course, interleaving is possible in the time dimension as well, and/or in both dimensions. The degree of interleaving, or subsampling the grid per user is only limited by the spread of the channel that must be accommodated.

3. Multiplexing in the Time-Frequency Spreading Code Domain:

Assume that it is desired to design a random access PHY and MAC layer where users can access the network without having to undergo elaborate RACH and other synchronization procedures. There is a perceived need for such a system to support Internet of Things (IoT) deployments. OTFS can support such a system by assigning each user a different two-dimensional window function that is designed as a randomizer. In this embodiment the windows of different users are designed to be nearly orthogonal to each other and nearly orthogonal to time and frequency shifts. Each user then only transmits on one or a few basis functions and uses the window as a means to randomize interference and provide processing gain; This can result in a much simplified system that may be attractive for low cost, short burst type of IoT applications.

4. Multiplexing in the Spatial Domain:

Finally, like other OFDM multicarrier systems, a multi-antenna OTFS system can support multiple users transmitting on the same basis functions across the whole time-frequency frame. The users are separated by appropriate transmitter and receiver beamforming operations.

Exemplary Implementations of OTFS Communication Systems

As discussed above, embodiments of Orthogonal Time Frequency Space (OTFS) modulation are comprised of a cascade of two transformations. The first transformation maps the two dimensional plane where the information symbols reside (and which may be termed the delay-Doppler plane) to the time frequency plane. The second transformation transforms the time frequency domain to the waveform time domain where the transmitted signal is actually constructed. This transform can be thought of as a generalization of multicarrier modulation schemes.

Figure 10:
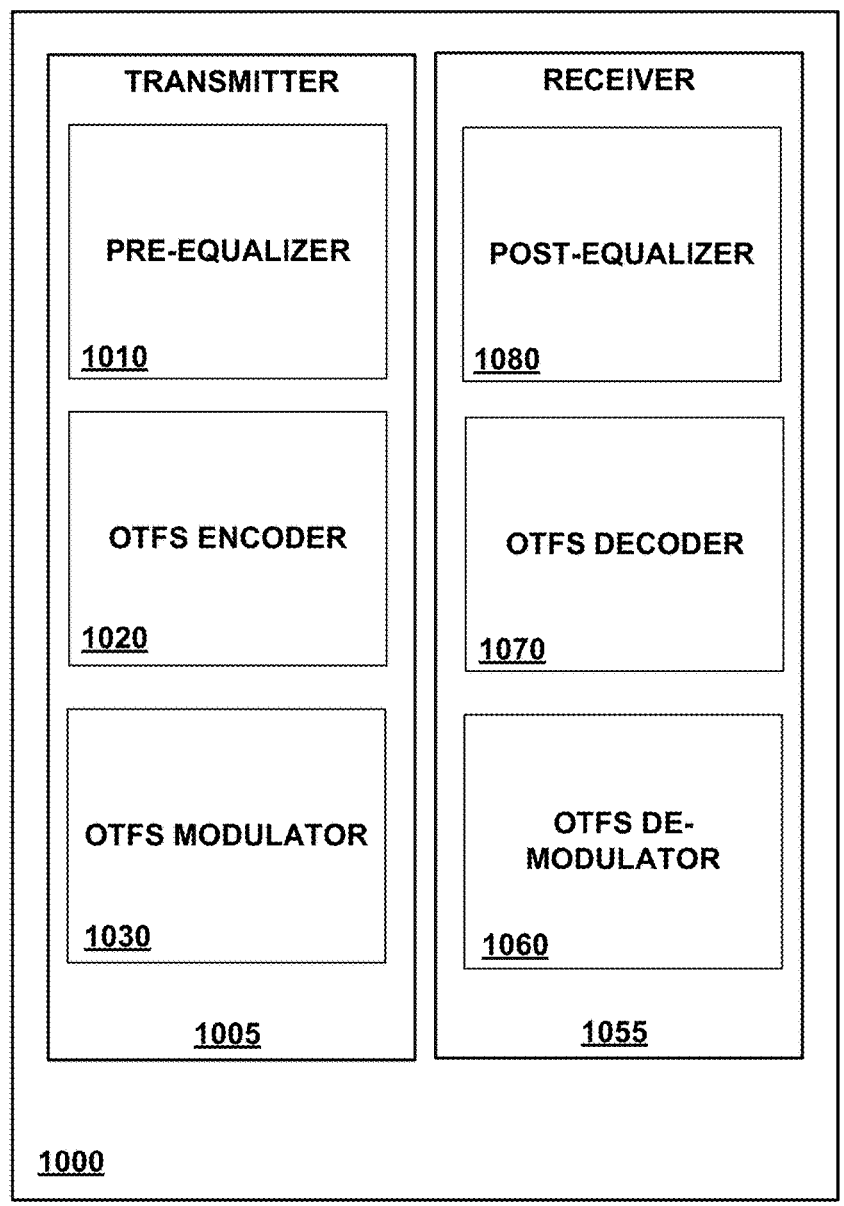
FIG. 10 illustrates components of an exemplary OTFS transceiver.

FIG. 10 illustrates components of an exemplary OTFS transceiver 1000. The OTFS transceiver 1000 can be used as one or both of the exemplary OTFS transceivers 315 illustrated in the communication system 300 of FIG. 3A. The OTFS transceiver 1000 includes a transmitter module 1005 that includes a pre-equalizer 1010, an OTFS encoder 1020 and an OTFS modulator 1030. The OTFS transceiver 1000 also includes a receiver module 1055 that includes a post-equalizer 1080, an OTFS decoder 1070 and an OTFS demodulator 1060. The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. The disclosed OTFS methods will be described in view of the various components of the transceiver 1000.

Referring again to FIG. 3A, in one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

Figure 11:
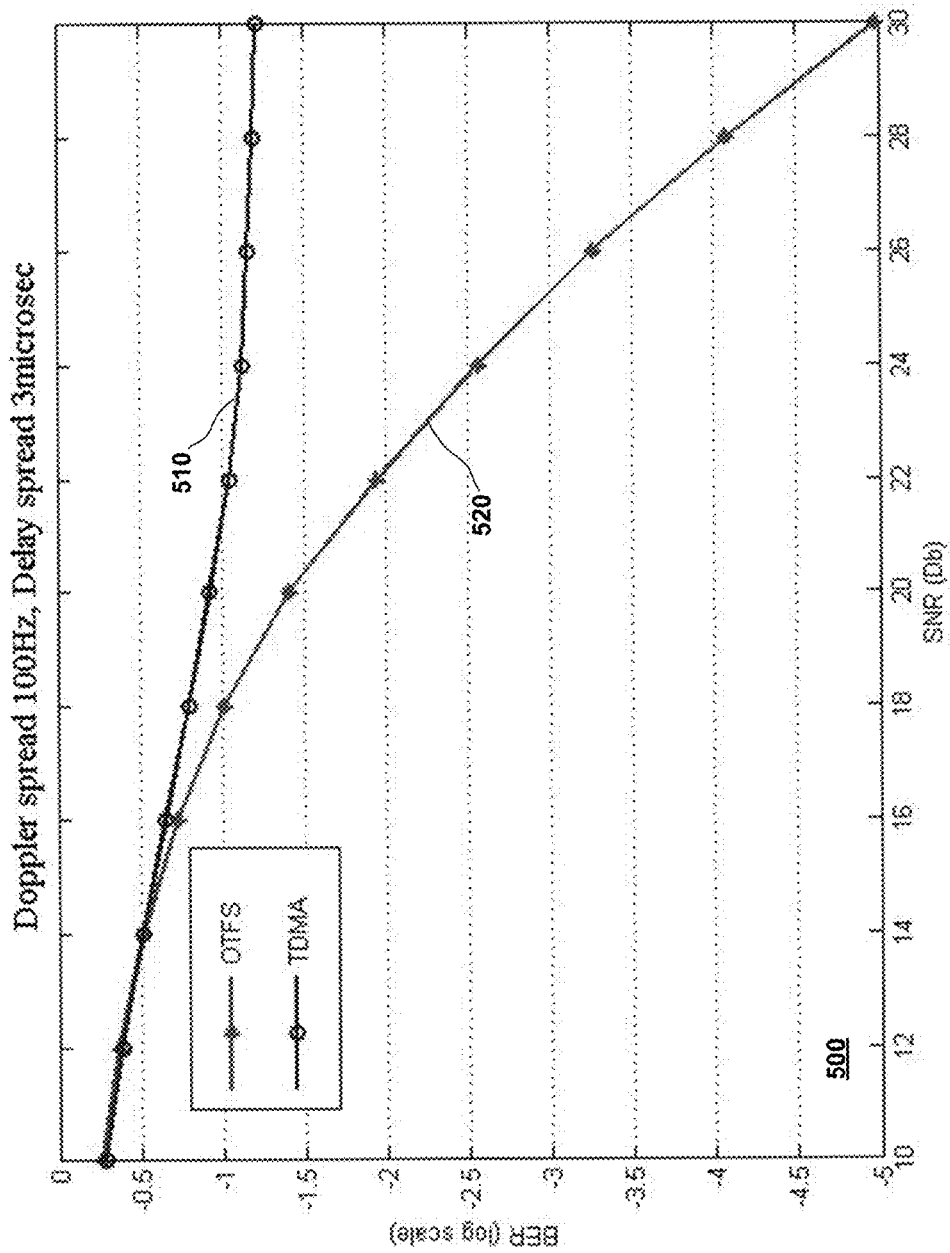
FIG. 11 illustrates a comparison of bit error rates (BER) predicted by a simulation of a TDMA system and an OTFS system.

FIG. 11 illustrates a comparison of bit error rates (BER) predicted by a simulation of a TDMA system and an OTFS system. Both systems utilize a 16 QAM constellation. The simulation modeled a Doppler spread of 100 Hz and a delay spread of 3 microsec. As can be seen from the graphs, the OTFS system offers much lower BER than the TDMA system for the same signal-to-noise ratio (SNR).

Figure 12:
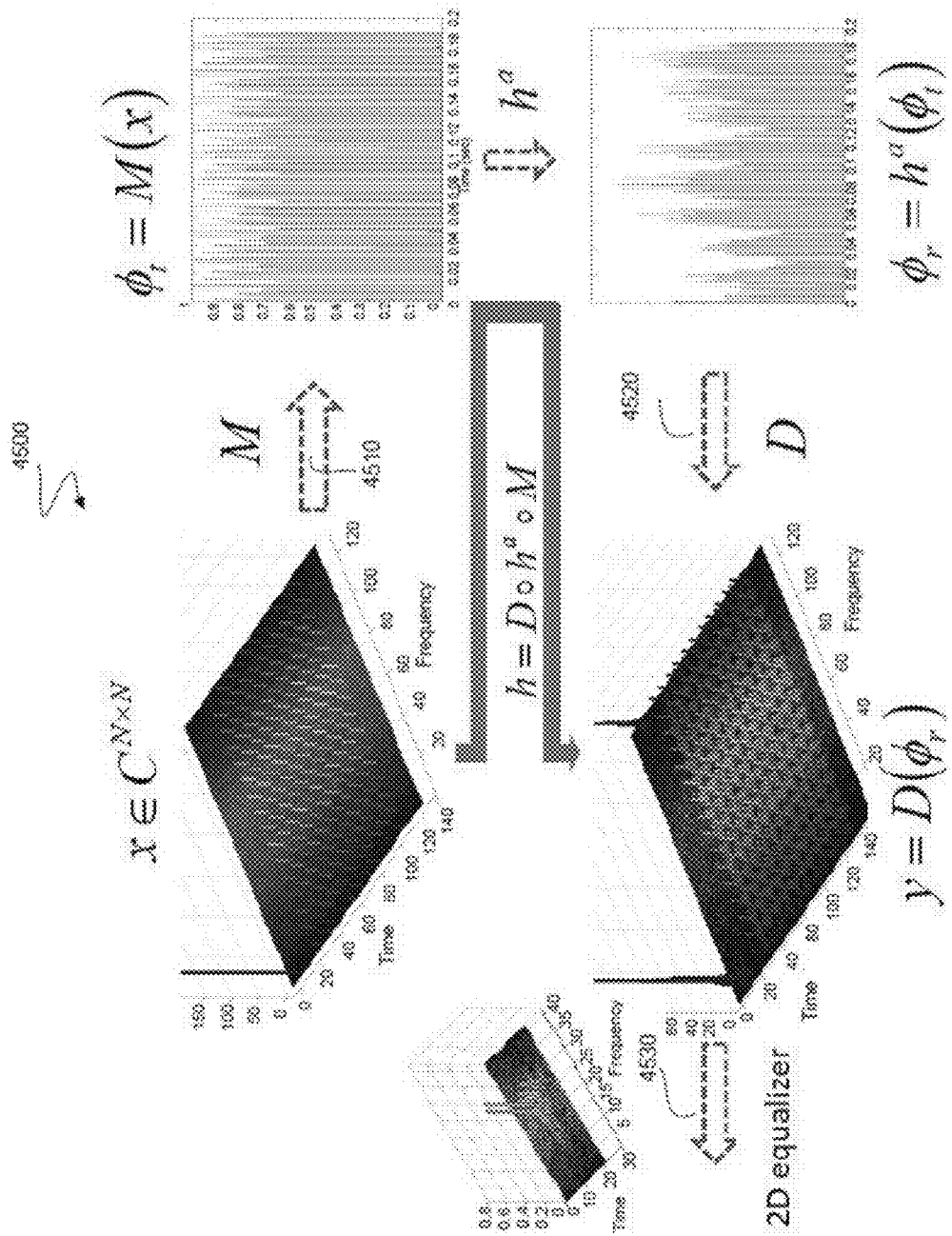
FIG. 12 is a flowchart representative of the operations performed by an exemplary OTFS transceiver.

Attention is now directed to FIG. 12, which is a flowchart representative of the operations performed by an OTFS transceiver 1200 which may be implemented as, for example, the OTFS transceiver 1000 (FIG. 10). The OTFS transceiver 1200 includes a transmitter including a modulator 1210 and a receiver including a demodulator 1220 and two-dimensional equalizer 1230. In operation, a transmitter of the OTFS transceiver 1200 receives a two-dimensional symbol stream in the form of an N×N matrix of symbols, which may hereinafter be referred to as a TF matrix:

$$x \in C^{N \times N}$$

Figure 13:
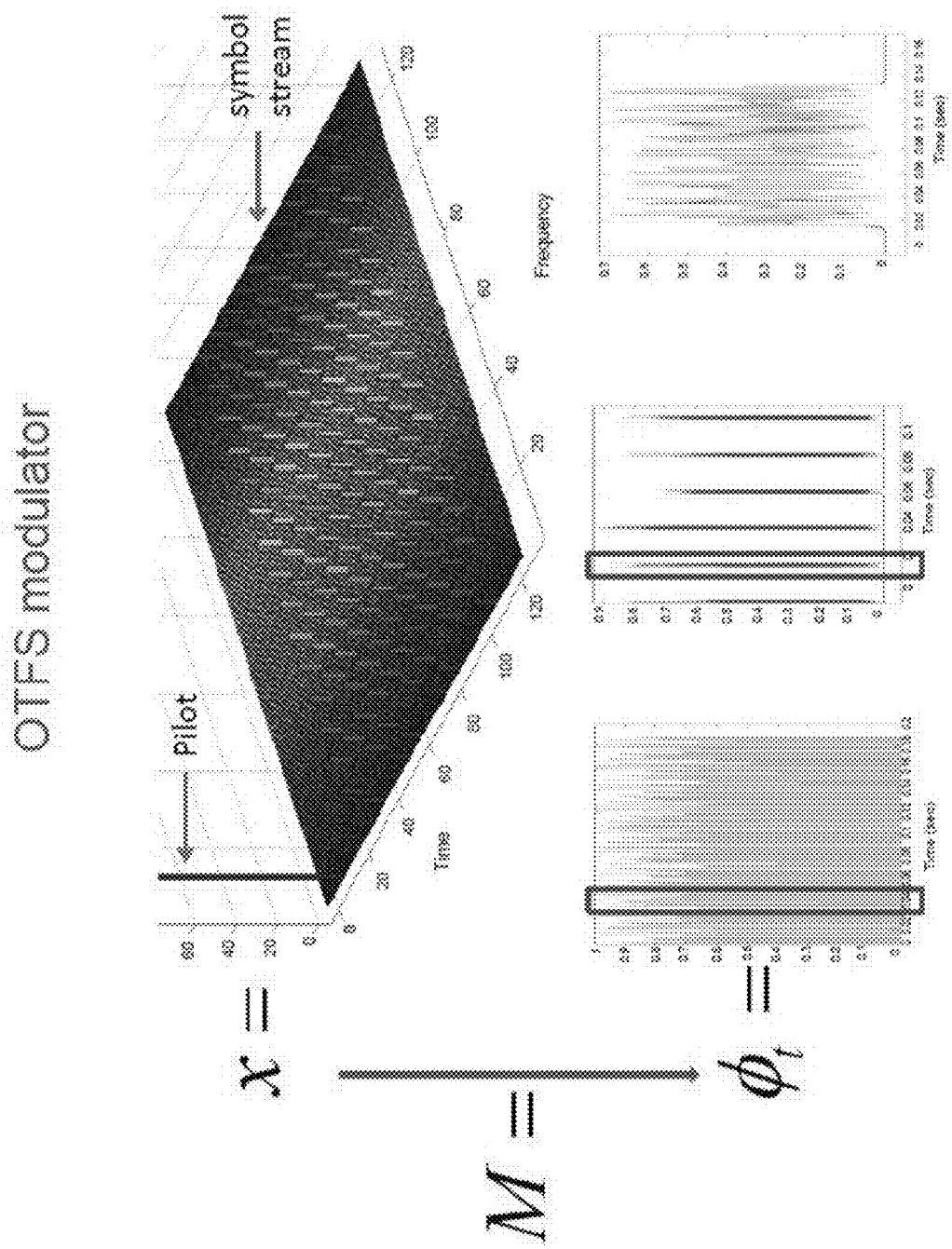
FIG. 13 illustrates functioning of an OTFS modulator as an orthogonal map disposed to transform a two-dimensional time-frequency matrix into a transmitted waveform.

As is illustrated in FIG. 13, in one embodiment the modulator 1210 functions as an orthogonal map disposed to transform the two-dimensional TF matrix to the following transmitted waveform:

$$\phi_t = M(x) = \Sigma x(i,j) \phi_{i,j} \phi_{i,j} \perp \phi_{k,l}$$

Figure 14:
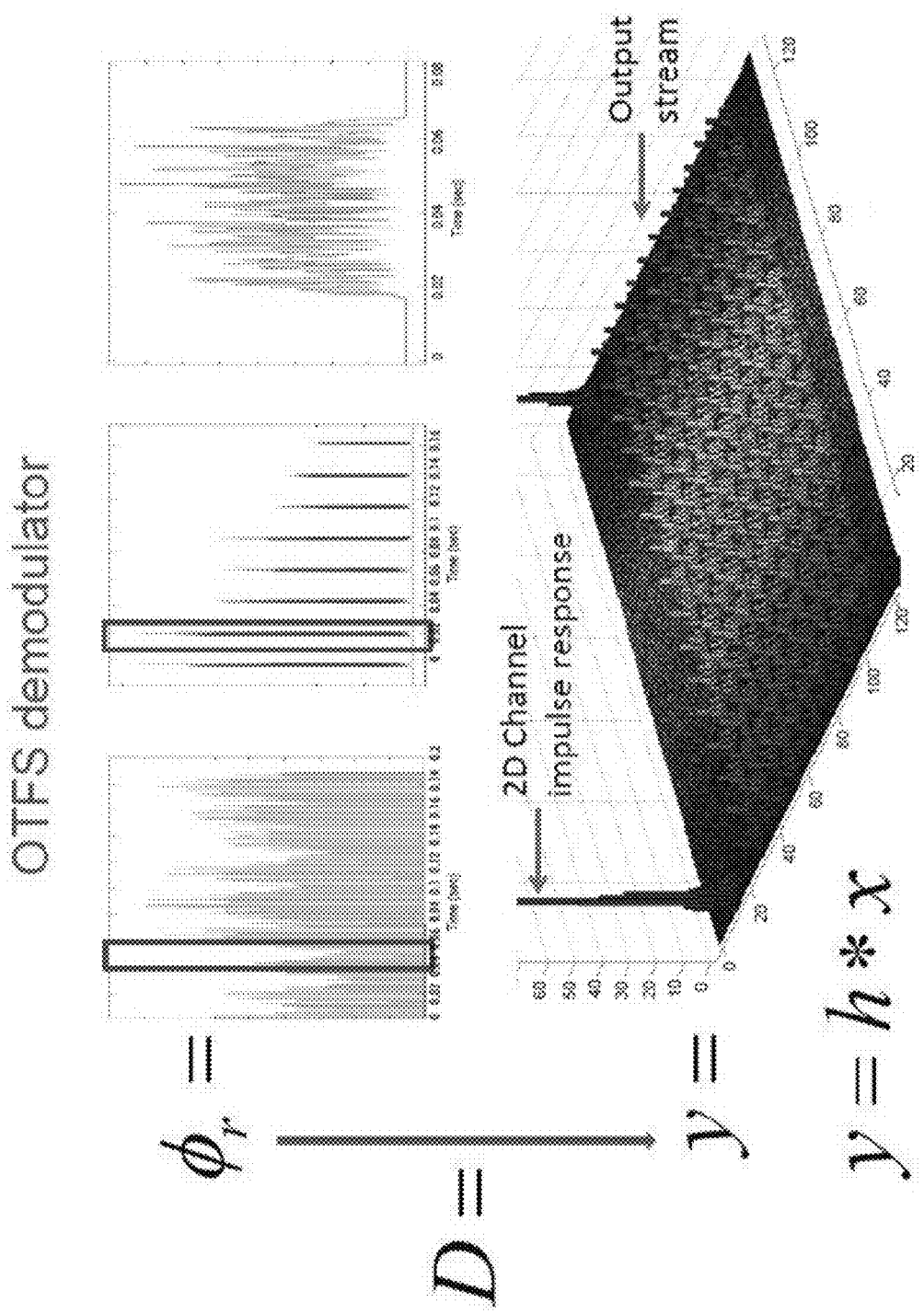
FIG. 14 illustrates operation of an OTFS demodulator in transforming a received waveform into a two-dimensional time-frequency matrix in accordance with an orthogonal map.

Referring to FIG. 14, the demodulator 1220 transforms the received waveform to a two-dimensional TF matrix in accordance with an orthogonal map in order to generate an output stream:

$$\phi_r \mapsto y = D(\phi_r)$$

In one embodiment the OTFS transceiver 1200 may be characterized by a number of variable parameters including, for example, delay resolution (i.e., digital time "tick" or clock increment), Doppler resolution, processing gain factor (block size) and orthonormal basis function. Each of these variable parameters may be represented as follows.

Delay Resolution (Digital Time Tick):

$$\Delta T \in R^{>0} \left( \Delta T = \frac{1}{Bw} \right)$$

Doppler Resolution:

$$\Delta F \in R^{>0} \left( \Delta F = \frac{1}{Trans} \right)$$

Processing Gain Factor (Block Size):

$$N > 0$$

Orthonormal Basis of $C^{N \times 1}$ (Spectral Shapes):

$$U = \{u_1, u_2, \ldots, u_N\}$$

Figure 15:
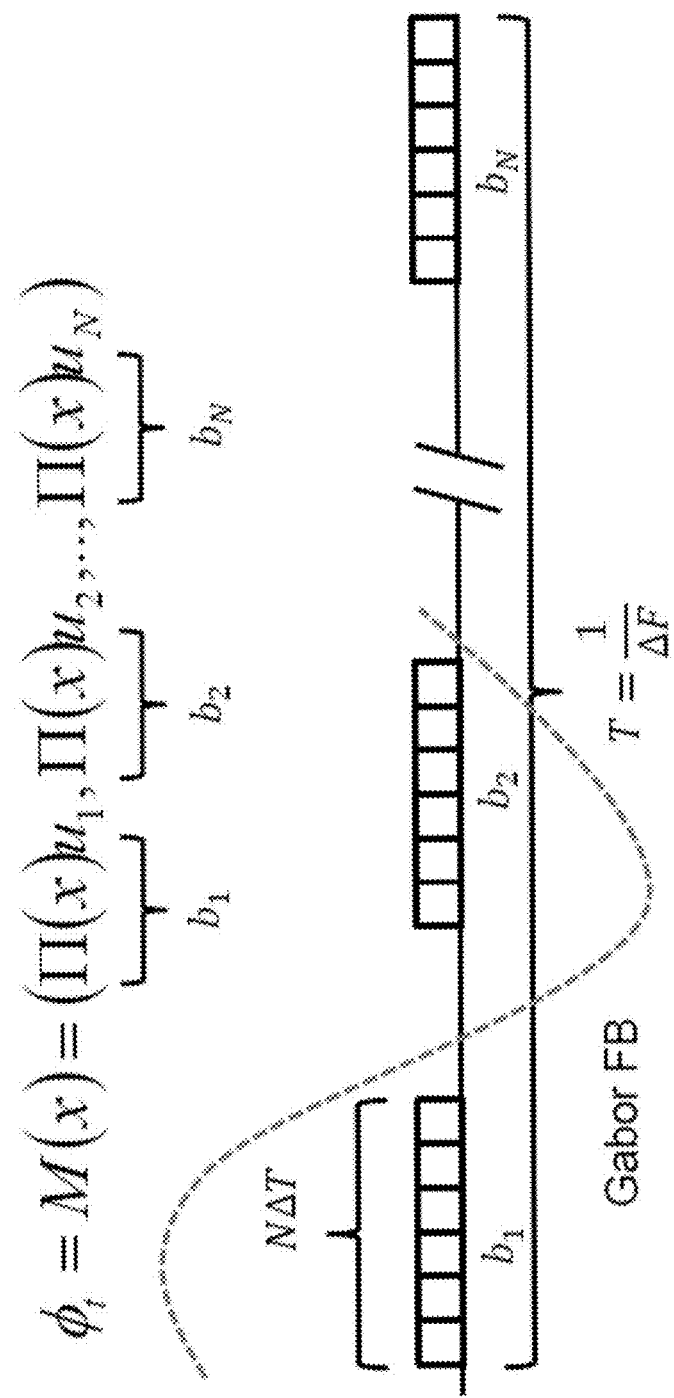
FIG. 15 illustratively represents a pulse train included within a pulse waveform produced by an OTFS modulator.

As is illustrated by FIG. 12, during operation the modulator 1210 takes a TF matrix $x \in C^{N \times N}$ and transforms it into a pulse waveform. In one embodiment the pulse waveform comprises a pulse train defined in terms of the Heisenberg representation and the spectral shapes:

$$\phi_t = M(x) = (\underbrace{\Pi(x)u_1}_{b_1}, \underbrace{\Pi(x)u_2}_{b_2}, \ldots, \underbrace{\Pi(x)u_N}_{b_N})$$

where $b_1, b_2 \ldots b_N$ are illustrated in FIG. 15 and where, in accordance with the Heisenberg relation:

$$\pi(h*x) = \pi(h) \cdot \pi(x) \text{ in particular:}$$

$$\pi(\delta_{(\tau,o)}*x) = L_\tau \cdot \pi(x)$$

$$\pi(\delta_{(0,w)}*x) = M_w \cdot \pi(x)$$

The Heisenberg representation provides that:

$$\Pi: C^{N \times N} \xrightarrow{*} C^{N \times N} \text{ given by:}$$

$$\Pi(x) = \sum_{f,w=0}^{N-1} x(\tau, w) M_w L_t, \ x \in C^{N \times N}$$

where $L_t$ and $M_w$ are respectively representative of cyclic time and frequency shifts and may be represented as:

$$L_t \in C^{N \times N}: L_t(\varphi)(t) = \varphi(t + \tau), \tau = 0, \ldots, N - 1$$

$$M_w \in C^{N \times N}: M_w(\varphi)(t) = e^{\frac{j2\pi}{N}wt}\varphi(t), w = 0, \ldots, N - 1$$

The demodulator 1220 takes a received waveform and transforms it into a TF matrix $y \in C^{N \times N}$ defined in terms of the Wigner transform and the spectral shapes:

$$\phi_r = (b_1, b_2, \ldots, b_N)$$

$$y(\tau, w) = D(\phi_r)(\tau, w) = \overbrace{\frac{1}{N}\sum_{n=1}^{N} \langle M_w L_\tau u_n, b_n \rangle}^{\text{Wigner transform}}$$

Main property of M and D (Stone von Neumann theorem):

$$D(h^{\circ}M(x))=h*x \text{ where:}$$

$$h(\tau,w) \approx a(\tau \Delta T, w \Delta F)$$

Figure 16:
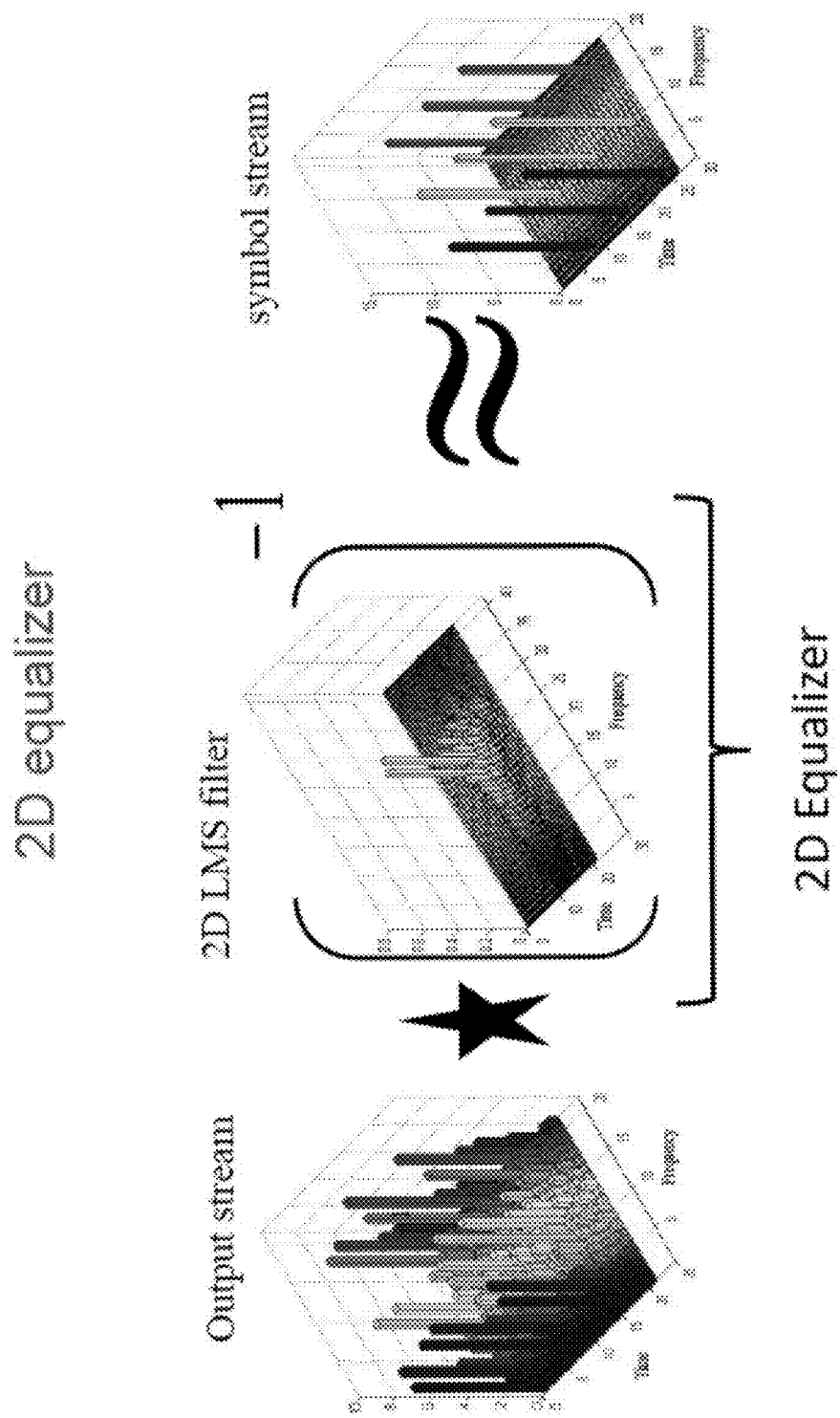
FIG. 16 depicts a two-dimensional decision feedback equalizer configured to perform a least means square (LMS) equalization procedure.

As illustrated in FIG. 16, the equalizer 1230 may be implemented as a two-dimensional decision feedback equalizer configured to perform a least means square (LMS) equalization procedure such that:

$$y \mapsto \hat{x}$$

Transmitter Grid and Receiver Bin Structure

Figure 17A:
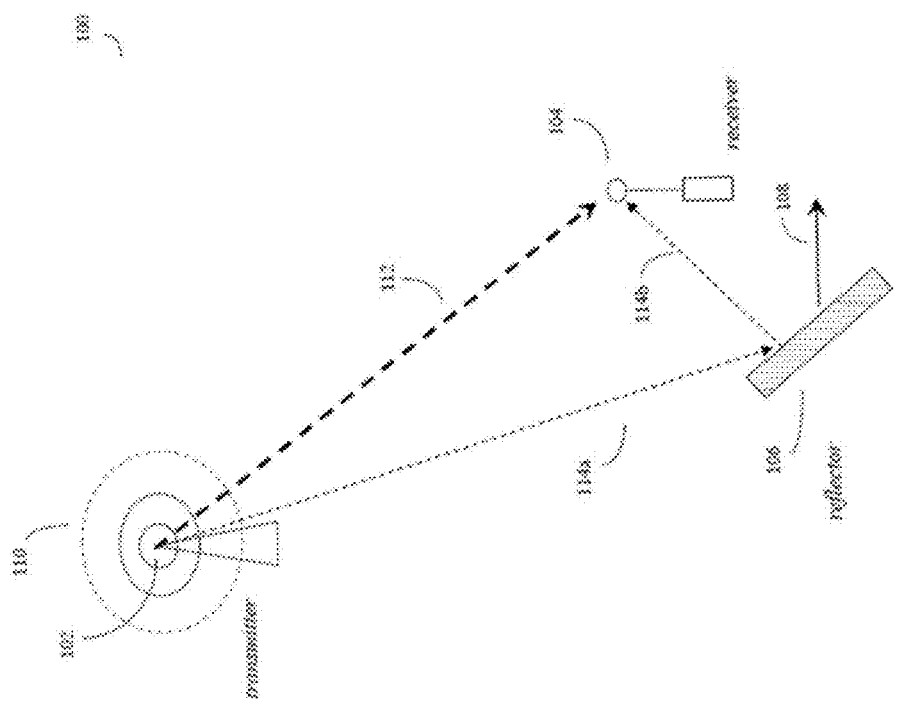
FIGS. 17A-17D depict an OTFS transmitter and receiver and the operation of each with respect to associated time-frequency grids.
Figure 17B:
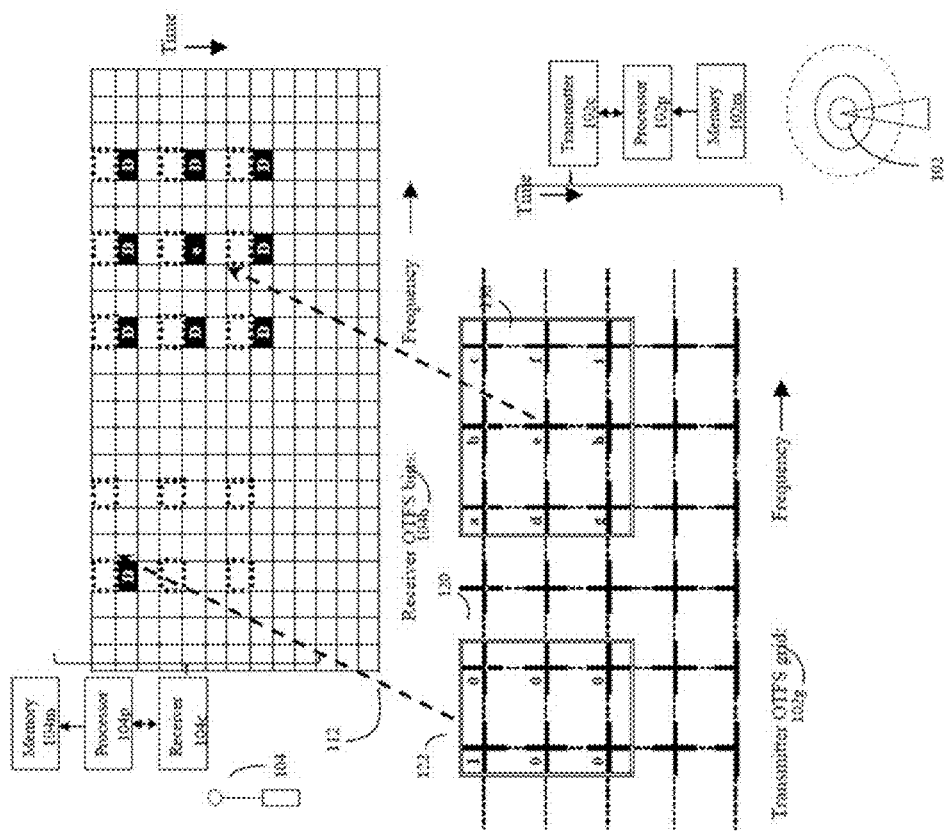
Figure 17C:
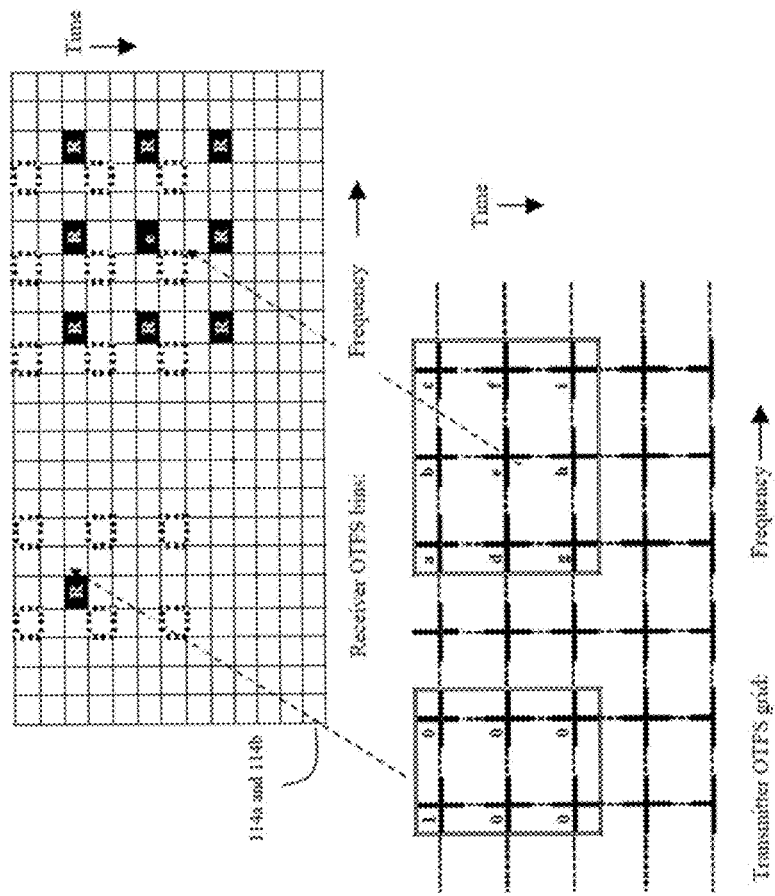
Figure 17D:
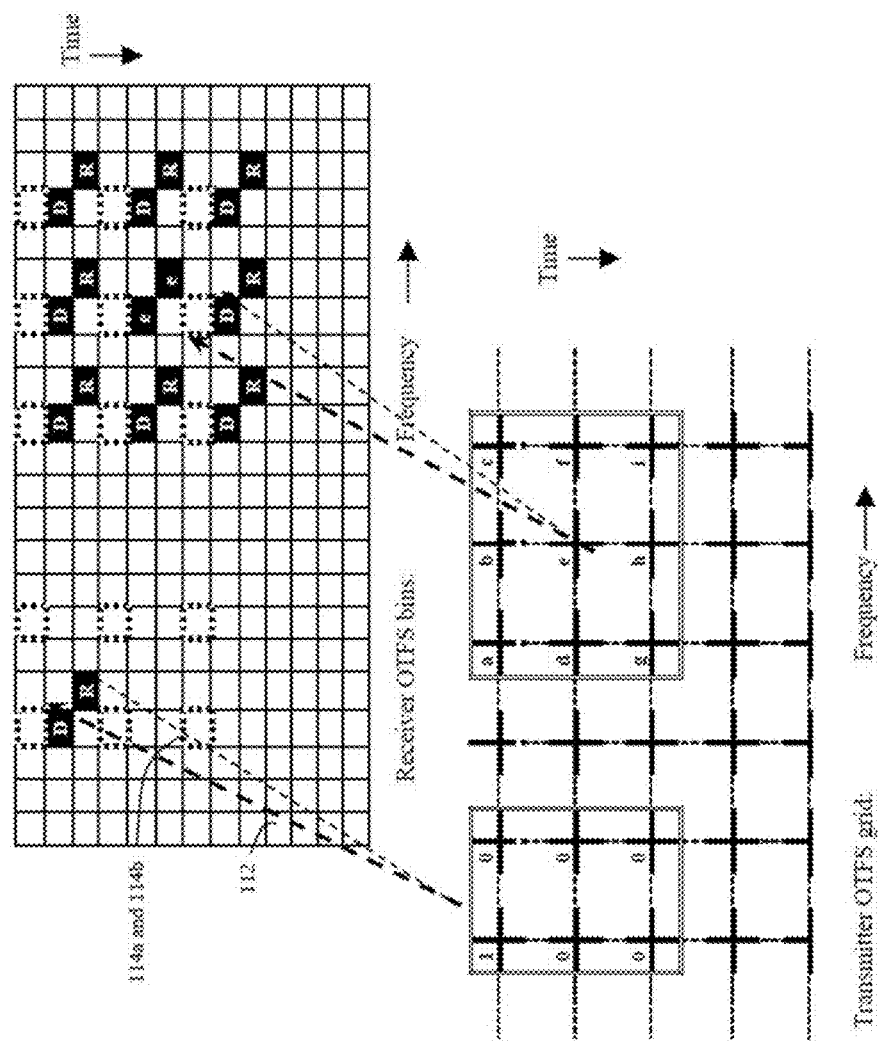

Attention is now directed to FIGS. 17A-17D, which depict an OTFS transmitter 102 and receiver 104 to which reference will be made in describing the transmission and reception of OTFS waveforms. More specifically, FIGS. 17B-17D illustrate the transmission and reception of OTFS waveforms relative to a time-frequency transmitter grid or series of bins and a corresponding time-frequency receiver grid or series of bins. As will be discussed below, the receiver 104 will generally operate with respect to a time-frequency receive grid of a finer mesh than that of the time-frequency transmit grid associated with the transmitter 102.

Turning now to FIG. 17A, the transmitter 102 and receiver 104 are separated by an impaired wireless data channel 100 including one or more reflectors 106. As shown, the reflectors 106 may reflect or otherwise impair waveforms (112, 114a, 114b) as they travel through the data channel 100. These reflectors may be inherently represented by the two-dimensional (2D) channel state of the channel 100 (see, e.g., the finite channel $h_{eqv,f}$ of FIG. 18).

In one embodiment the transmitter 102 includes a transmitter processor 102p to package input data into at least one N×M array of data symbols. An encoding process is then used to transmit this array of data symbols in accordance with the OTFS modulation techniques described herein. The transmitted OTFS waveforms are received by a receiver 104, which includes a receiver processor 104p. In one embodiment the receiver processor 104p utilizes information pertaining to the 2D state of the channel 100 to enable these OTFS waveforms to be decoded and recover the transmitted data symbols. Specifically, the receiver processor 104p may use an inverse of the OTFS encoding process to decode and extract this plurality of data symbols. Alternatively the correction of signals for data channel impairments can be done after the receiver has decoded and extracted the plurality of data symbols.

In some embodiments OTFS data transmission may be implemented by transforming the input N×M array of data symbols into at least one block or array of filtered OFDM symbols. This can be done, for example, using one dimensional Fourier transforms and a filtering process or algorithm. This block or array of filtered OFDM symbols may then be transformed into at least one block or array of OFTS symbols using various types of two dimensional Fourier transforms. These results will typically be stored in transmitter memory 102m. The stored results can then be communicated over wireless frequency sub-bands by various methods. For example, in one embodiment a transmitter 102c that employs a series of M narrow-band filter banks may be utilized. In this implementation the transmitter 102c produces a series of M mutually orthogonal waveforms transmitted over at least N time intervals.

In one embodiment gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

Alternatively, the OTFS encoding process may encode the N×M array of data symbols onto a manifold compatible with symplectic analysis. The symbols may be distributed over a column time axis of length T and row frequency axis of length F, thereby producing at least one information manifold for storage in transmitter memory 102m.

The information manifold effectively holds information corresponding to the input data symbols in a form enabling them to be subsequently transformed in accordance with the desired OTFS transformation operation such as, for example, a symplectic 2D Fourier transform, a discrete symplectic 2D Fourier transform, a finite symplectic Fourier transform, and the like. In certain embodiments the data symbols may also be spread prior to being held within an information manifold.

The OTFS processor 102p may then transform the information manifold according to a 2D symplectic Fourier transform. This transformation may be effected using any of the previously discussed symplectic 2D Fourier transforms, discrete symplectic 2D Fourier transforms, and finite symplectic Fourier transforms. This operation produces at least one 2D Fourier transformed information manifold, which may be stored in transmitter memory 102m.

The OTFS transmitter 102c will typically transmit this at least one 2D Fourier transformed information manifold as a series of "M" simultaneous narrow band waveforms, each series over consecutive time intervals, until the entire 2D Fourier transformed information manifold has been transmitted. For example, the transmitter processor 102p can operate, often on a one column at a time basis, over all frequencies and times of this 2D Fourier transformed information manifold. The transmitter processor 102p can select a given column at location n (where n can vary from 1 to N)

and transmit a column with a width according to a time slice of duration proportional to Tµ, where µ=1/N. Those frequencies in the column slice of this 2D Fourier transformed information manifold (e.g. frequencies corresponding to this transmitting time slice) may then be passed through a bank of at least M different, nonoverlapping, narrow-band frequency filters. This produces M mutually orthogonal waveforms. The processor 102p can then cause these resulting filtered waveforms to be transmitted, over different transmitted time intervals (e.g. one column at a time), as a plurality of at least M mutually orthogonal waveforms until an entire 2D Fourier transformed information manifold has been transmitted.

In one embodiment gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

Each OTFS receiver 104 may then receive a channel-convoluted version of the 2D Fourier transformed information manifold transmitted by the transmitter 102. Due to distortions introduced by the channel 100, the M narrow band waveforms originally transmitted at M original frequencies may now comprise more than M narrow band waveforms at a different range of frequencies. Moreover, due to transmitted OTFS waveforms impinging various reflectors 106, the originally transmitted signals and reflections thereof may be received at different times. As a consequence, each receiver 104 will generally supersample or oversample the various received waveforms on a time-frequency grid having a finer mesh than that associated with the transmitter 102. This oversampling process is represented by FIGS. 17B-17D, which depict a receiver time-frequency grid having smaller time and frequency increments than the transmitter OTFS grid.

Each OTFS receiver 104 operates to receive the transmitted 2D Fourier transformed information manifold over time slices having durations that are generally less than or equal to the transmission time intervals employed by the transmitter 102. In one embodiment the receiver 104 analyzes the received waveforms using a receiving bank of at least M different, non-overlapping, narrow-band frequency filters. The receiver will then generally store the resoling approximation (channel convoluted version) of the originally transmitted 2D Fourier transformed information manifold in receiver memory 104m.

Once the waveforms transmitted by the transmitter 102 have been received, the receiver 104 then corrects for the convolution effect of the channel 100 in order to facilitate recovery of an estimate of the originally transmitted data symbols. The receiver 104 may effect these corrections in a number of ways.

For example, the receiver 104 may use an inverse of the 2D symplectic Fourier transform used by the transmitter 102 to transform the received waveforms into an initial approximation of the information manifold originally transmitted. Alternatively, the receiver 104 may first use information pertaining to the 2D channel state to correct the channel-convoluted approximation of the transmitted 2D Fourier transformed information manifold (stored in receiver memory). Following this correction the receiver 104 may then use the inverse of the 2D symplectic Fourier transform employed at the transmitter 102 to generate a received information manifold and subsequently extract estimated data symbols.

Although the OTFS methods described herein inherently spread any given data symbol over the entire time-frequency plane associated with a transmitter, in some embodiments it may be useful to implement an additional spreading operation to insure that the transmitted data symbols are uniformly distributed. This spreading operation may be carried out by the transmitter processor 102p either prior to or after encoding the input NxM 2D array of data symbols onto the symplectic analysis compatible manifold. A number of spreading functions such as, for example, a 2D chirp operation, may be used for this purpose. In the event such a spreading operation is implemented at the transmitter 102, the receiver 104 will utilize an inverse of this spreading operation in order to decode and extract the data symbols from the various received information manifolds.

Figure 19:
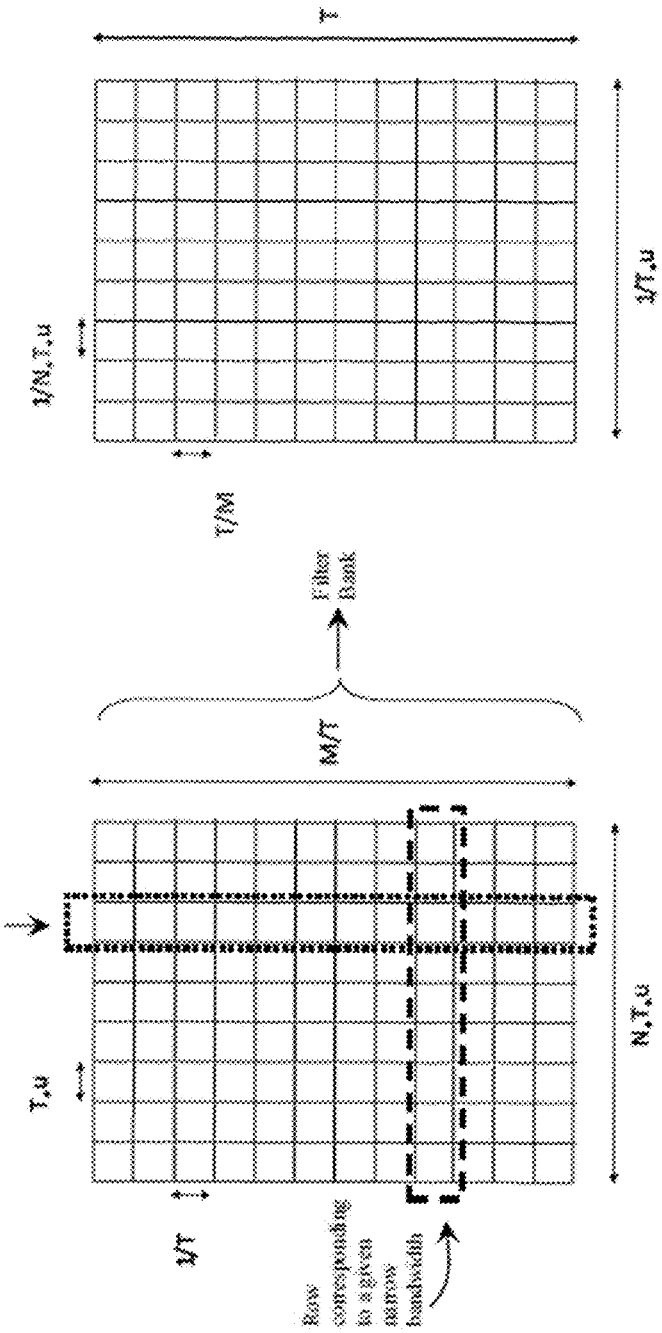
FIG. 19 illustrates transmission of a 2D Fourier transformed information manifold represented by an N×M structure over M frequency bands during N time periods of duration Tμ.

FIG. 19 illustrates transmission of a 2D Fourier transformed information manifold represented by an N×M structure over M frequency bands during N time periods of duration Tµ. In this example, each of the M frequency bands is represented by a given row and each different time period is represented by a given column. In the embodiment of FIG. 19 it is assumed that the OTFS transmitter is configured to transmit OTFS signals during without guard intervals over the allocated bandwidth, which encompasses the M frequency bands. The bandwidth ($\omega_0$) of each of the M frequency bands is, is 1/Tµ. Accordingly, if it is desired to transmit all N columns of information over a minimum time interval of N*Tµ, then M must have a bandwidth no larger than 1/Tµ and the bandwidth used by all M filtered OTFS frequency bands cannot exceed M/T, where T is the total amount of time used to transmit all N columns of the 2D Fourier transformed information manifold.

At the receiver 104, the various 2D Fourier transformed information manifolds may be received using banks of different, nonoverlapping, narrow-band frequency filters that are generally similar to those used by the transmitter 102. Again, the receiver time slices and receiving banks of filters will generally operate with finer granularity; that is, the receiver will typically operate over smaller frequency bandwidths, and shorter time slices, but over a typically broader total range of frequencies and times. Thus the receiver bin structure will preferably oversample the corresponding transmitting time slices and transmitting banks of different, non-overlapping, narrow-band frequency filters previously used by the transmitter.

As may be appreciated with reference to FIG. 19, the OTFS transmitter will typically transmit the resulting filtered waveforms (in this example over all rows and successive columns), until the entire 2D Fourier transformed information manifold has been transmitted. However the transmitter can either transmit the successive columns (time slices) continuously and contiguously—that is without any time gaps in-between, as more of a series of continuous longer duration waveforms, or alternatively the transmitter can put some time spacing between the various successive columns, thus creating a more obvious series of waveform bursts.

Stated differently, the transmitter can transmit the resulting filtered waveforms as either: 1) a plurality of at least M simultaneously transmitted mutually orthogonal waveforms over either different consecutive transmitted time intervals; or 2) a plurality OTFS data or OTFS pilot bursts comprising at least M simultaneously transmitted mutually orthogonal waveform bursts over different transmitted intervals separated by at least one spacer time interval.

Figure 20:
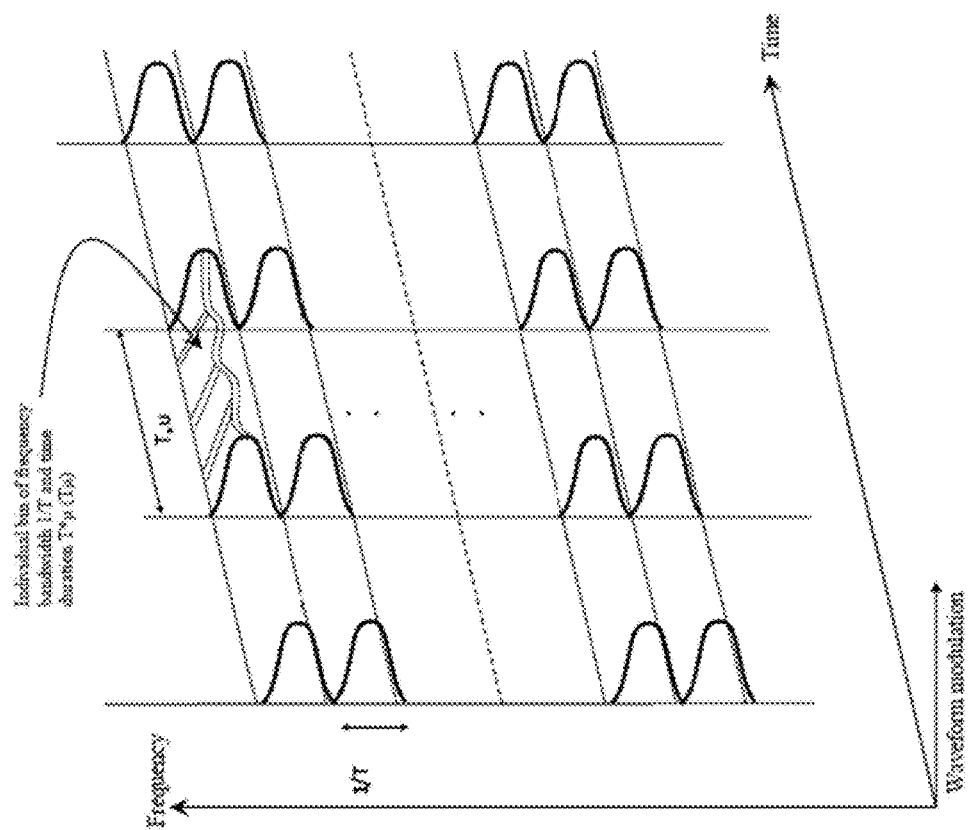
FIG. 20 shows an example of M filtered OTFS frequency bands being simultaneously transmitted according to various smaller time slices Tμ.

FIG. 20 shows an example of the M filtered OTFS frequency bands being simultaneously transmitted according to various smaller time slices $T\mu$. The repeating curved shapes show the center frequency for each filtered band according to $g(t \cdot e^{jk\omega_0})$. One of the transmitted bins of frequency bandwidth, which is of size $1/T$ and time duration $T*\mu$, is shown in more detail. Again, as previously discussed, in a preferred embodiment the OTFS receiver will use oversampling, and thus use finer granularity bins that nonetheless may extend over a broader range of times and frequencies so as to catch signals with high degrees of delay or Doppler frequency shift.

Stated differently, in some embodiments, the non-overlapping, narrow-band frequency filters used at the transmitter may be configured to pass frequencies from the various 2D Fourier transformed Information manifolds that are proportional to a filter function $g(t \cdot e^{jk\omega_0})$, where j is the square root of $-1$, t corresponds to a given time slice of duration $T\mu$ chosen from a 2D Fourier transformed information manifold, and k corresponds to a given row position in a given 2D Fourier transformed information manifold, where k varies between 1 and M. In this example, the bandwidth, $\omega_0$, in frequency units Hz, can be proportional to $1/T$, and $T=M/$(allowed wireless bandwidth).

As may be appreciated from FIGS. 19 and 20, the various 2D Fourier transformed information manifolds can have overall dimensions NT according to a time axis and M/T according to a frequency axis, and each "cell" or "bin" in the various 2D Fourier transformed information manifold may have overall dimensions proportional to $T\mu$ according to a time axis and $1/T$ according to a frequency axis.

Figure 21:
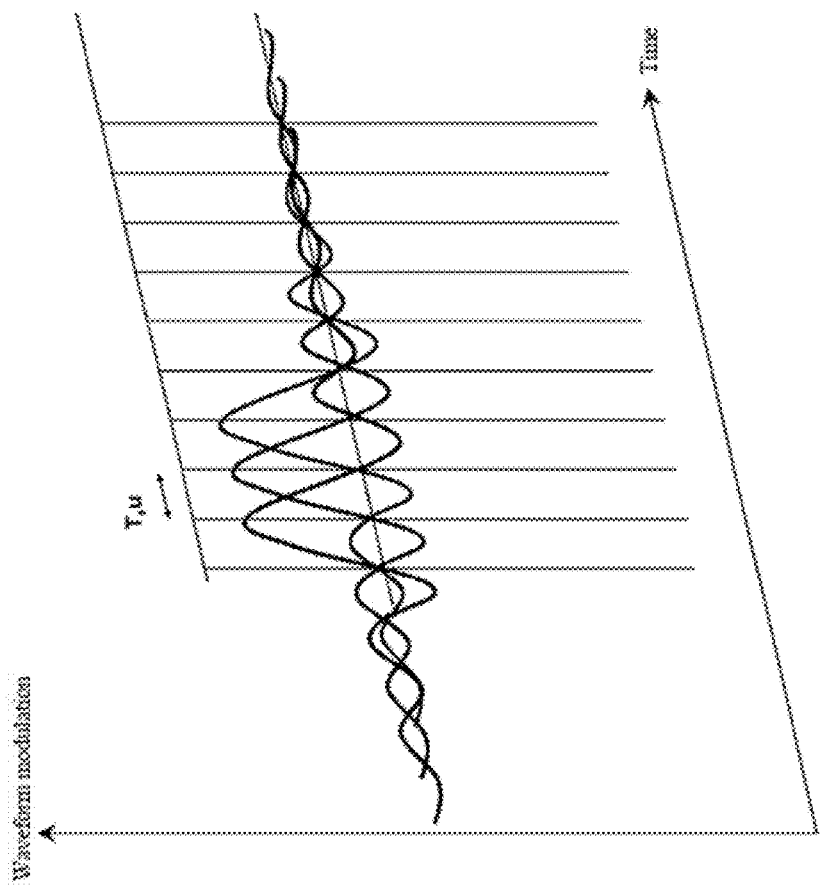
FIG. 21 provides an additional example of OTFS waveforms being transmitted according to various smaller time slices Tμ.

FIG. 21 provides another example of OTFS waveforms being transmitted according to various smaller time slices $T\mu$. In the illustration of FIG. 21 the amplitude or extent of modulation of the various waveforms as a function of time is also shown.

In some embodiments it may be useful to modulate the transmitted wireless OTFS waveforms using an underlying modulation signal that allows the receiver to distinguish where, on the original 2D time and frequency grid, a given received signal originated. This may, for example, assist an OTFS receiver in distinguishing the various types of received signals, and in distinguishing direct signals from various time delayed and/or frequency shifted reflected signals. In these embodiments grid, bin, or lattice locations of the originally transmitted OTFS waveforms may be distinguished by determining time and frequency related parameters of the received waveforms. For example, in the presently discussed "symplectic" implementations, where each "row" of the 2D Fourier transformed information manifold is passed through a narrow band filter that operates according to parameters such as $g(t \cdot e^{jk\omega_0})$, the "$k\omega_0$" term may enable the receiver to distinguish any given incoming OTFS waveform by its originating "column" location "t". In this case the receiver should also be able to determine the bin (grid, lattice) location of the various received waveforms by determining both the t (time related) and k (frequency related) values of the various received waveforms. These values may then be used during subsequent deconvolution of the received signals.

If further distinguishability of the bin (grid lattice) originating time and frequency origins of the received OTFS signals is desired, then an additional time and/or frequency varying modulation scheme may also be imposed on the OTFS signals, prior to transmission, to allow the OTFS receiver to further distinguish the bin (grid, lattice) origin of the various received signals.

In alternative embodiments either the information manifold or the 2D Fourier transformed information manifolds may be sampled and modulated using Dirac comb methods. The Dirac combs utilized by these methods may be, for example, a periodic tempered distribution constructed from Dirac delta functions.

Figure 22:
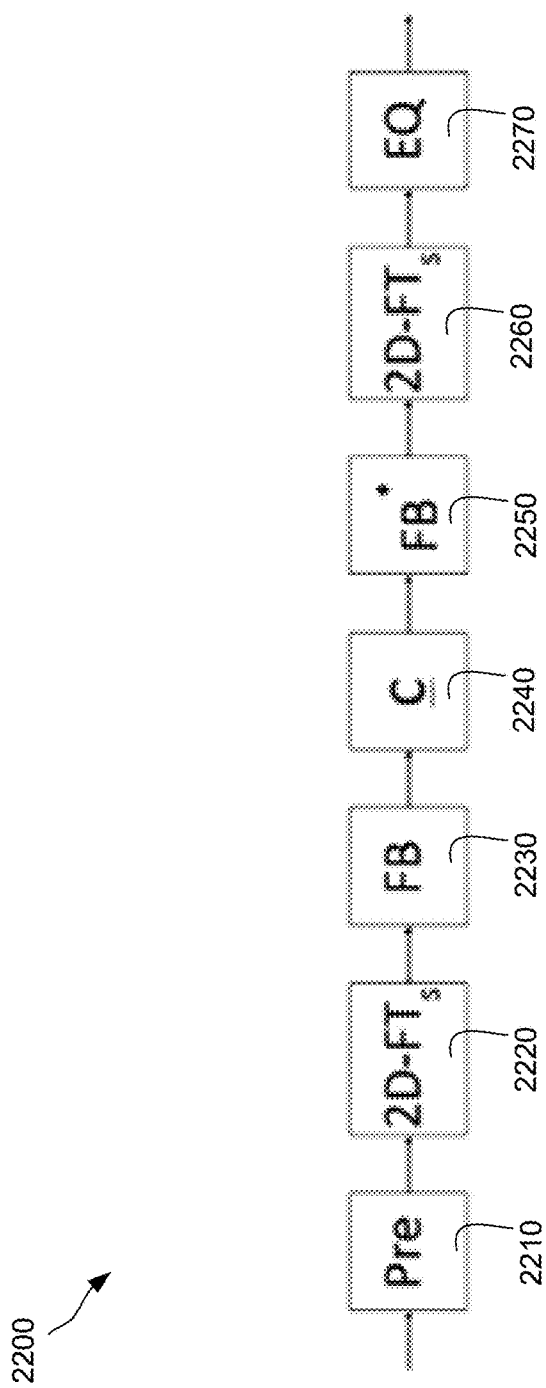
FIG. 22 provides a block diagrammatic representation of an exemplary process of OTFS transmission and reception.

Attention is now directed to FIG. 22, which provides a block diagrammatic representation of an exemplary process 2200 of OTFS transmission and reception in accordance with the present disclosure. The process 2200 begins with the packaging of data for transmission and its optional precoding to correct for known channel impairments (stage 2210). This material is then processed by a 2D Fourier Transform (such as a symplectic Fourier transform, discrete symplectic Fourier transform, or finite symplectic Fourier transform) (stage 2220). Following this processing the results are then passed through a filter bank (FB) and transmitted over a series of time intervals $T\mu$ (stage 2230). The transmitted wireless OTFS waveforms then pass through the communications or data channel (C), where they are subject to various distortions and signal impairments (stage 2240). At the receiver, the received waveforms are received according to a filter bank at various time intervals (stage 2250). The receiver filter bank (FB*) may be an oversampled filter bank (FB*) operating according to oversampled time durations that may be a fraction of the original time intervals $T\mu$. This oversampling enables the received signals to be better analyzed for channel caused time delays and frequency shifts at a high degree of resolution. At a stage 2260 the received material is analyzed by an inverse 2D Fourier Transform (2D-FT$_s$) (which again may be an inverse symplectic Fourier transform, inverse discrete symplectic Fourier transform, or inverse finite symplectic Fourier transform). The results may then be further corrected for channel distortions using, for example, 2D channel state information (stage 2270). In other embodiments stage 2270 may precede stage 2260.

Further Mathematical Characterization of OTFS Modulation and Derivation of the Two-Dimensional (2D) Channel Model In what follows we further develop the OTFS communication paradigm focusing on the central role played by the Heisenberg representation and the two dimensional symplectic Fourier transform. A principal technical result of this development is a rigorous derivation of the OTFS two-dimensional channel model.

0. Introduction

Orthogonal time frequency space is a novel modulation scheme capable of being implemented by communication transceivers that converts the dynamic one dimensional wireless medium into a static two dimensional local ISI channel by putting the time and frequency dimensions on an equal footing. Among the primary benefits of an OTFS transceiver relative to a conventional transceiver are the following:

1. Fading. Elimination of fading both time and frequency selective.
2. Diversity. Extraction of all diversity branches in the channel.
3. Stationarity. All symbols experience the same distortion.
4. CSI. Perfect and efficient channel state information (CSI).

In a sense, the OTFS transceiver establishes a virtual wire through a communiation medium, thus allowing the application of conventional wired DSP technologies in the wireless domain. Embodiments of the OTFS transceiver are based on principles from representation theory, generalizing constructions from classical Fourier theory. On the operational level, OTFS may be roughly characterized as an application of the two dimensional Fourier transform to a block of filtered OFDM symbols. OTFS is a true two dimensional time-frequency modulation, and may incorporate both two dimensional time-frequency filtering and two dimensional equalization techniques. In what follows we provide a formal mathematical development of the OTFS transceiver, focusing on a rigorous derivation of the two dimensional channel model.

OTFS and Lattices

We first choose an undersampled time-frequency lattice, that is, a two dimensional lattice of density smaller or equal than 1. The undersampling condition is essential for perfect reconstruction, however, it seems to limit the delay-Doppler resolution of the channel acquisition. In contrast, radar theory amounts to choosing an oversampled time frequency lattice of density greater or equal than 1 where the oversampling condition is essential for maximizing the delay-Doppler resolution of target measurement. As it turns out, the symplectic (two dimensional) Fourier transform intertwines between communication and radar lattices. The OTFS communication paradigm is to multiplex information symbols on an oversampled high resolution radar lattice and use the symplectic Fourier transform together with two dimensional filtering to convert back to communication coordinates. This allows OTFS to reap the benefits of both worlds—high resolution delay-Doppler channel state measurement without sacrificing spectral efficiency. In particular, the OTFS channel model may be thought of as a high resolution delay-Doppler radar image of the wireless medium.

The Wireless Channel

In order to understand OTFS, it is beneficial to understand the wireless channel as a mathematical object. Let $H=L^2(R)$ denote the vector space of "physical" waveforms defined on the time domain. The physics of the wireless medium is governed by the phenomena of multipath reflection, that is, the transmitted signal is propagating through the atmosphere and reflected from various objects in the surrounding. Some of the objects, possibly including the transmitter and the receiver, are moving at a non-zero velocity. Consequently, (under some mild "narrow band" assumption) the received signal is a superposition of time delays and Doppler shifts of the transmitted signal where the delay in time is caused by the excess distance transversed by the reflected waveform and the Doppler shift is caused by the relative velocity between the reflector and the transmitting and/or receiving antennas. Mathematically, this amounts to the fact that the wireless channel can be expressed as a linear transformation $C:H \to H$ realized as a weighted superposition of multitude of time delays and Doppler shifts, namely:

$$C(\varphi)(t) = \int\int_{\tau,v} h(\tau,v) e^{2\pi i v(t-\tau)} \varphi(t-\tau) d\tau dv, \qquad (0.1)$$

for every transmit waveform $\varphi \in H$. From Equation (0.1) one can see that the channel C is determined by the function h that depends on two variables $\tau$ and v, referred to as delay and Doppler. The pair $(\tau,v)$ can be viewed as a point in the plane $V=R^2$, referred to as the delay Doppler plane. Consequently, h is a kind of a two dimensional (delay Doppler) impulse response characterizing the wireless channel. However, one should keep in mind that this terminology is misleading since the action of h given by (0.1) is not a convolution action.

Fading

One basic physical phenomena characteristic to the wireless channel is fading. The phenomena of fading corresponds to local attenuation in the energy profile of the received signal as measured over a specific dimension. It is customary to consider two kind of fadings: time selective fading and frequency selective fading. The first is caused by destructive superposition of Doppler shifts and the second is caused by destructive superposition of time delays. Since the wireless channel consists of combination of both time delays and Doppler shifts it exhibits both types of fading. Mitigating the fading phenomena is a significant motivation behind the development of the OTFS transceiver.

The Heisenberg Representation

One key observation is that the delay Doppler channel representation given in Equation (0.1) is the application of a fundamental mathematical transform, called the Heisenberg representation, transforming between functions on the delay Doppler plane V and linear operators on the signal space H. To see this, let us denote by $L_\tau$ and $M_v$ are the operations of time delay by $\tau$ and Doppler shift by v respectively, that is:

$$L_\tau(\varphi)(t) = \varphi(t-\tau),$$

$$M_v(\varphi)(t) = e^{2\pi i v t} \varphi(t),$$

for every $\varphi \in H$. Using this terminology, we can rewrite channel equation (0.1) in the following form:

$$C(\varphi)(t) = \int\int_{\tau,v} h(\tau,v) L_\tau M_v(\varphi) d\tau dv \qquad (0.2)$$

$$= \left( \int\int_{\tau,v} h(\tau,v) L_\tau M_v d\tau dv \right)(\varphi).$$

Let us define the Heisenberg representation to be the transform taking a function $a:V \to C$ to the linear operator $\pi(a):H \to H$, given by:

$$\Pi(a) = \int\int_{\tau,v} a(\tau,v) L_\tau M_v d\tau dv. \qquad (0.3)$$

We refer to the function a as the delay Doppler impulse response of the operator $\pi(a)$. Taking this perspective, we see that the wireless channel is an application of the Heisenberg representation to a specific function h on the delay Doppler plane. This higher level of abstraction establishes the map $\pi$ as the fundamental object underlying wireless communication. In fact, the correspondence $a \leftrightarrow \pi(a)$ generalizes the classical correspondence between a stationary linear system and a one dimensional impulse response to the case of arbitrary time varying systems (also known as linear operators). In this regard, the main property of the Heisenberg representation is that it translates between composition of linear operators and an operation of twisted convolution between the corresponding impulse responses. In more details, if:

$$A=\pi(a),$$

$$B=\pi(b),$$

then we have:

$$A \cdot B = \pi(a^*, b), \quad (0.4)$$

where *, is a non commutative twist of two dimensional convolution. Equation (0.4) is key to the derivation of the two dimensional channel model—the characteristic property of the OTFS transceiver.

The OTFS Transceiver and the 2D Channel Model

The OTFS transceiver provides a mathematical transformation having the effect of converting the fading wireless channel into a stationary two dimensional convolution channel. We refer to this property as the two dimensional channel model.

Formally, the OTFS transceiver may be characterized as a pair of linear transformations (M,D) where M is termed a modulation map and D is termed a demodulation map and is the inverse of M. According to the OTFS paradigm the information bits are encoded as a complex valued function on V which periodic with respect to a lattice $\Lambda^\perp \subset V$ called the reciprocal communication lattice. Note that the term "reciprocal" is used to suggest a type of duality relation between $\Lambda^\perp$ and a more conventional lattice $\Lambda$, called the primal communication lattice. If we denote by $C(V)_{\Lambda^\perp}$ the vector space of $\Lambda^\perp$-periodic functions on V then the OTFS modulation is a linear transformation:

$$M: C(V)_{\Lambda^\perp} \to H. \quad (0.5)$$

Geometrically, one can think of the information as a function on a two dimensional periodic domain (a donut) obtained by folding V with respect to the lattice $\Lambda^\perp$. Respectively, the demodulation map is a linear transformation acting in the opposite direction, namely:

$$D: H \to C(V)_{\Lambda^\perp}. \quad (0.6)$$

The precise mathematical meaning of the two dimensional channel model is that given an information function $x \in C(V)_{\Lambda^\perp}$, we have:

$$D \cdot C \cdot M(x) = c^* x, \quad (0.7)$$

where * stands for periodic convolution on the torus and the function c is a periodization with respect to the reciprocal lattice $\Lambda^\perp$ of the delay Doppler impulse response h of the wireless channel, that is:

$$c = per_{\Lambda^\perp}(h). \quad (0.8)$$

Equations (0.7) and (0.8) encodes the precise manner of interaction between the OTFS transceiver and the wireless channel.

The remainder of this explanation of OTFS method and the OTFS transceiver is organized as follows:

Section 1 discusses several basic mathematical structures associated with the delay Doppler plane V. We begin by introducing the symplectic form on V which is an antisymmetric variant of the more familiar Euclidean form used in classical signal processing. We than discuss lattices which are two dimensional discrete subdomains of V. We focus our attention to the construction of the reciprocal lattice. The reciprocal lattice plays a pivotal role in the definition of the OTFS transceiver. We than proceed to discuss the dual object of a lattice, called a torus, which is a two dimensional periodic domain obtained by folding the plain with respect to a lattice.

Section 2 discusses the symplectic Fourier transform, which is a variant of the two dimensional Fourier transform defined in terms of the symplectic form on V. We discuss three variants of the symplectic Fourier transform: the continuos, the discrete and the finite. We explain the relationships between these variants.

Section 3 discusses the Heisenberg representation and its inverse—the Wigner transform. In a nutshell, the Heisenberg representation is the structure that encodes the precise algebraic relations between the operations of time delay and Doppler shifts. We relate the Wigner transform to the more familiar notions of the ambiguity function and the cross ambiguity function. We conclude with a formulation of the fundamental channel equation.

Section 4 discusses the continuos variant of the OTFS transceiver. We begin by specifying the parameters defining the OTFS transceiver. Then we proceed to define the modulation and demodulation maps. We conclude the section with a derivation of the two dimensional channel model from first principles.

Section 5 discusses the finite variant of the OTFS transceiver. In a nutshell, the finite variant is obtained from the continuos variant by sampling the reciprocal torus along finite uniformly distributed subtorus. We define the finite OTFS modulation and demodulation maps. We then formulate the finite version of the two dimensional channel model, explaining the finite two dimensional impulse response is the restriction of the continuos one to the finite subtorus. We conclude this section with an explicit interpretation of the modulation formula in terms of classical DSP operations.

1. The Delay-Doppler Plane 1.1 the Symplectic Plane

The delay Doppler plane is a two dimensional vector space over the real numbers. Concretely, we take $V = \mathbb{R}^2$ where the first coordinate is delay, denoted by $\tau$ and the second coordinate is Doppler, denoted by $v$. The delay Doppler plane is equipped with an intrinsic geometric structure encoded by a symplectic form (also called symplectic inner product or symplectic pairing). The symplectic form is a pairing $\omega: V \triangle V \to \mathbb{R}$ defined by the determinant formula:

$$\omega(v', v) = -\det\begin{bmatrix} \tau & \tau' \\ v & v' \end{bmatrix} = v\tau' - \tau v', \quad (1.1)$$

where $v = (\tau, v)$ and $v' = (\tau', v')$. Note that the symplectic form, in contrast to its Euclidean counterpart, is anti-symmetric, namely $\omega(v, v') = -\omega(v', v)$ for every $v, v' \in V$. Consequently, the symplectic product of a vector with itself is always equal zero, that is $\omega(v, v) = 0$, for every $v \in V$. As it turns out, the fabric of time and frequency is governed by a symplectic structure.

1.1.1. Functions on the Plane.

We denote by C(V) the vector space of complex valued functions on V. We denote by * the operation of linear convolution of functions on V. Given a pair of functions f, $g \in C(V)$, their convolution is defined by:

$$f * g(v) = \int_{v_1 + v_2 = v} f(v_1) g(v_2) \quad (1.2)$$

$$= \int_{v' \in V} f(v') g(v - v') dv',$$

for every $v \in V$.

1.2 Lattices

Figure 23:
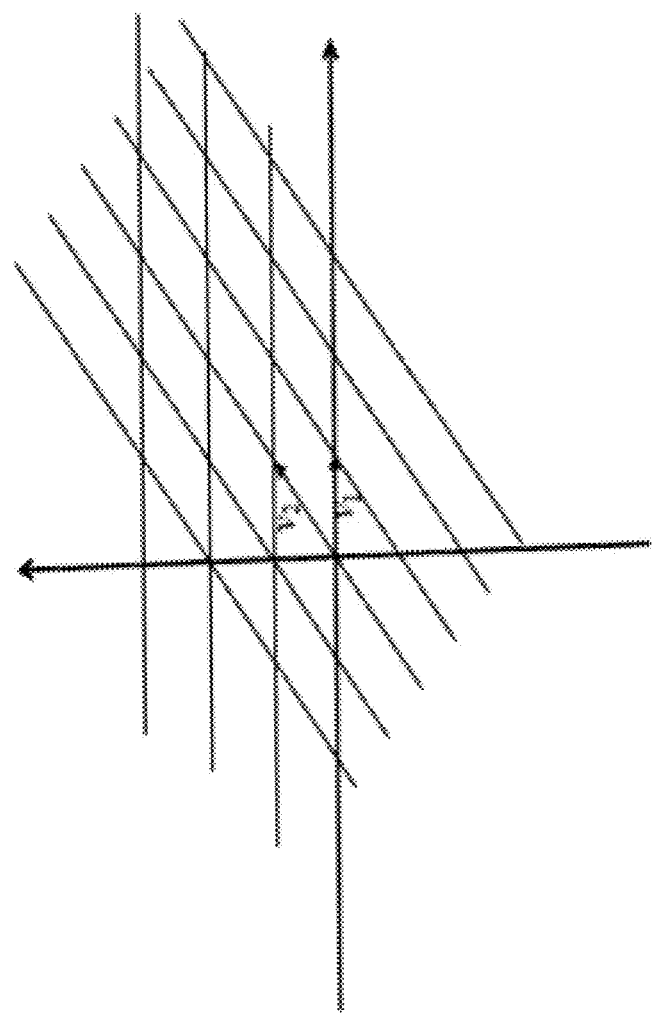
FIG. 23 illustrates represents an exemplary structure of finite OTFS modulation map.

A lattice $\Lambda \subset V$ is a commutative subgroup isomorphic to $\mathbb{Z}^2$ defined as follows:

$$\Lambda = \mathbb{Z}v_1 \oplus \mathbb{Z}v_2$$

$$= \{av_1 + bv_2 : a, b \in \mathbb{Z}\},$$

where $v_1, v_2 \in V$ are linear independent vectors. In words, $\Lambda$ consists of all integral linear combinations of the vectors $v_1$ and $v_2$. See FIG. 23. The vectors $v_1$ and $v_2$ are called generators of the lattice. The volume of $\Lambda$ is, by definition, the volume of a fundamental domain. One can show that:

$$\text{vol}(\Lambda) = |\omega(v_1, v_2)|. \tag{1.3}$$

when $\text{vol}(\Lambda) \geq 1$ the lattice is called undersampled and when $\text{vol}(\Lambda) \leq 1$ the lattice is called oversampled. Finally, in case $\text{vol}(\Lambda) = 1$ the lattice is called critically sampled.

Example 1.1 (Standard Communication Lattice)

Fix parameters $T \geq 0$ and $\mu \geq 1$. Let:

$$\Lambda_{T,\mu} = \mathbb{Z}T\mu \oplus \mathbb{Z}1/T \tag{1.4}$$

$$= \{(K \cdot T\mu + L \cdot 1/T) : K, L \in \mathbb{Z}\}.$$

We have that $\text{vol}(\Lambda_{T,\mu}) = \mu$. We refer to $\Lambda_{T,\mu}$ as the standard communication lattice.

1.2.1 Reciprocal Lattice.

Given a lattice $\Lambda \subset V$, its orthogonal complement lattice is defined by:

$$\Lambda^{\perp} = \{v \in V : \omega(v, \lambda) \in \mathbb{Z} \text{ for every } \lambda \in \Lambda\}. \tag{1.5}$$

In words, $\Lambda^{\perp}$ consists of all vectors in $V$ such that their symplectic pairing with every vector in $\Lambda$ is integral. One can show that $\Lambda^{\perp}$ is indeed a lattice. We refer to $\Lambda^{\perp}$ as the reciprocal lattice of $\Lambda$. One can show that:

$$\text{vol}(\Lambda^{\perp}) = 1/\text{vol}(\Lambda), \tag{1.6}$$

which implies that $\Lambda$ is undersampled if and only if $\Lambda^{\perp}$ is oversampled. This means that reciprocity interchanges between coarse (undersampled) lattices and fine (oversampled) lattices. Another attribute concerns how lattice inclusion behaves under reciprocity. Given a pair consisting of a lattice $\Lambda \subset V$ and a sublattice $\Lambda_0 \subset \Lambda$, one can show that the inclusion between the reciprocals is reversed, that is:

$$\Lambda^{\perp} \subset \Lambda_0^{\perp}. \tag{1.7}$$

Example 1.2 Consider the Standard Communication Lattice $\Lambda_{T,\mu}$

Its reciprocal is given by:

$$(\Lambda_{T,\mu})^{\perp} = \mathbb{Z}T \oplus \mathbb{Z}1/T\mu. \tag{1.8}$$

Figure 24B:
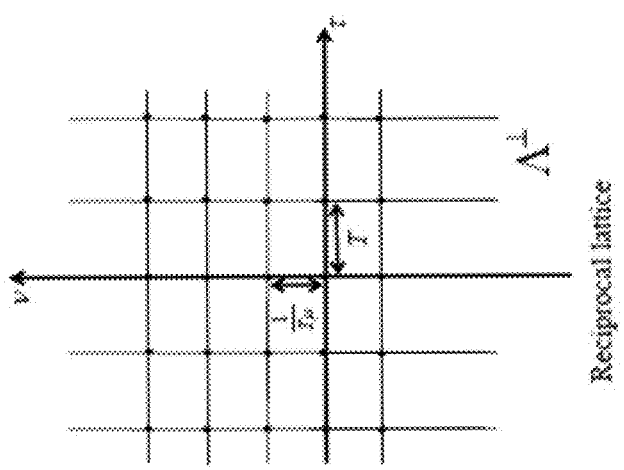
FIGS. 24A and 24B respectively illustrate a standard communication lattice and the reciprocal of the standard communication lattice.
Figure 24A:
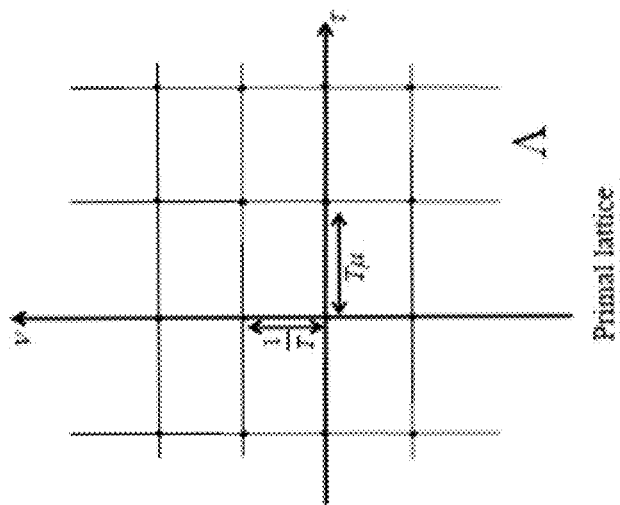

See FIGS. 24A and 24B, which respectively illustrate a standard communication lattice and the reciprocal of the standard communiation lattice. Indeed, we have that:

$$\omega\left(\begin{bmatrix} KT \\ L/T\mu \end{bmatrix}, \begin{bmatrix} K'T\mu \\ L'/T \end{bmatrix}\right) = LK' - KL' \in \mathbb{Z}.$$

Note that $\text{vol}(\Lambda_{T,\mu})^{\perp} = 1/\mu$ which means that as the primal lattice becomes sparser, the reciprocal lattice becomes denser.

1.2.2 Functions on a Lattice.

We denote by $C(\Lambda)$ the vector space of complex valued functions on the lattice. We denote by $R^{\Lambda}: C(V) \to C(\Lambda)$ the canonical restriction map, given by:

$$R^{\Lambda}(f)(\lambda) = f(\lambda),$$

for every $f \in C(V)$ and $\lambda \in \Lambda$. We denote by $*$ the convolution operations between functions on $\Lambda$. Given $f, g \in C(\Lambda)$, their convolutions is defined by:

$$f * g(\lambda) = \sum_{\lambda_1 + \lambda_2 = \lambda} f(\lambda_1) g(\lambda_2) \tag{1.9}$$

$$= \sum_{\lambda' \in \Lambda} f(\lambda') g(\lambda - \lambda'),$$

for every $\lambda \in \Lambda$.

1.3 Tori

A torus $Z$ is a two dimensional periodic domain that constitutes the geometric dual of a lattice $\Lambda$. Formally, $Z$ is the continuos group obtained as the quotient of the vector space $V$ by the lattice $\Lambda$, namely:

$$Z = V/\Lambda. \tag{1.10}$$

In particular, a point $z \in Z$ is by definition a $\Lambda$-coset in $V$, namely:

$$z = v + \Lambda, \tag{1.11}$$

for some $v \in V$. An alternative, albeit less canonical, way to construct $Z$ is to glue opposite faces of a fundamental domain of $\Lambda$. Geometrically, $Z$ has the shape of a "donut" obtained by folding the plane $V$ with respect to the lattice $\Lambda$. We refer to $Z$ as the torus associated with $\Lambda$ or sometimes also as the dual of $\Lambda$. Note that a torus is the two dimensional counterpart of a circle, where the second is obtained by folding the line $R$ with respect to a one dimensional lattice $\mathbb{Z}T \subset R$.

Example 1.3 (Standard Communication Torus)

Figure 25:
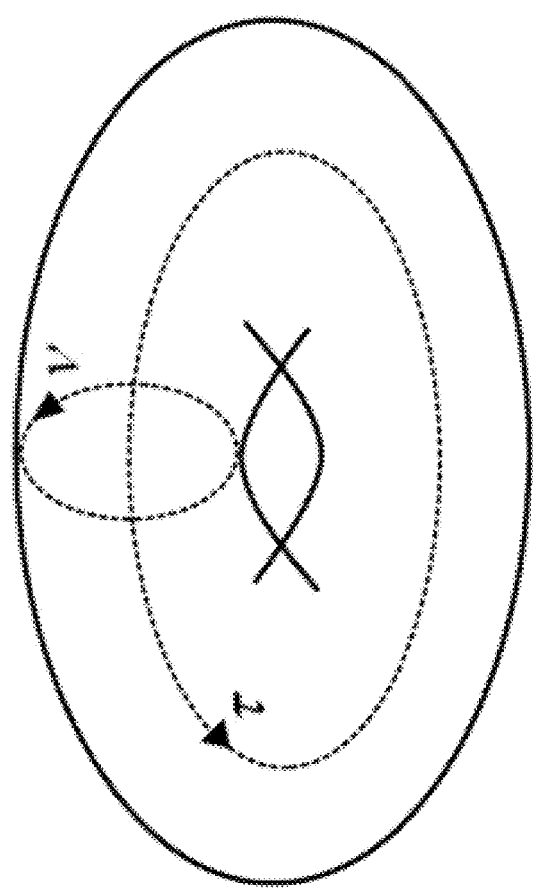
FIG. 25 illustratively represents a standard communication torus.

As shown in FIG. 25, the torus associated with the standard communication lattice $\Lambda_{T,\mu}$ is given by:

$$Z_{T,\mu} = V/\Lambda_{T,\mu} \tag{1.12}$$

$$= R/\mathbb{Z}T\mu \oplus R/\mathbb{Z}1/T$$

Geometrically, $Z_{T,\mu}$ is the Cartesian product of two circles; one of diameter $T\mu$ and the other of diameter $1/T$. We refer to $Z_{T,\mu}$ as the standard communication torus.

1.3.1 Functions on Tori.

We denote by $C(Z)$ the vector space of complex valued functions on a torus $Z = V/\Lambda$. A function on $Z$ is naturally equivalent to a function $f: V \to C$ periodic with respect to translations by elements of the lattice $\Lambda$, that is:

$$f(v + \lambda) = f(v), \tag{1.13}$$

for every $v \in V$ and $\lambda \in \Lambda$. Hence, the vector space of functions on $Z$ coincides with the subspace of $\Lambda$ periodic functions on $V$, that is, $C(Z) = C(V)_{\Lambda}$. Consequently, we have a natural periodization map $R_{\Lambda}: C(V) \to C(Z)$, given by:

$$R_{\Lambda}(f)(v) = \sum_{\lambda \in \Lambda} f(v + \lambda), \tag{1.14}$$

for every f∈C(V) and v∈V. We denote by * the operation of cyclic convolution of functions on Z. Given a pair of functions f,g∈C(Z), their convolution is defined by:

$$f * g(v) = \int_{v_1+v_2=v} f(v_1)g(v_2) \qquad (1.15)$$
$$= \int_{v' \in Z} f(v')g(v-v')dv',$$

for every v∈V. Note that integration over the torus Z amounts to integration over a fundamental domain of the lattice $\Lambda$.

1.4 Finite Tori

A finite torus $Z_0$ is a domain associated with a pair consisting of a lattice $\Lambda \subset V$ and a sublattice $\Lambda_0 \in \Lambda$. Formally, $Z_0$ is the finite group defined by the quotient of the lattice $\Lambda$ by the sublattice $\Lambda_0$, that is:

$$Z_0 = \Lambda/\Lambda_0. \qquad (1.16)$$

In particular, a point $z \in Z_0$ is a $\Lambda_0$-coset in $\Lambda$, namely:

$$z = \lambda + \Lambda_0, \qquad (1.17)$$

for some $\lambda \in \Lambda$. Geometrically, $Z_0$ is a finite uniform sampling of the continuos torus $Z = V/\Lambda_0$ as we have a natural inclusion:

$$\Lambda/\Lambda_0 \circ V/\Lambda_0. \qquad (1.18)$$

Example 1.4 (the Standard Communication Finite Torus)

Consider the standard communication lattice $\Lambda_{T,\mu}$. Fix positive integers $n,m \in \mathbb{N}^{\geq 1}$. Let $(\Lambda_{T,\mu})_{n,m}$ be the sublattice defined by:

$$(\Lambda_{T,\mu})_{n,m} = ZnT\mu \oplus Zm/T. \qquad (1.19)$$

Figure 26:
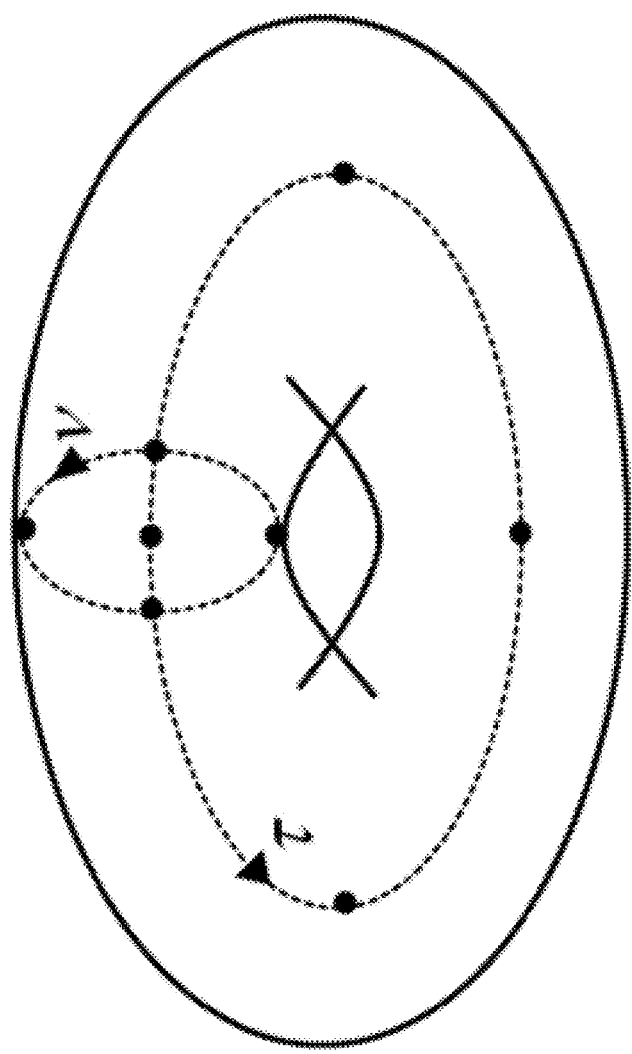
FIG. 26 illustratively represents a standard communication finite torus.

The finite torus associated with $(\Lambda_{T,\mu})_{n,m} \subset \Lambda_{T,\mu}$ is given by (see FIG. 26):

$$Z_{T,\mu}^{m,n} = \Lambda_{T,\mu}/(\Lambda_{T,\mu})_{m,n} \qquad (1.20)$$
$$= ZT\mu/ZnT\mu \times Z1/T/Zm/T;$$
$$Z/nZ \times Z/mZ.$$

Concluding, the finite torus $Z_{T,\mu}^{m,n}$ is isomorphic to the Cartesian product of two cyclic groups; one of order n and the other of order m. We refer to $Z_{T,\mu}^{m,n}$ as the standard communication finite torus.

1.4.1 Functions on Finite Tori.

We denote by $C(Z_0)$ the vector space of complex valued functions on a finite torus $Z_0 = \Lambda/\Lambda_0$. A function on $Z_0$ is naturally equivalent to a function $f:\Lambda \to \mathbb{C}$ that is periodic with respect to translations by the sublattice $\Lambda_0$, that is:

$$f(\lambda+\lambda_0)=f(\lambda), \qquad (1.21)$$

for every $\lambda \in \Lambda$ and $\lambda_0 \in \Lambda_0$. Hence, the vector space $C(Z_0)$ coincides with the subspace of $\Lambda_0$ periodic functions on $\Lambda$, that is, $C(Z_0)=C(\Lambda)_{\Lambda_0}$. Consequently, we have a natural periodization map $R_{\Lambda_0}:C(\Lambda) \to C(Z_0)$ given by:

$$R_{\Lambda_0}(f)(\lambda) = \sum_{\lambda_0 \in \Lambda_0} f(\lambda+\lambda_0), \qquad (1.22)$$

for every f∈C($\Lambda$) and $\lambda \in \Lambda$. We denote by * the operation of finite cyclic convolution of functions on $Z_0$. Given a pair of functions f,g∈C($Z_0$), their convolution is defined by:

$$f * g(\lambda) = \sum_{\lambda_1+\lambda_2=\lambda} f(\lambda_1)g(\lambda_2) \qquad (1.23)$$
$$= \sum_{\lambda' \in Z} f(\lambda')g(\lambda-\lambda')$$

for every v∈V. Note that summation over the finite torus $Z_0$ amounts to summation over a fundamental domain of the sublattice $\Lambda_0$ in the superlattice $\Lambda$.

1.4.2 Reciprocity Between Finite Tori.

Given a finite torus $Z_0=\Lambda/\Lambda_0$, we denote by $Z^\perp$ the finite torus associated with the reciprocal pair $\Lambda^\perp \subset \Lambda_0^\perp$, that is:

$$Z_0^\perp = \Lambda_0^\perp/\Lambda^\perp. \qquad (1.24)$$

We refer to $Z_0^\perp$ as the reciprocal finite torus. Although different as sets, one can show that, in fact, $Z_0$ and $Z_0^\perp$ are isomorphic as finite groups.

Example 1.5 Consider the Pair Consisting of the Standard Communication Lattice $\Lambda_{T,\mu}$ and the Sublattice $(\Lambda_{T,\mu})_{m,n} \subset \Lambda_{T,\mu}$. As shown above, the finite torus associated with $(\Lambda_{T,\mu})_{n,m} \subset \Lambda_{T,\mu}$ is isomorphic to:

$$Z_0; Z/Zn \times Z/Zm.$$

The reciprocal lattices are given by:

$$(\Lambda_{T,\mu})^\perp = ZT \oplus Z1/T\mu,$$
$$(\Lambda_{T,\mu})_{m,n}^\perp = ZT/m \oplus Z1/nT\mu.$$

Consequently, the reciprocal finite torus is given by:

$$Z_0^\perp = (\Lambda_{T,\mu})_{m,n}^\perp/(\Lambda_{T,\mu})^\perp$$
$$= Z(T/m)/ZT \times Z(1/nT\mu)/Z(1/T\mu);$$
$$Z/mZ \times Z/nZ.$$

We see that $Z_0$ and $Z_0^\perp$ are isomorphic as finite groups as both groups are isomorphic to the Cartesian product (albeit in different order) of two cyclic groups, one of order n and the other of order m.

2 The Symplectic Fourier Transform

In this section we introduce a variant of the two dimensional Fourier transform, associated with the symplectic form, called the symplectic Fourier transform. Let $\psi:\mathbb{R} \to \mathbb{C}^\times$ denote the standard complex exponential function:

$$\psi(z)=e^{2\pi i z}, \qquad (2.1)$$

for every z∈R.

2.1 Properties of the Symplectic Fourier Transform

The symplectic Fourier transform is a variant of the two dimensional Fourier transform that is associated with the symplectic form $\omega$. Formally, the symplectic Fourier transform is the linear transformation SF:C(V)→C(V) defined by the rule:

$$SF(f)(u) = \int_{v \in V} \psi(-\omega(u,v)) f(v) dv \qquad (2.2)$$

$$= \int_{t,v \in R} \psi(tv - f\tau) f(\tau, v) d\tau dv,$$

for every $f \in C(V)$ and $u=(t,f)$. We refer to the coordinates $(t,f)$ of the transformed domain as time and frequency, respectively.

In general, the inverse transform of (2.2) is given by the formula:

$$SF^{-1}(f)(v) = \int_{u \in V} \psi(+\omega(u,v)) f(u) du \qquad (2.3)$$

$$= \int_{t,f \in R} \psi(\tau f - vt) f(t,f) dt df$$

However, since $\omega$ is anti-symmetric, we have that $SF^{-1}=SF$. Namely, the symplectic Fourier transform is equal to its inverse.

2.1.1 Interchanging Property.

The symplectic Fourier transform interchanges between function multiplication and function convolution as formulated in the following proposition.

Proposition 2.1

(Interchanging property). The following conditions hold:

$$SF(f \cdot g) = SF(f) * SF(g),$$

$$SF(f * g) = SF(f) \cdot SF(g), \qquad (2.4)$$

for every $f, g \in C(V)$.

In fact, the interchanging property follows from a more fundamental property that concerns the operations of two dimensional translation and symplectic modulation.

Translation: given a vector $v_0 \in V$, define translation by $v_0$ to be the linear transformation $L_{v_0}:C(V) \to C(V)$, given by:

$$L_{v_0}(f)(v) = f(v-v_0), \qquad (2.5)$$

for every $f \in C(V)$.

Modulation: given a vector $v_0 \in V$, define symplectic modulation by $v_0$ to be the linear transformation $M_v^0: C(V) \to C(V)$, given by:

$$M_{v_0}(f)(v) = \psi(\omega(v_0,v)) f(v), \qquad (2.6)$$

for every $f \in C(V)$.

Perhaps the most fundamental property of the symplectic Fourier transform is that it interchanges between translation and symplectic modulation. This property is formulated in the following proposition.

Proposition 2.2

(Interchanging translation with symplectic modulation). The following conditions hold:

$$SF \cdot L_{v_0} = M_{v_0} \cdot SF,$$

$$SF \cdot M_{v_0} = L_{v_0} \cdot SF,$$

for every $v_0 \in V$.

2.2 the Discrete Symplectic Fourier Transform

The discrete symplectic Fourier transform relates between functions of two discrete variables and functions of two continuos periodic variables. The formal definition assumes a choice of a lattice $\Lambda \subset V$. Let $\Lambda^\perp \subset V$ be the reciprocal lattice and let $Z^\perp$ denote the torus associated with $\Lambda^\perp$, that is:

$$Z^\perp = V/\Lambda^\perp.$$

We refer to $Z^\perp$ as the reciprocal torus. The discrete symplectic Fourier transform is the linear transformation $SF_\Lambda: C(\Lambda) \to C(Z^\perp)$ given by:

$$SF_\Lambda(f)(u) = c \cdot \sum_{\lambda \in \Lambda} \psi(-\omega(u,\lambda)) f(\lambda), \qquad (2.7)$$

for every $f \in C(\Lambda)$ and $u \in V$ where $c$ is a normalization coefficient taken to be $c = \text{vol}(\Lambda)$. Note, that fixing the value of $\lambda \in \Lambda$, the function $\psi(-\omega(u,\lambda)) f(\lambda)$ is periodic with respect to the reciprocal lattice hence is a function on the reciprocal torus. The inverse transform $SF_\Lambda^{-1}: C(Z^\perp) \to C(\Lambda)$ is given by:

$$SF_\Lambda^{-1}(f)(\lambda) = \int_{u \in Z^\perp} \psi(-\omega(\lambda, u)) f(u) du, \qquad (2.8)$$

for every $f \in C(\Lambda)$. Note that taking the integral over the torus $Z^\perp$ is equivalent to integrating over a fundamental domain of the lattice $\Lambda^\perp$.

2.2.1 Discrete Interchanging Property.

The discrete symplectic Fourier transform interchanges between function multiplication and function convolution as formulated in the following proposition.

Proposition 2.3

(Discrete interchanging property). The following conditions hold:

$$SF_\Lambda(f \cdot g) = SF_\Lambda(f) * SF_\Lambda(g), \qquad (2.9)$$

$$\frac{1}{\sqrt{c}} SF_\Lambda(f * g) = \frac{1}{\sqrt{c}} SF_\Lambda(f) \cdot \frac{1}{\sqrt{c}} SF_\Lambda(g), \qquad (2.10)$$

for every $f,g \in C(\Lambda)$ where * stands for periodic convolution.

2.2.2 Compatibility with the Continuous Transform.

The continuos and discrete symplectic Fourier transforms are compatible. The compatibility relation is formulated in the following Theorem.

Theorem 2.4 (discrete-continuos compatibility relation). We have:

$$SF_\Lambda \cdot R^\Lambda = R_{\Lambda^\perp} \cdot SF, \qquad (2.11)$$

$$SF_\Lambda^{-1} \cdot R_{\Lambda^\perp} = R^\Lambda \cdot SF^{-1}. \qquad (2.12)$$

Stated differently, Equation (2.11) provides that taking the continuos Fourier transform of a function f and than periodizing with respect to translations by the reciprocal lattice $\Lambda^\perp$ is the same as first restricting f to the lattice $\Lambda$ and then taking the discrete Fourier transform.

2.3 The Finite Symplectic Fourier Transform

The finite symplectic Fourier transform relates functions of two finite periodic variables. The formal definition assumes a pair consisting of a lattice $\Lambda \subset V$ and a sublattice $\Lambda_0 \subset \Lambda$. We denote by $Z_0$ the finite torus associated with this pair, that is:

$$Z_0 = \Lambda/\Lambda_0.$$

Let $\Lambda^\perp$ and $\Lambda_0^\perp$ be the corresponding reciprocal lattices. We denote by $Z^\perp$ the finite torus associated with the reciprocal pair, that is:

$$Z_0^\perp = \Lambda_0^\perp / \Lambda^\perp.$$

The finite symplectic Fourier transform is the linear transformation $SF_{Z_0}: C(Z_0) \to C(Z_0^\perp)$ defined by the rule:

$$SF_{Z_0}(f)(\mu) = c \cdot \sum_{\lambda \in Z_0} \psi(-\omega(\mu,\lambda)) f(\lambda), \quad (2.13)$$

for every $f \in C(Z_0)$ and $\mu \in \Lambda_0^\perp$ where $c$ is a normalization coefficient taken to be $c = \text{vol}(\Lambda)$. The inverse transform $SF_{Z_0}^{-1}: C(Z_0^\perp) \to C(Z_0)$ is given by:

$$SF_{Z_0}^{-1}(f)(\lambda) = \frac{1}{c_0} \cdot \sum_{\mu \in Z_0^\perp} \psi(-\omega(\lambda,\mu)) f(\mu), \quad (2.14)$$

for every $f \in C(Z_0^\perp)$ and $\lambda \in \Lambda$ where $c_0$ is a normalization coefficient taken to be $c_0 = \text{vol}(\Lambda_0)$.

2.3.1 Finite Interchanging Property.

The finite symplectic Fourier transform interchanges between function multiplication and function cyclic convolution as formulated in the following proposition.

Proposition 2.5 (Discrete interchanging property). The following conditions hold:

$$\frac{c}{c_0} SF_{Z_0}(f \cdot g) = \frac{c}{c_0} SF_{Z_0}(f) * \frac{c}{c_0} SF_{Z_0}(g), \quad (2.15)$$

$$\frac{1}{c} SF_{Z_0}(f * g) = \frac{1}{c} SF_{Z_0}(f) \cdot \frac{1}{c} SF_{Z_0}(g), \quad (2.16)$$

for every $f, g \in C(Z_0)$ where $*$ stands for finite cyclic convolution.

Note that the normalization coefficient $c/c_0$ in equation (2.15) is equal the number of points in the finite torus $Z_0$.

2.3.2 Compatibility with the Discrete Transform.

The discrete and finite symplectic Fourier transforms are compatible. The compatibility relation is formulated in the following Theorem.

Theorem 2.6.

We have:

$$SF_{Z_0} \cdot R_{\Lambda_0} = R^{\Lambda_0^\perp} \cdot SF_\Lambda, \quad (2.17)$$

$$SF_{Z_0}^{-1} \cdot R^{\Lambda_0^\perp} = R_{\Lambda_0} \cdot SF_\Lambda^{-1}, \quad (2.18)$$

In plain language, Equation (2.17) states that taking the discrete symplectic Fourier transform of a function $f$ on a lattice $\Lambda$ and than restricting to the reciprocal lattice $\Lambda_0^\perp$ is the same as first periodizing $f$ with respect to translations by the sublattice $\Lambda_0$ and than taking the finite Fourier transform.

Example 2.7. Consider the Standard Communication Lattice $\Lambda_{T,\mu}$ and the Sublattice $(\Lambda_{T,\mu})_{n,m}$ We have the following isomorphisms:

$Z_0: Z/nZ \times Z/mZ,$ $Z_0^\perp: Z/mZ \times Z/nZ.$

In terms of these realizations the finite symplectic Fourier transform and its inverse take the following concrete forms:

$$SF_{Z_0}(f)(k,l) = \mu \sum_{K=0}^{n-1}\sum_{L=0}^{m-1} \psi(kL - lK) f(K,L), \quad (2.19)$$

$$SF_{Z_0}^{-1}(f)(K,L) = \frac{1}{mn\mu} \sum_{k=0}^{m-1}\sum_{l=0}^{n-1} \psi(Kl - Lk) f(k,l), \quad (2.20)$$

where in the first equation $k \in [0,m-1]$, $l \in [0,n-1]$ and in the second equation $K \in [0,n-1]$, $L \in [0,m-1]$. Note the minus sign in the Fourier exponent due to the symplectic pairing.

3 Heisenberg Theory

Let $H$ denote the Hilbert space of square integrable complex functions on the real line $R$. We denote the parameter of the line by $t$ and refer to it as time. The inner product on $H$ is given by the standard formula:

$$\langle f, g \rangle = \int_{x \in R} \overline{f(x)} g(x) dx, \quad (3.1)$$

We refer to $H$ as the signal space and to functions in the signal space as waveforms. Heisenberg theory concerns the mathematical structures underlying the intricate interaction between the time and frequency dimensions. In a nutshell, the theory study the algebraic relations between two basic operations on functions: time delay and Doppler shift.

3.1 Time Delay and Doppler Shift

The operations of time delay and Doppler shift establish two one parametric families of Unitary transformations on $H$.

3.1.1 Time Delay.

Given a real parameter $\tau \in R$ the operation of time delay by $\tau$ is a linear transformation $L_\tau: H \to H$ given by $$L_\tau(f)(t) = f(t-\tau) \quad (3.2)$$

for every $f \in H$ and $t \in R$. One can show that $L_\tau$ is a Unitary transformation, namely it preserves the inner product:

$$\langle L_\tau f, L_\tau g \rangle = \langle f, g \rangle,$$

for every $f, g \in H$. More over, the family of transformation $\{L_\tau : \tau \in R\}$ satisfies:

$$L_{\tau_1+\tau_2} = L_{\tau_1} \cdot L_{\tau_2},$$

for every $\tau_1, \tau_2 \in R$. In particular, the operations of time delay commute with one another, that is, $L_{\tau_1} \cdot L_{\tau_2} = L_{\tau_2} \cdot L_{\tau_1}$.

3.1.2 Doppler Shift.

Given a real parameter $v \in R$ the operation of Doppler shift by $v$ is a linear transformation $M_v: H \to H$ given by $$M_v(f)(t) = \psi(vt) f(t), \quad (3.3)$$

for every $f \in H$ and $t \in R$. Recall that $\psi$ stands for the standard complex exponential function $\psi(z) = e^{2\pi i z}$. One can show that $M_v$ is a Unitary transformation, namely it preserves the inner product:

$$\langle M_v f, M_v g \rangle = \langle f, g \rangle,$$

for every $f, g \in H$. More over, the family of transformation $\{M_v : v \in R\}$ satisfies:

$$M_{v_1+v_2} = M_{v_1} \cdot M_{v_2},$$

for every $v_1, v_2 \in R$. In particular, the operations of time delay commute with one another, that is, $M_{v_1} \cdot M_{v_2} = M_{v_2} \cdot M_{v_1}$.

3.2 the Heisenberg Representation

The Heisenberg representation is a mathematical structure unifying the two operations of time delay and Doppler shift. The main difficulty is that these operations do not commute with one another, instead they satisfy the following condition:

$$L_\tau M_v = \psi(-\tau v) M_v L_\tau. \quad (3.4)$$

The starting point is to consider the unified delay-Doppler linear transformation:

$$\pi(\tau,v) = L_\tau M_v, \quad (3.5)$$

for every pair of real parameters $\tau$, $v \in \mathbb{R}$. In this representation, the ordered pair $(\tau, v)$ is considered as a point in the delay Doppler plane V. One can show that $\pi(\tau,v)$ is a Unitary transformation as composition of such. The two dimensional family of transformations $\{\pi(v):v \in V\}$ defines a linear transformation $\pi:C(V) \to \text{Hom}(H,H)$, given by:

$$\pi(f) = \int_{v \in V} f(v)\pi(v)dv, \quad (3.6)$$

for every $f \in C(V)$, where the range of $\pi$ is the vector space of linear transformations from H to itself which we denote by Hom(H,H). In words, the map $\pi$ takes a function on the delay Doppler plane and send it to the linear transformation given by weighted superposition of delay-Doppler transformations where the weights are specified by the values of the function. The map $\pi$ is called the Heisenberg representation. A fundamental fact which we will not prove is that the map $\pi$ is essentially an isomorphism of vector spaces. Hence it admits an inverse $\pi^{-1}:\text{Hom}(H,H) \to C(V)$ called the Wigner transform. The Wigner transform is given by:

$$\pi^{-1}(A)(v) = Tr(\pi(v)^H A). \quad (3.7)$$

for every $A \in \text{Hom}(H,H)$ and $v \in V$. The Heisenberg representation and the Wigner transform should be thought of as a "change of coordinates" converting between functions on the delay Doppler plane and linear transformations on the signal space (which may be represented using matrices). To summarize, a linear transformation $A \in \text{Hom}(H,H)$ admits a unique expansion as a superposition of delay-Doppler transformations. The coefficients in this expansion are given by the function $a = \pi^{-1}(A)$. The function a is refereed to as the delay-Doppler impulse response of the transformation A. The Heisenberg formalism generalizes the classical framework of time invarinat linear systems to time varying linear systems. Note that in the former, a time invariant linear transformation admits a unique expansion as a superposition of time delays and the coefficients in the expansion constitute the classical impulse response.

3.2.1 Ambiguity Function.

The formula of the Wigner transform of a general linear transformation, Equation (3.7), is quite abstract. Fortunately, for specific type of linear transformations the Wigner transform takes a more explicit form. Say we are given a waveform $g \in H$, of unit norm $\|g\|=1$. Let $P_g$ denote the orthogonal projection on the one dimensional subspace spanned by g, given by:

$$P_g(\varphi) = g\langle g,\varphi \rangle, \quad (3.8)$$

for every $\varphi \in H$.
Proposition.
The Wigner transform of $P_g$ admits the following formula:

$$\pi^{-1}(P_g)(v) = \langle \pi(v)g,g \rangle, \quad (3.9)$$

for every $v \in V$.
Denote $A_g = \pi^{-1}(P_g)$ and refer to this function as the ambiguity function of g. We have:

$$\pi(A_g) = P_g. \quad (3.10)$$

The above equation means that $A_g$ is the coefficients in the delay-Doppler expansion of the operator $P_g$—this is the Heisenberg interpretation of the ambiguity function.

3.2.2 Cross Ambiguity Function.

The cross ambiguity function is a generalization of the ambiguity function to the case of two waveforms $g_1, g_2 \in H$ where $g_1$ is assumed to be of unit norm. Let $P_{g_1,g_2}$ denote the following rank one linear transformation on H:

$$P_{g_1,g_2}(\varphi) = g_2\langle g_1,\varphi \rangle, \quad (3.11)$$

for every $\varphi \in H$.

Proposition.
The Wigner transform of $P_{g_1,g_2}$ admits the following formula:

$$\pi^{-1}(P_{g_1,g_2})(v) = \langle \pi(v)g_1,g_2 \rangle, \quad (3.12)$$

for every $v \in V$.
Denote $A_{g_1,g_2} = \pi^{-1}(P_{g_1,g_2})$ and refer to this function as the cross ambiguity function of $g_1$ and $g_2$. We have:

$$\pi(A_{g_1,g_2}) = P_{g_1,g_2}. \quad (3.13)$$

Hence, according to the Heisenberg interpretation, the cross-ambiguity function is the coefficients in the delay-Doppler expansion of the operator $P_{g_1,g_2}$.

3.3 Heisenberg Interchanging Property

The main property of the Heisenberg representation is that it interchanges between the operation of composition of linear transformations on H and a twisted version of the convolution operation of functions on V. In order to define the operation of twisted convolution we consider the form $\beta: V \times V \to V$, given by:

$$\beta(v,v') = c\tau', \quad (3.14)$$

where $v=(\tau,v)$ and $v'=(\tau',v')$. The form $\beta$ satisfies the "polarization" condition:

$$\beta(v,v') - \beta(v',v) = \omega(v,v'), \quad (3.15)$$

for every $v,v' \in V$. Given a pair of functions $f,g \in C(V)$ their twisted convolution is defined by the following rule:

$$f *_t g(v) = \int_{v_1+v_2=v} \psi(\beta(v_1,v_2)) f(v_1)g(v_2) \quad (3.16)$$
$$= \int_{v' \in V} \psi(\beta(v', v-v')) f(v)g(v-v')dv'$$

One can see that the twisted convolution operation differs from the usual convolution operation, Equation (1.2), by the multiplicative factor $\psi(\beta(v_1,v_2))$. As a consequence of this factor, twisted convolution is a non-commutative operation in contrast with conventional convolution. This non-commutativity is intrinsic to the fabric of time and frequency. The Heisenberg interchanging property is formulated in the following Theorem.

Theorem 3.1
(Heisenberg Interchanging property). We have:

$$\pi(f *_t g) = \pi(f) \cdot \pi(g), \quad (3.17)$$

for every $f,g \in C(V)$.

The following example is key to understanding the motivation behind the constructions presented in this section. In a nutshell, it explains why the twist in Formula (3.16) accounts for the phase in the commutation relation between the time delay and Doppler shift operations, see Equation (3.4).

Example 3.2 we Verify Equation (3.17) in a Concrete Case

Let $v=(\tau,v)$ and $v'=(\tau',v')$. Consider the delta functions $\delta_v$ and $\delta_{v'}$. On the one hand, we have:

$$\pi(\delta_v) = L_\tau M_v,$$

$$\pi(\delta_{v'}) = L_{\tau'} M_{v'},$$

and consequently:

$$\Pi(\delta_v) \circ \Pi(\delta_{v'}) = L_\tau M_v L_{\tau'} M_{v'} \quad (3.18)$$
$$= \psi(v\tau') L_\tau L_{\tau'} M_v M_{v'}$$
$$= \psi(v\tau') L_{\tau+\tau'} M_{v+v'}$$
$$= \psi(v\tau') \pi(v+v')$$
$$= \Pi(\psi(v\tau') \delta_{v+v'}).$$

On the other hand:

$$\delta_v *_t \delta_{v'} = \psi(\beta(v, v')) \delta_v * \delta_{v'} \quad (3.19)$$
$$= \psi(v\tau') \delta_{v+v'}.$$

Consequently:

$$\pi(\delta_v *_t \delta_{v'}) = \psi(v\tau') \pi(v+v') \quad (3.20)$$

Hence we verified that: $\pi(\delta_v *_t \delta_{v'}) = \pi(\delta_v) \cdot \pi(\delta_{v'})$.

3.4 Fundamental Channel Equation

We conclude this section with formulating a fundamental equation relating the following structures:
1. Cross ambiguity function.
2. Ambiguity function
3. Channel transformation.
4. Twisted convolution.

This fundamental equation is pivotal to the two dimensional channel model that will be discussed in the next section. Let $g \in H$ be a waveform of unit norm. Let $h \in C(V)$. We denote by H the channel transformation:

$$H = \pi(h). \quad (3.21)$$

Theorem 3.3

(Fundamental channel equation). The following equation holds:

$$A_{g,H(g)} = h *_t A_g. \quad (3.22)$$

In words, the fundamental equation, (3.22), asserts that the cross ambiguity function of g with H(g) is the twisted convolution of h with the ambiguity function of g.

4. The Continuous OTFS Transceiver

In this section we describe a continuos variant of the OTFS transceiver.

4.1 Set-Up

The definition of the continuos OTFS transceiver assumes the following data:
1. Communication lattice. An undersampled lattice:

$$\Lambda \subset V,$$

where vol($\Lambda$)=$\mu$, for some $\mu \geq 1$.
2. Generator waveform. A waveform of unit norm:

$$g \in H,$$

satisfying the orthogonality condition $A_g(\lambda)=0$ for every non-zero element $\lambda \in \Lambda^\times$.
3. 2D filter. A window function:

$$W \in C(\Lambda).$$

We note that, typically, the support of the 2D filter along the delay and Doppler dimensions is bounded by the latency and bandwidth restrictions of the communication packet respectively.

Example 4.1 a Typical Example of a Communication Lattice is the Standard Communication Lattice $$\Lambda_{T,\mu} = Z\mu T \oplus Z1/T.$$

A typical example of a 2D filter is:

$$W[KT\mu, L/T] = \begin{cases} 1 & K \in [0, n-1], L \in [0, m-1] \\ 0 & \text{otherwise} \end{cases},$$

where $m,n \in N^{\geq 1}$ and $T \in R$ The parameter T is called the symbol time. The real numbers $n\mu T$ and m/T are the latency and bandwidth of the communication packet respectively. Note that a more sophisticated design of a spectral window will involve some level of tapering around the boundaries in the expense of spectral efficiency. Finally, in case $\mu=1$ (critical sampling) a simple example of an orthogonal wavethrm is:

$$g = 1_{[0,T]}.$$

4.1.1 Generalized Set-Up.

The set-up can be slightly generalized by assuming, instead of a single orthogonal waveform g, a pair consisting of transmit waveform $g_t \in H$ and receive waveform $g_r \in H$ satisfying the following cross orthogonality condition:

$$A_{g_r,g_t}(\lambda) = 0, \quad (4.1)$$

for every $\lambda \in \Lambda^\times$. The trade-off in using a pair where $g_r \neq g_t$ is gaining more freedom in the design of the shape of each waveform in expense of lower effective SNR at the receiver. For the sake of simplicity, in what follows we will consider only the case when $g_r = g_t$ with the understanding that all results can be easily extended to the more general case.

4.2 Continuous OTFS Modulation Map.

Let $Z^\perp$ denote the torus associated with the lattice $\Lambda^\perp$ reciprocal to the communication lattice. The continuos OTFS modulation map is the linear transformation $M: C(Z^\perp) \to H$, given by:

$$M(x) = \pi(W \cdot SF_\Lambda^{-1}(x))g, \quad (4.2)$$

for every $x \in C(Z^\perp)$. Roughly, the continuos OTFS modulation is the composition of the Heisenberg representation with the (inverse) discrete symplectic Fourier transform. In this regard it combines the two intrinsic structures of the delay Doppler plane. Formula (4.2) can be written more explicitly as:

$$M(x) = \sum_{\lambda \in \Lambda} W(\lambda) X(\lambda) \pi(\lambda) g, \quad (4.3)$$

where $X = SF_\Lambda^{-1}(x)$

Figure 27:
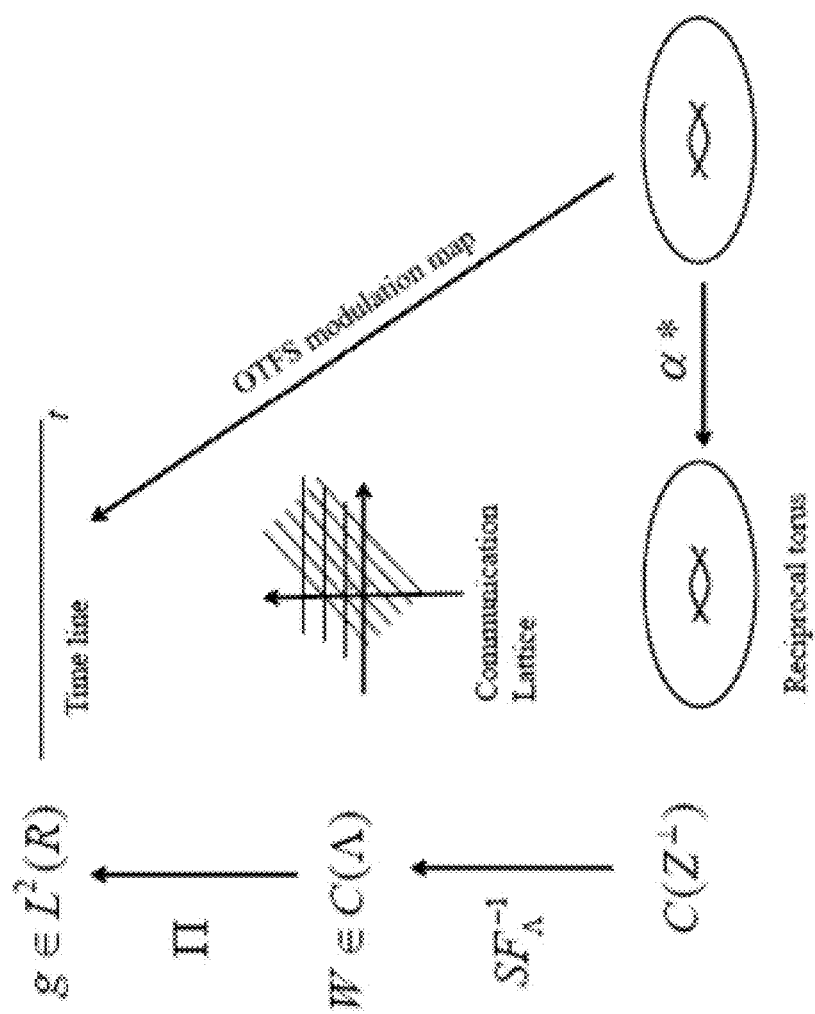
FIG. 27 illustrates an exemplary structure of an OTFS modulation map.

FIG. 27 illustrates an exemplary structure of the OTFS modulation map. Note that FIG. 27 includes an additional spreading transformation given by convolution with a specifically designed function $\alpha \in C(Z^\perp)$. The effect of this convolution is to spread the energy of each information symbol uniformly along the torus $Z^\perp$ achieving a balanced power profile of the transmit waveform depending only on the total energy of the information vector x.

4.3 Continuous OTFS Demodulation Map

The continuos OTFS demodulation map is the linear transformation. $D: H \to C(Z^\perp)$, given by:

$$D(\varphi) = SF^\Lambda(\overline{W} \cdot R^\Lambda(A_{g,\varphi})), \quad (4.4)$$

for every $\varphi \in H$. Roughly, the continuos OTFS demodulation map is the composition of the discrete symplectic Fourier transform with the Wigner transform. Formula (4.4) can be written more explicitly as:

$$D(\varphi)(u) = c \cdot \sum_{\lambda \in \Lambda} \psi(-\omega(u, \lambda)) \overline{W}(\lambda) \langle \pi(\lambda)g, \varphi \rangle, \quad (4.5)$$

for every $\varphi \in H$ and $u \in Z^\perp$.

4.4 Two Dimensional Channel Model

Before describing the technical details of the two-dimensional channel model for the OTFS transceiver, we will provide an overview in simplified terms. Consider first that in the standard one-dimensional physical coordinates of time (or frequency), the wireless channel is a combination of multipath moving reflectors that induce a distortion on the transmitted signal. This distortion arises due to superposition of time delay and Doppler shifts. Such a general distortion appears in standard physical coordinates as a fading non-stationary inter-symbol interference pattern. In contrast, when converted to the coordinates of the OTFS modulation torus, the distortion becomes a static two dimensional local ISI distortion. This is a novel and characteristic attribute of the OTFS transceiver. In what follows we provide a rigorous derivation of this characteristic. To this end, we begin by considering the simplest multipath channel $H : H \to H$ that is already a combination of time delay and Doppler shift. In our terminology, this channel is given by:

$$H = \pi(\delta_{v_0}) = L_{\tau_0} M_{v_0}, \quad (4.6)$$

for some $v_0 = (\tau_0, \nu_0) \in V$. We assume, in addition, that the vector $v_0$ satisfy $\|v_0\| = \text{diam}(\Lambda)$ where the diameter of the lattice is by definition the radius of its Voronoi region. Stated differently, we assume that the vector is small compared with the dimensions of the lattice. Note, that this assumption holds for most relevant scenarios in wireless applications. We proceed to derive the structure of the modulation equivalent channel. Let $q : V \to C$ be the quadratic exponential function given by:

$$q(v) = \psi(-\beta(v,v)), \quad (4.7)$$

for every $v \in V$.

Proposition 4.2

The modulation equivalent channel $y = D \cdot H \cdot M(x)$ is a periodic convolution $y = h_{eqv} * x$, where the impulse response $h_{eqv} \in C(Z^\perp)$ is given by:

$$h_{eqv} = R_\Lambda \perp (q(v_0) \delta_{v_0}) * SF_\Lambda |W|^2, \quad (4.8)$$

That is, Equation (4.8) states that the modulation equivalent channel is a periodic convolution with a periodic blurred version of $q(v_0) \delta_{v_0}$ where the blurring pulse is given by the symplectic Fourier transform of the discrete pulse $|W|^2$. This blurring results in a resolution loss which is due to the spectral truncation imposed by the filter W. As a result, the resolution improves as the window size increases (what amounts to longer latency and wider bandwidth). Granting the validity of Equation (4.8), it is straightforward to deduce the modulation equivalent of a general wireless channel:

$$H = \pi(h), \quad (4.9)$$

for any function $h \in C(V)$ where we assume that the support of h is much smaller than the diameter of the lattice $\Lambda$. The general two dimensional channel model is formulated in the following theorem.

Theorem (Two dimensional channel model). The modulation equivalent channel $y = D \cdot H \cdot M(x)$ is a periodic convolution $y = h_{eqv} * x$ with the impulse response $h_{eqv} \in C(Z^\perp)$, given by:

$$h_{eqv} = R_\Lambda \perp (q \cdot h) * SF_\Lambda |W|^2. \quad (4.10)$$

Stated differently, the modulation equivalent channel is a periodic convolution with a periodic blurred version of $q \cdot h$ where the blurring pulse is given by the discrete symplectic Fourier transform of the discrete pulse $|W|^2$.

4.4.1 Derivation of the Two Dimensional Channel Model.

We proceed to derive Equation (4.8). Let $x \in C(Z^\perp)$. Let $\varphi_t \in H$ denote the transmitted signal. We have:

$$\varphi_t = M(x) \quad (4.11)$$
$$= \Pi(W \cdot X)g,$$

where $X = SF_\Lambda^{-1}(x)$. Let $\varphi_r \in H$ denote the received signal. We have:

$$\varphi_r = H(\varphi_t) \quad (4.12)$$
$$= \Pi(\delta_{v_0}) \circ \Pi(W \cdot X)g$$
$$= \Pi(\delta_{v_0} *_t (W \cdot X))g,$$

where the third equality follows from the Heisenberg property of the map $\pi$ (Theorem 3.1). The demodulated vector $y = D(\varphi_r)$ is given by:

$$D(\varphi_r) = SF_\Lambda(\overline{W} \cdot R^\Lambda(A_{g,\varphi_r})). \quad (4.13)$$

We now evaluate the right hand side of (4.13) term by term. Applying the fundamental channel equation (Theorem 3.3) we get:

$$A_{g,\varphi_r} = \delta_{v_0} *_t (W \cdot X) *_t A_g. \quad (4.14)$$

Considering the restriction $R^\Lambda(A_{g,\varphi_r})$ we have the following proposition.

Proposition.

We have $$R^\Lambda(A_{g,\varphi_r}) q(v_0) R^\Lambda(\psi_{v_0}) \cdot (WX), \quad (4.15)$$

where $\omega_{v_0}(v) = \psi(\omega(v_0, v))$ for every $v \in V$.

Combining Equations (4.13) and (4.15) we get:

$$D(\varphi_r); q(v_0) SF_\Lambda([R^\perp(\psi_{v_0})|W|^2] \cdot X) = [R_\Lambda \perp (q(v_0) \delta_{v_0}) * SF_\Lambda(|W|^2)] * x. \quad (4.16)$$

This concludes the derivation of the two dimensional channel model.

4.5 Explicit Interpretation

We conclude this section by interpreting the continuos OTFS modulation map in terms of classical DSP operations. We use in the calculations the standard communication lattice $\Lambda = \Lambda_{T,\mu}$ from Example 1.1. Recall the definition of the continuous modulation map:

$$M(x) = \sum_{\lambda \in \Lambda} W(\lambda) X(\lambda) \pi(\lambda) g, \quad (4.17)$$

for every $x \in C(Z^\perp)$, where $X = SF_\Lambda^{-1}(x)$. Formula (4.17) can be written more explicitly as:

$$M(x) = \sum_{K,L} W[K\mu T, L/T] X[K\mu T, L/T] L_{KT\mu} M_{L/T}(g) \quad (4.18)$$

$$\sum_K L_{KT\mu} \sum_L W_K[L/T] X_K[L/T] M_{L/T}(g) = \sum_K L_{KT\mu}(\phi_K).$$

where:

$$\phi_K = \sum_L W_K[L/T] X_K[L/T] M_{L/T}(g). \quad (4.19)$$

The waveform $\phi_K$ is called the K th modulation block.

4.5.1 Frequency Domain Interpretation.

Figure 28:
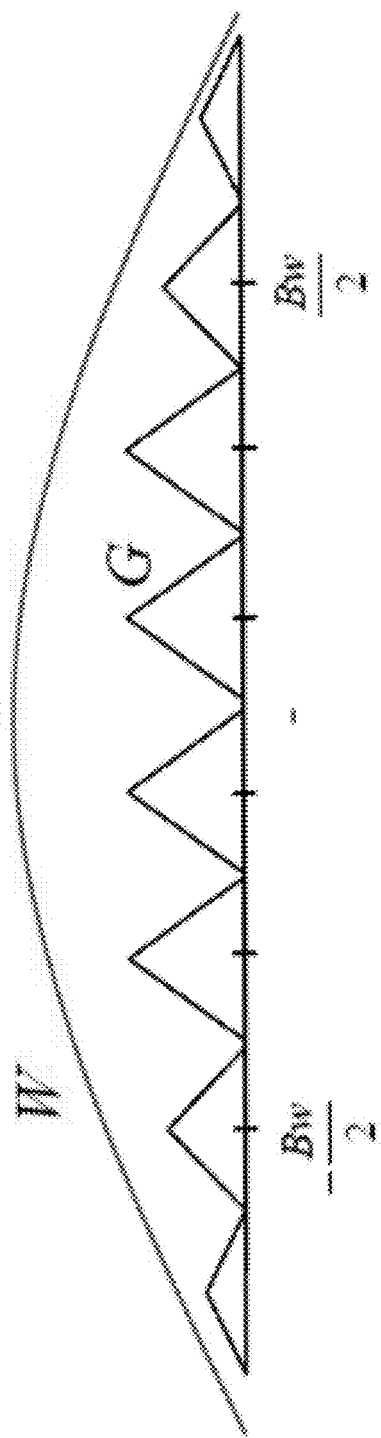
FIG. 28 illustrates a frequency domain interpretation of an OTFS modulation block.

Let G denote the Fourier transform of g. Equation (4.19) can be interpreted as feeding the weighted sequence $W_K X_K$ into a uniform filterbank with each subcarrier shaped by the filter G. See FIG. 28.

4.5.2 Time Domain Interpretation.

Let $w_K$ and $x_K$ denote the inverse discrete Fourier transform of the discrete waveforms $W_K$ and $X_K$ respectively. Both waveforms are periodic with period T. We have:

$$\phi_K \propto (w_K * x_K) \cdot g,$$

where * stands for periodic convolution. The waveform $x_K$ can be expressed in terms of the information vector x as follows:

$$x_K(t) \propto \int_v \psi(KT\mu v) x(t, v) dv,$$

In words, $x_K(t)$ is proportional to the K th component of the inverse discrete Fourier transform of x along the Doppler dimension.

5 the Finite OTFS Transceiver

In this section we describe a finite variant of the OTFS transceiver. This variant is obtained, via uniform sampling, from the continuous variant described previously.

5.1 Set-Up

The definition of the finite OTFS transceiver assumes the following:

1. Communication lattice. An undersampled lattice:

$$\Lambda \subset V,$$

where vol($\Lambda$)=$\mu$, for some $\mu \geq 1$.

2. Communication sublattice. A sublattice:

$$\Lambda_0 \subset \Lambda$$

3. Generator waveform. A waveform of unit norm:

$$g \in H,$$

satisfying the orthogonality condition $A_g(\lambda)=0$ for every $\lambda \in \Lambda^x$.

4. 2D filter. A window function:

$$W \in C(\Lambda).$$

Note that the support of the 2D filter is typically compatible with the configuration of the sublattice, as demonstrated in the following example.

Example 5.1 the Standard Nested Pair of Communication Lattice and Sublattice is $$\Lambda = \Lambda_{T,\mu} = Z\mu T \oplus Zl/T,$$

$$\Lambda_0 = (\Lambda_{T,\mu})_{n,m} = Zn\mu T \oplus Zm/T,$$

where m,n$\in \mathbb{N}^{\geq 1}$ and T$\in \mathbb{R}$ is a parameter called the symbol time. The real numbers n$\mu$T and m/T are the latency and bandwidth of the communication packet respectively. A typical compatible 2D filter is:

$$W[KT\mu, L/T] = \begin{cases} 1 & K \in [0, n-1], L \in [0, m-1] \\ 0 & \text{otherwise} \end{cases},$$

More sophisticated designs of a spectral window may involve, for example, some level of tapering around the boundaries at the expense of spectral efficiency. Finally, in case $\mu=1$, a simple example of orthogonal waveform is:

$$g = 1_{[0,T]}.$$

5.2 Finite OTFS Modulation Map

Let $\Lambda^\perp \subset \Lambda_0^\perp$ be the reciprocal nested pair. Let $Z_0^\perp \subset Z^\perp$ be the finite reciprocal torus. The finite OTFS modulation map is the linear transformation $M_f: C(Z_0^\perp) \to H$, defined by:

$$M_f(x) = \pi(W \cdot SF_{z_0}^{-1}(x))g, \quad (5.1)$$

for every information vector $x \in C(Z_0^\perp)$. Formula (5.1) can be written more explicitly as:

$$M_f(x) = \sum_{\lambda \in \Lambda} W(\lambda) X(\lambda) \pi(\lambda) g,$$

where $X = SFSF_{Z_0}^{-1}(x)$.

5.3 Finite OTFS Demodulation Map

The finite OTFS demodulation map is the linear transformation $D_f: H \to C(Z_0^{\perp 1})$, given by:

$$D_f(\varphi) = SF_{Z_0}(R_{\Lambda_0}(\overline{W} \cdot R^\Lambda A_{g,\varphi})), \quad (5.2)$$

for every $\varphi \in H$. Formula (5.2) can be written more explicitly as:

$$D_f(\varphi)(\mu) = c \sum_{\lambda \in Z_0} \psi(-\omega(\mu, \lambda)) \overline{W}(\lambda) \langle \pi(\lambda) g, \varphi \rangle,$$

for every $\varphi \in H$ and $\lambda \in \Lambda_0^\perp$. Recall that the normalization coefficient c=vol($\Lambda$).

5.4 the Finite Two Dimensional Channel Model

Let H=$\pi$(h) be the channel transformation where h$\in$C(V) is assumed to have small support compared with the dimensions of the communication lattice. Recall the quadratic exponential:

$$q(v) = \psi(-\beta(v,v)).$$

Theorem 5.2

(Finite 2D channel model). The finite modulation equivalent channel y=$D_f \cdot H \cdot M_f(x)$ is a cyclic convolution y=$h_{eqv,f} * x$ with the impulse response $h_{eqv,f} \in C(Z_0^\perp)$, given by:

$$h_{eqv,f} = R^{\Lambda_0 \perp (R}{}_{\Lambda}{}^\perp(q \cdot h) * SF_\Lambda |W|^2). \quad (5.3)$$

Figure 18:
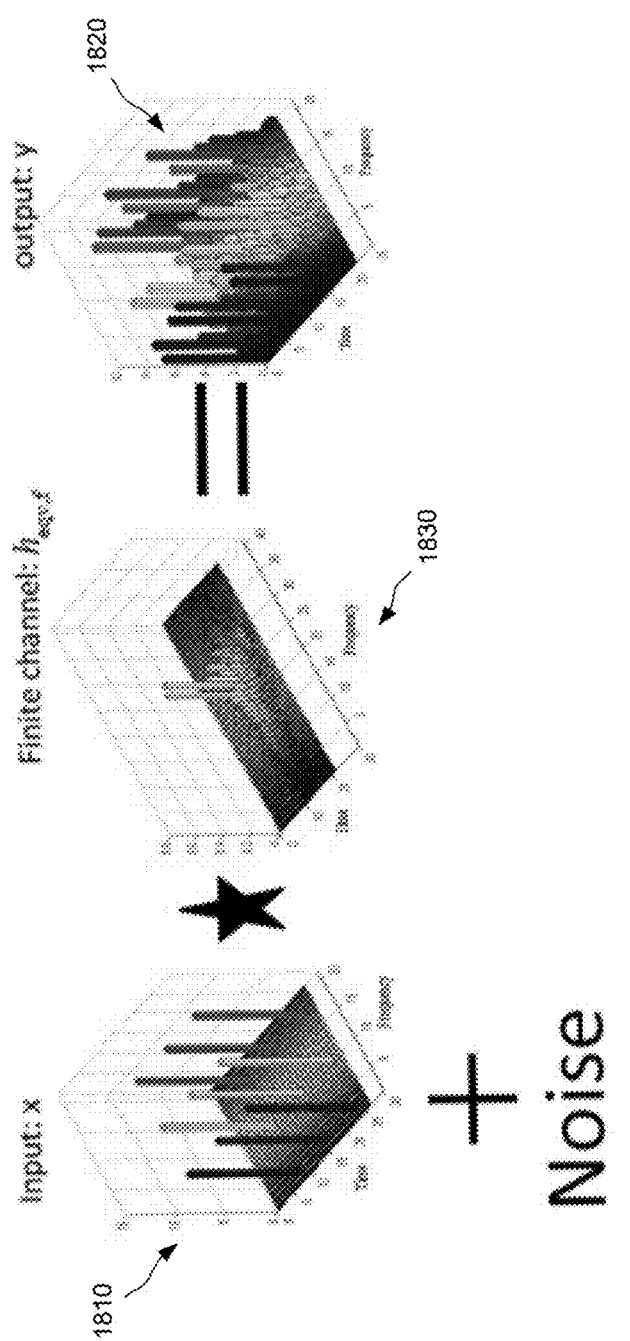
FIG. 18 includes a set of bar diagrams representing a two-dimensional impulse response realizing a finite modulation equivalent channel, a transmitted information vector x and a received information vector y .

FIG. 18 demonstrates the statement of this theorem. The bar diagram 1810 represents the transmitted information vector x. The bar diagram 1820 represents the received information vector y. The bar diagram 1830 represents the 2D impulse response realizing the finite modulation equivalent channel. The received vector is related to the transmit vector by 2D cyclic convolution with the 2D impulse response. Finally, we see from Equation (5.3) that the finite impulse response $h_{eqv,f}$ is the sampling of the continuos impulse response $h_{eqv}$ on the finite subtorus $Z_0^\perp \subset Z^\perp$.

5.5 Explicit Interpretation

We conclude this section by interpreting the finite OTFS modulation map in terms of classical DSP operations. We use in the calculations the nested pair $\Lambda_0 \subset \Lambda$ from example 5.1. Recall the definition of the finite modulation map:

$$M_f(x) = \sum_{\lambda \in \Lambda} W(\lambda) X(\lambda) \pi(\lambda) g, \quad (5.4)$$

for every $x \in C(Z\Lambda_0^{\perp})$, where $X = SF_{Z_0}^{-1}(x)$. Formula (5.4) can be written more explicitely as:

$$M_f(x) = \sum_{K,L} W[K\mu T, L/T] X[K\mu T, L/T] L_{KT\mu} M_{L/T}(g) \quad (5.5)$$

$$\sum_K L_{KT\mu} \sum_L W_K[L/T] X_K[L/T] M_{L/T}(g) = \sum_K L_{KT\mu}(\phi_K).$$

where:

$$\phi_K = \sum_L W_K[L/T] X_K[L/T] M_{L/T}(g) \quad (5.6)$$

The waveform $\phi K$ is called the K th modulation block.

5.5.1 Frequency Domain Interpretation.

Let G denote the Fourier transform of g. Equation (5.6) can be interpreted as feeding the sequence $W_K X_K$ into a uniform filterbank with each subcarrier shaped by the filter G.

5.5.2 Time Domain Interpretation.

Let $w_K$ and $x_K$ denote the inverse discrete Fourier transform of the discrete waveforms $W_K$ and $X_K$ respectively. Both waveforms are periodic with period T. We have:

$$\phi_K \propto \left( w_K * \sum_k x_K[kT/m] \delta_{kT/m} \right) \cdot g,$$

where * stands for periodic convolution. The waveform $x_K$ can be expressed in terms of the information vector x as:

$$x_K(kT/m) \propto \sum_{l=0}^{n-1} \psi(Kl) x\left[\frac{kT}{m}, \frac{l}{nTu}\right].$$

In words, $x_K$ is proportional to the inverse finite Fourier transform of x along the Doppler dimension.

OTFS Using Tomlinson-Harashima Precoding

As discussed above, the capability of an OTFS system to ascertain characteristics of a communication channel and predict the channel in the near future provides various advantages. For example, this channel information may be acquired by an OTFS receiver and provided to the transmitter to improve communication quality. In the case of an OTFS receiver including a decision feedback equalizer, the receiver is configured to measure the channel, compute the filtering coefficients and extract the received data. Once these coefficients have been computed, they may be used as the basis for pre-filtering or precoding at the transmitter because the channel measurements allow prediction of channel behavior in the near future (e.g., for 1 or 2 ms). This enables similar transmitter coefficients to be computed and used in a decision feedback structure in the transmitter.

As is described in further detail below, in one embodiment the disclosure pertains to a Tomlinson-Harashima precoding (THP) method which includes estimating a two-dimensional model of a communication channel wherein the two-dimensional model of the communication channel is a function of time delay and frequency shift. The THP method includes determining, using one or more processors and the two-dimensional model of the communication channel, a set of transmit precoding filter values where the set of transmit precoding values may correspond to Tomlinson-Harashima precoding values. In one embodiment the THP method is performed in a hybrid delay-time domain that is related to the delay-Doppler domain by an FFT across the Doppler dimension. In order to minimize transmitted signal energy and large signal peaks, known perturbations in the hybrid domain are added to the input user symbols to be precoded. The THP method further includes generating, from the perturbed stream of input data, precoded input data using the set of transmit precoding filter values. A modulated signal is then provided based upon the precoded input data and the two dimensional model of the communication channel.

One motivation for the proposed THP method is that it may often be preferred to perform equalization at a transmitter (e.g., at an access point or base station) in order to enable the design of remote wireless terminals to be simplified. Specifically, conventional receivers may employ a decision feedback equalizer (DFE) in order to equalize intersymbol interference. THP may be characterized as moving the feedback portion of a DFE from the receiver to the transmitter. Since signals are completely known within the transmitter, pre-equalization in the transmitter can reduce the propagation of errors relative to cases in which DFE is performed with respect to generally unknown signals at the receiver.

Pre-equalization may also be performed at a transmitter through the use of zero forcing precoding. However, utilization of zero forcing precoders may result in an unwanted "energy problem" described below. Fortunately, it has been found that the implementations of Tomlinson-Harashima precoders in the present context addresses this energy problem and may be effectively employed within OTFS communication systems. For clarity of presentation, zero forcing precoding and Tomlinson-Harashima precoding will first be described in the context of single-carrier modulation and SISO channels. A discussion of the advantageous use of such precoding in an OTFS will then be provided.

Zero Forcing (ZF) Pre-Coder
Mathematical Setup
Channel equation in delay domain:

$$y = h * x + w$$

where,
x a vector of QAMs
Average QAM energy: 1
Number of QAMs: N
Variance of noise: $N_0$
ZF Solution
Channel equation in frequency domain:

$$Y = HX - W$$

A signal transmitted by a transmitter with a ZF pre-coder may be characterized as:

$$X_{ZF} = H^{-1} X$$

The received signal at a remote wireless receiver may be represented as:

$$Y_{ZF} = X + W$$

As mentioned above, an "energy problem" exists in ZF systems in that the following energy-related constraint exists in such systems:

$$\mathbb{E}\|X\|^2 = N$$

$$\mathbb{E}\|X_{ZF}\|^2 = \mathbb{E}\|H^{-1}X\|^2 = \sum_{F=1}^{N}\mathbb{E}|H^{-1}(F)X(F)|^2 = \sum_{F=1}^{N}|H^{-1}(F)|^2$$

Normalization

In order to achieve the necessary normalization, the following is transmitted:

$$\lambda X_{ZF}$$

$$\lambda^2 = \frac{\mathbb{E}\|X\|^2}{\mathbb{E}\|X_{ZF}\|^2} = \frac{N}{\sum_{F=1}^{N}|H(F)^{-1}|^2} = \frac{1}{\mathcal{A}(|H^{-1}|^2)}$$

ZFP Output SNR

The ZF Pre-Coder Transmits:

$$\lambda X_{ZF} = \lambda H^{-1}X$$

and the remote wireless receiver receives:

$$\lambda X + W$$

$$SNR_{ZFP} = \frac{\lambda^2}{N_0} = \frac{1}{\mathcal{A}(|H^{-1}|^2)}\frac{1}{N_0}$$

DFE Output SNR

Using the Shami-Laroia approximation.

$$SNR_{DFE} = \left(\prod_{F=1}^{N}|H(F)|^2\right)^{1/N}\frac{1}{N_0} = \frac{1}{\mathcal{G}(|H^{-1}|^2)}\frac{1}{N_0}$$

Comparison of DFE and ZFP $$\frac{SNR_{ZFP}}{SNR_{DFE}} \le 1$$

which we know from the Arithmetic Mean-Geometric Mean (AM-GM) inequality; specifically:

$$\frac{SNR_{ZFP}}{SNR_{DFE}} = \frac{\mathcal{G}(|H^{-1}|^2)}{\mathcal{A}(|H^{-1}|^2)} \le 1$$

Figures 32A, 32B:
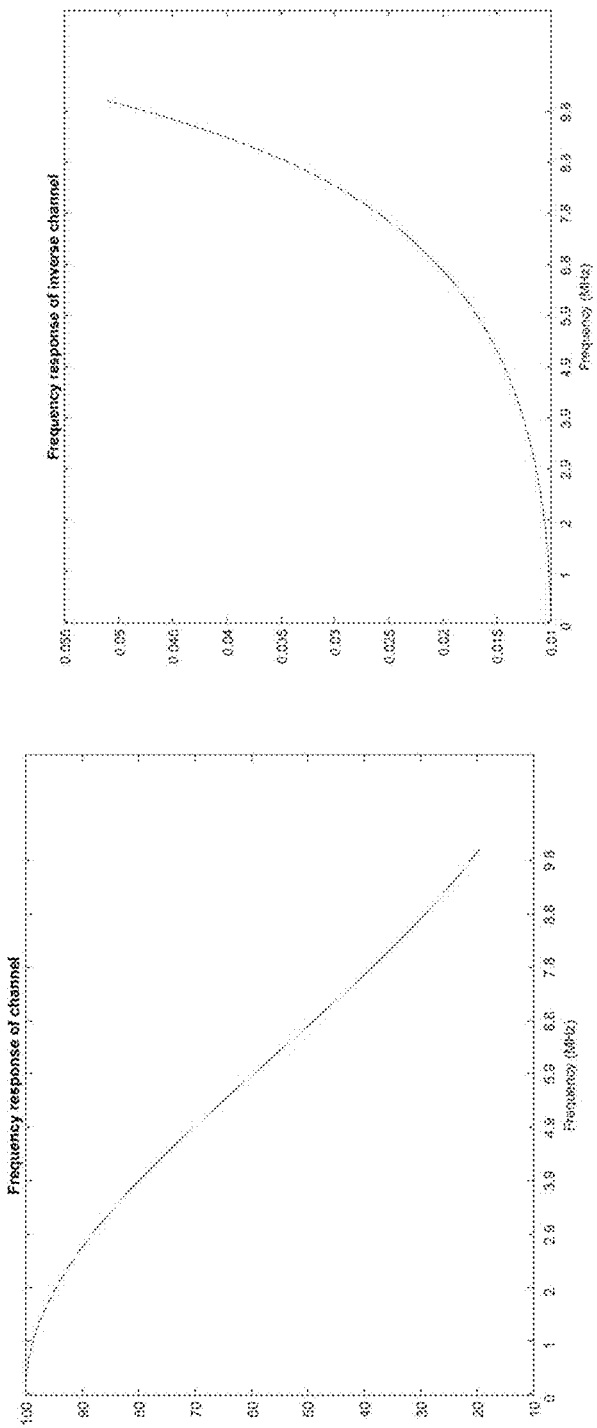
FIGS. 32A and 32B respectively illustrate the frequency response and inverse frequency response of an exemplary short channel.

Given that the AM-GM ratio may be characterized as measuring "flatness", the gap between DFE and ZFP depends on the "flatness" of the frequency response of the inverse channel, $H^{-1}$. Consider first FIGS. 32A and 32B, which respectively illustrate the frequency response and inverse frequency response of an exemplary short and relatively "flat" channel in which:

$$\frac{SNR_{ZFP}}{SNR_{DFE}} = -0.54 \text{ dB}$$

Figures 33A, 33B:
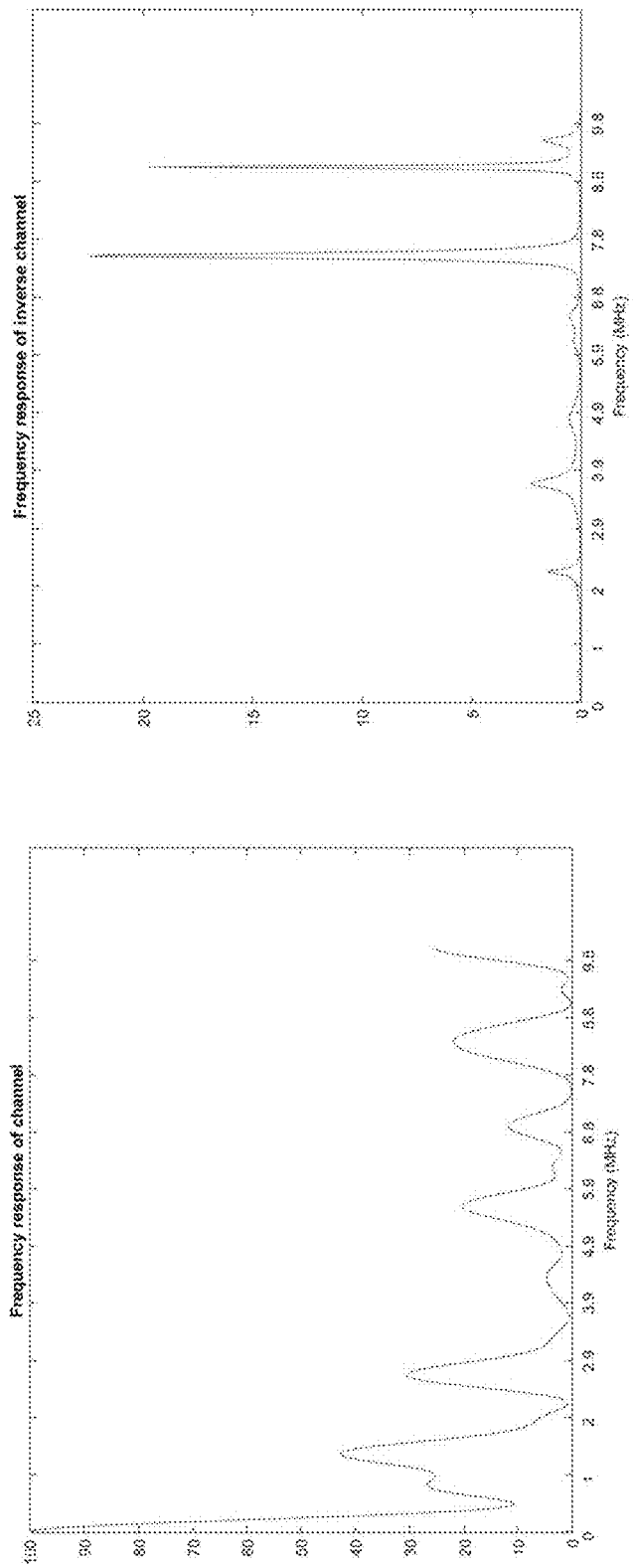
FIGS. 33A and 33B respectively illustrate the frequency response and inverse frequency response of an exemplary medium channel.

As a second example, FIGS. 33A and 33B respectively illustrate the frequency response and inverse frequency response of an exemplary medium channel in which:

$$\frac{SNR_{ZFP}}{SNR_{DFE}} = -6.0 \text{ dB}$$

Figures 34A, 34B:
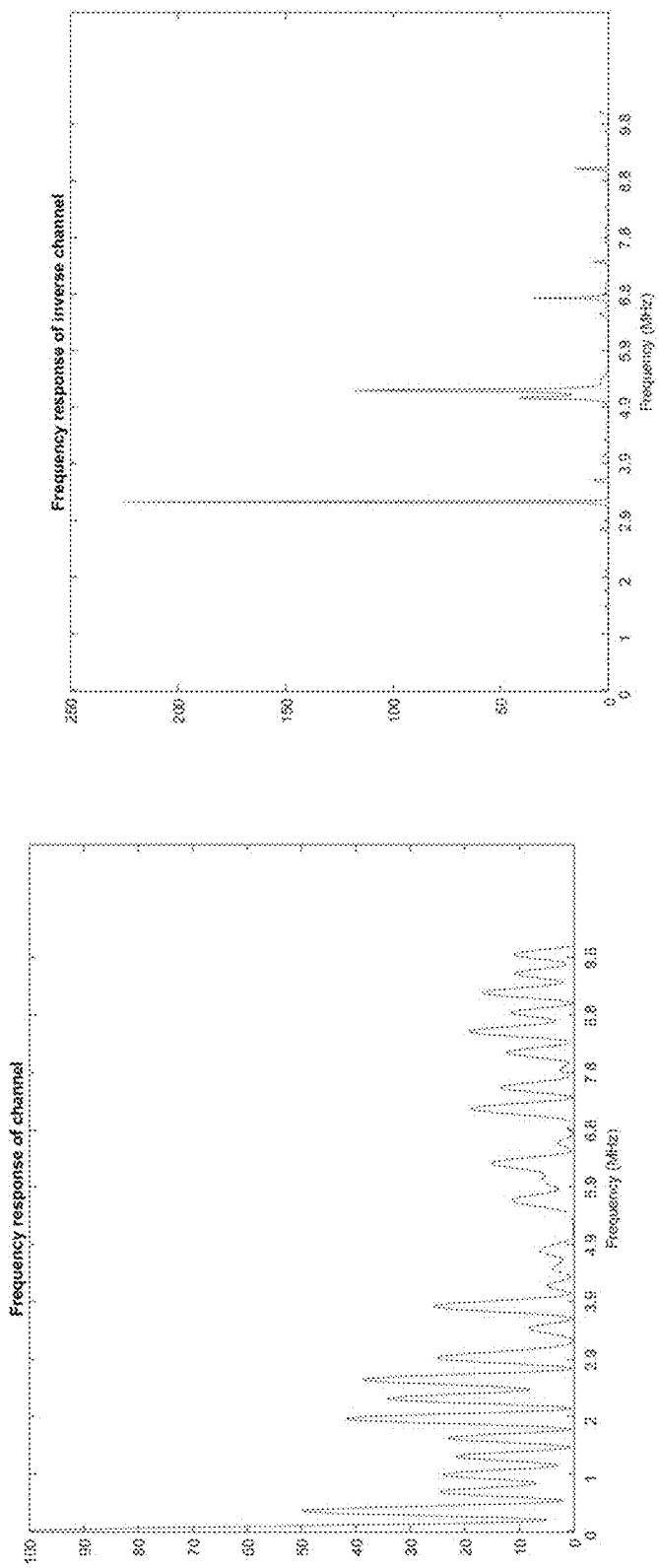
FIGS. 34A and 34B respectively illustrate the frequency response and inverse frequency response of a relatively longer channel.

Finally, FIGS. 34A and 34B respectively illustrate the frequency response and inverse frequency response of a relatively longer channel in which:

$$\frac{SNR_{ZFP}}{SNR_{DFE}} = -9.6 \text{ dB}$$

Thus, the SNR associated with ZF precoding tends to degrade as a function of channel length relative to the SNR in which DFE is employed.

Overview and Performance Characterization of Tomlinson-Harashima Pre-Coding

In contrast to ZF precoding, one drawback to the use of THP in conventional systems is that full or nearly full channel matrix feedback from the receiver to the THP-configured transmitter must occur if optimal precoding is to be achieved. This can unfortunately introduce significant overhead and reduce capacity. Moreover, one-dimensional channel estimates produced in conventional communication systems are not stationary and thus channel estimates produced by a receiver will be of only limited use to a transmitter in view of the propagation delay between the receiver and transmitter. In contrast, two-dimensional delay-Doppler OTFS channel estimates are generally stationary can be represented much more compactly than conventional channel estimates.

As noted above, a transmitter configured with a ZF pre-coder transmits:

$$h_1 x$$

In contrast, a transmitter configured with a Tomlinson-Harashima (TH) pre-coder transmits:

$$h^{-1}(x+v)$$

In this case a remote receiver receives:

$$x+v+w$$

TH Perturbation Vectors

It is desired that $\|h^{-1}(x+v)\|^2$ be small and that $X+v+w \rightarrow x$ be easily determined.

Coarse Lattice

Figure 35A:
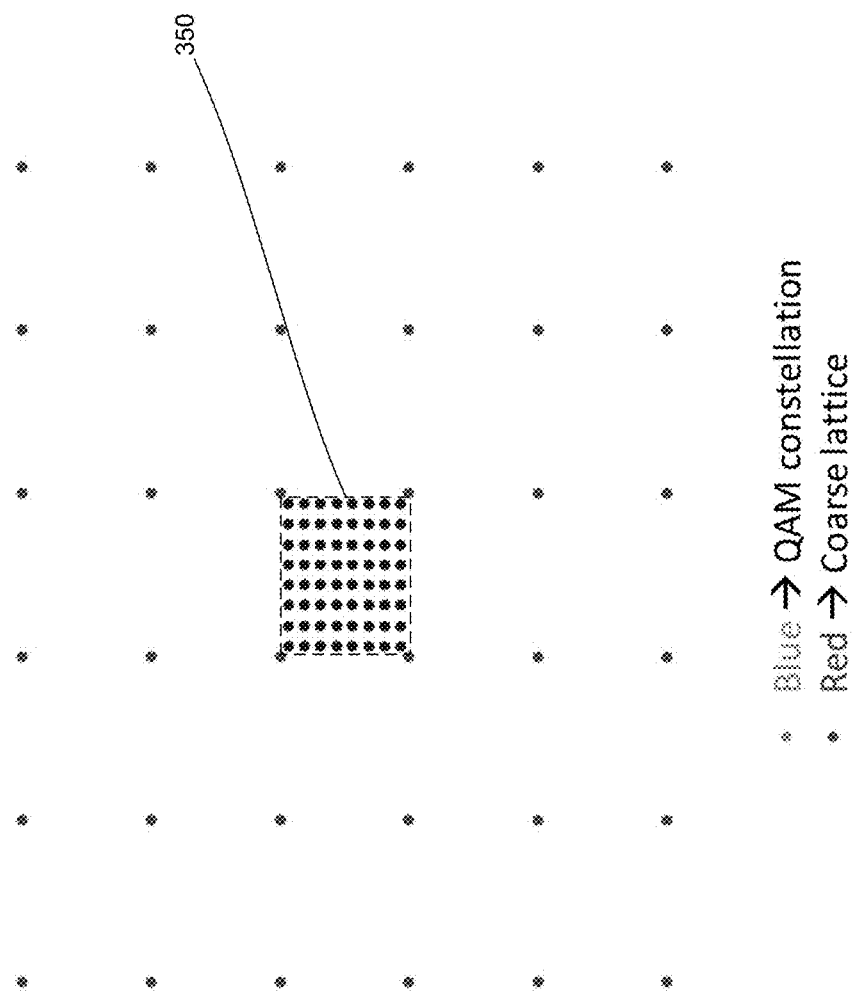
FIG. 35A depicts a QAM constellation contained in a defined area of a coarse lattice.

Referring to FIG. 35A, suppose a QAM constellation 350 is contained in a defined area $[-P, P] \times i[P,P]$ of a coarse lattice such that:

$$\Lambda_P = P\mathbb{Z}_{odd} \times iP\mathbb{Z}_{odd}$$

Coarse Perturbation Vectors

Recall x is an N dimensional vector of QAMs.

Take possible perturbation vectors to be: $\Lambda_P^N$

Decoding at the Remote Receiver

Figure 35B:
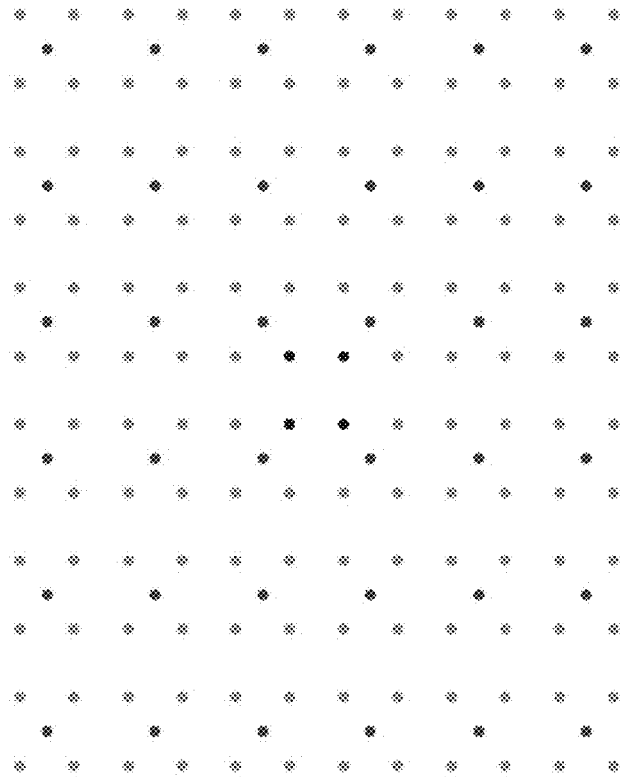
FIG. 35B illustratively represents a decoding operation at a remote receiver.

Referring to FIG. 35B, the decoding operation performed by the remote receiver may be expressed as $Z+v+w \rightarrow x$.

Encoding

Encoding at the transmitter is achieved by computing:

$$v^* = \operatorname*{argmin}_{v \in \Lambda_P^N} \|h^{-1} * (x+v)\|^2$$

$$= \operatorname*{argmin}_{v \in \Lambda_P^N} \|h^{-1} * x + h^{-1} * v\|^2$$

LDQ Decomposition $x \rightarrow h*x$, which is equivalent to:
$x \rightarrow (LDQx$, where L is unit lower triangular, D is diagonal, Q is unitary, and under the Shami-Laroia approximation: $D \approx G(|H|)I$.

Minimization Via Feedback $$v^* = \operatorname*{argmin}_{v \in \Lambda_P^N} \| h^{-1} * x + h^{-1} * v \|^2$$

$$= \operatorname*{argmin}_{v \in \Lambda_P^N} \| Q^* D^{-1} L^{-1} x + Q^* D^{-1} L^{-1} v \|^2$$

$$\approx \operatorname*{argmin}_{v \in \Lambda_P^N} \| L^{-1} x + L^{-1} v \|^2$$

Feedback Solution at Transmitter

Figure 36:
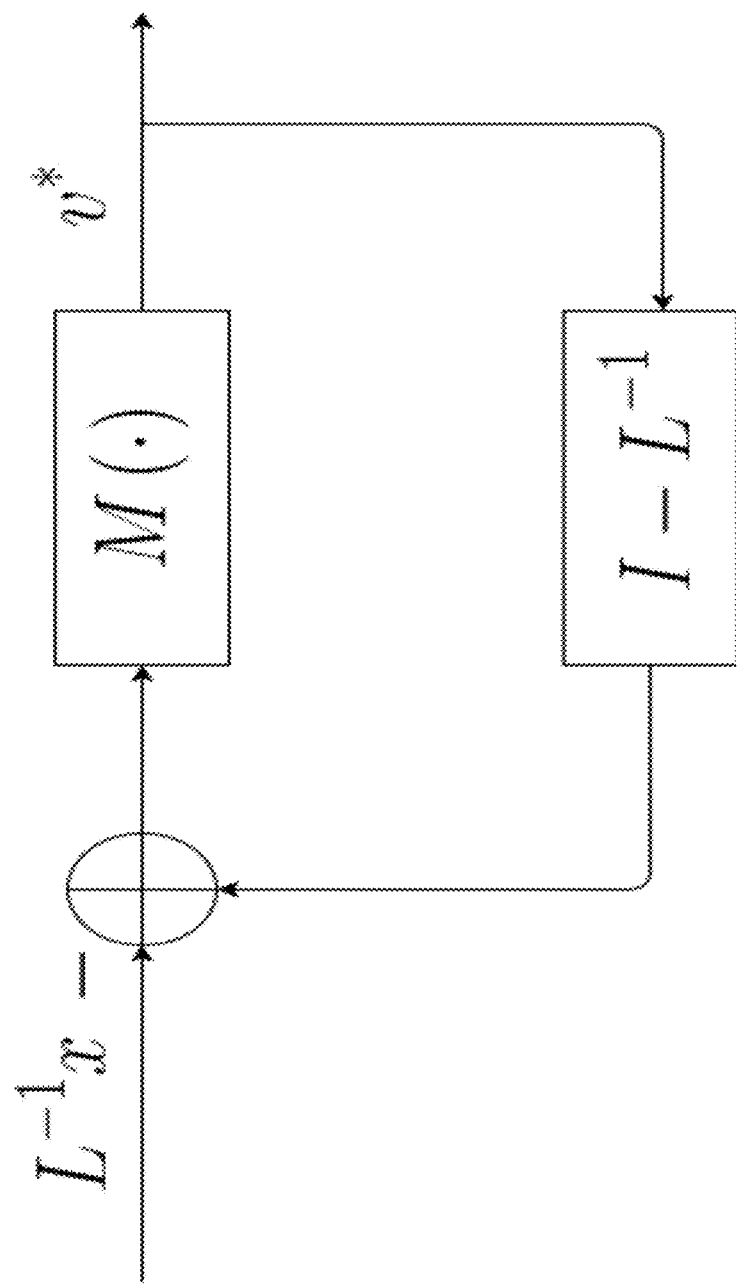
FIG. 36 is a block diagram representing a feedback operation performed at a transmitter.

Referring to FIG. 36, the feedback operation performed at the transmitter satisfies:

$$\|L^{-1}x + L^{-1}v^*\|_\infty \le P,$$

where $M(\cdot)$ denotes the module operator which rounds to the nearest odd multiple of P.

THP Energy $$\mathbb{E} \| h^{-1} * (x+v^*) \|^2 = \mathbb{E} \| Q^* D^{-1} L^{-1}(x+v^*) \|^2$$

$$\approx \mathcal{G}(|H^{-1}|^2) \mathbb{E} \| L^{-1}(x+v^*) \|^2$$

$$\approx \mathcal{G}(|H^{-1}|^2) N$$

THP Output SNR

A transmitter configured with THP is configured to transmit:

$$G(|H|)H^{-1}(X+V^*)+W.$$

A remote receiver then receives: $G(|H|)(X+V^*)+W$.

Accordingly, the SNR characterizing transmissions equalized with THP may be expressed as:

$$SNR_{THP} = \mathcal{G}(|H|^2) \frac{1}{N_0}$$

In summary, using ZFP degrades performance to an extent described by the AM/GM inequality. The use of THP moves the lattice detection problem to transmitter while still achieving the performance associated with use of a DFE in the receiver.

Adapting Tomlinson-Harashima Precoding to OTFS

In one aspect, the disclosure describes a process for employing THP within an OTFS communication system in a hybrid delay-time domain. As discussed below, in one embodiment the delay-time domain is related to the delay-Doppler domain by an FFT operation across the Doppler dimension. In operation, a TH pre-coding matrix, or pre-coder, across delay is computed for each fixed time. Horizontal FFT's may then be employed to apply the TH pre-coder to user symbols after such symbols have been perturbed by a perturbation vector.

In one embodiment Tomlinson-Harashima precoding may implemented in an OTFS transceiver similar to, for example, the OTFS transceiver 1000 of FIG. 10. In this embodiment the pre-equalizer 1010 may include a Tomlinson-Harashima precoder of the type described hereinafter.

NOTATIONS AND EQUATIONS

Channel equation in delay Doppler domain: $Y=h*x+w$
x a vector of QAMs
Average QAM energy: 1
Delay dimension: $N_v$
Doppler dimension: $N_h$
Variance of noise: $N_0$
ZF Solution
Channel equation in frequency domain: $Y=HX+W$
Transmitter transmits: $X_{ZF}=H^{-1}X$
Receiver receives: $Y_{ZF}=X+W$ Perturbation Vector To lower transmission energy use same technique as was described above with respect to the example involving single-carrier (SC) modulation, i.e., use a coarse perturbation vector. In this case the transmitter transmits $H^{-1}(X+V^*)$, where $$v^* = \operatorname*{argmin}_{v \in \Lambda_P^{NM}} \| h^{-1} * (x+v) \|^2 .$$

Hybrid Delay-Time Domain

In one embodiment THP is performed in a hybrid delay-time domain related to the delay-Doppler domain through an FFT taken across the Doppler dimension:

$$\text{delay-Doppler} \xrightarrow{FFT_{N_h}} \text{delay-time}$$

$$\text{delay-Doppler} \xleftarrow{IFFT_{N_h}} \text{delay-time}$$

Let f denote a function in delay-Doppler domain, donate the same function in the delay-time domain by $\tilde{f}$:

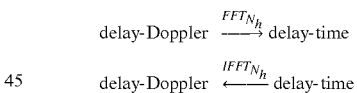

Hybrid Channel Action

In the hybrid delay-time domain, the action of the channel on transmitted signals may be characterized by convolution across delay and multiplication across time. In particular, suppose $\tilde{g}=FFT_{N_h}(h*f)$, then:

$$\tilde{g}(\tau,T)=[\tilde{h}(\cdot,T)*\tilde{f}(\cdot,T)](\tau)$$

for all $\tau=1, 2, \ldots, N_v$ and $T=1, 2, \ldots, N_h$.

Perturbation Vector in Hybrid Domain

Consider the objection function used to find the optimal perturbation vector in the hybrid domain:

$$\| h^{-1} * (x+v) \|^2 = \| FFT_{N_h}(h^{-1} * (x+v)) \|^2$$

-continued $$= \sum_{T=1}^{N_h} \|\tilde{h}^{-1}(\cdot, T) * (\tilde{x}(\cdot, T) + \tilde{v}(\cdot, T))\|^2$$

LDQ Decomposition $$\tilde{j}(\cdot,T) \rightarrow \tilde{h}(\cdot,T) * \tilde{j}(\cdot,T),$$

which is equivalent to:

$$\tilde{j}(\cdot,T) \rightarrow L_T D_T Q_T \tilde{j}(\cdot,T).$$

where $L_T$ is unit lower triangular, $D_T$ is diagonal, $Q_T$ is unitary, and under the Shami-Laroia approximation: $D_T \approx G(|H(\cdot, T)|)I$.

Minimization Via Feedback $$v^* = \underset{v \in \Lambda_P^{NM}}{\operatorname{argmin}} \sum_{T=1}^{N_h} \|\tilde{h}^{-1}(\cdot, T) * \tilde{x}(\cdot, T) + \tilde{h}^{-1}(\cdot, T) * \tilde{v}(\cdot, T)\|^2$$

$$= \underset{v \in \Lambda_P^{NM}}{\operatorname{argmin}} \sum_{T=1}^{N_h} \|Q_T^* D_T^{-1} L_T^{-1} \tilde{x}(\cdot, T) + Q_T^* D_T^{-1} L_T^{-1} \tilde{v}(\cdot, T)\|^2$$

$$\approx \underset{v \in \Lambda_P^{NM}}{\operatorname{argmin}} \sum_{T=1}^{N_h} \|L_T^{-1} \tilde{x}(\cdot, T) + L_T^{-1} \tilde{v}(\cdot, T)\|^2$$

Feedback Filter

Figure 37:
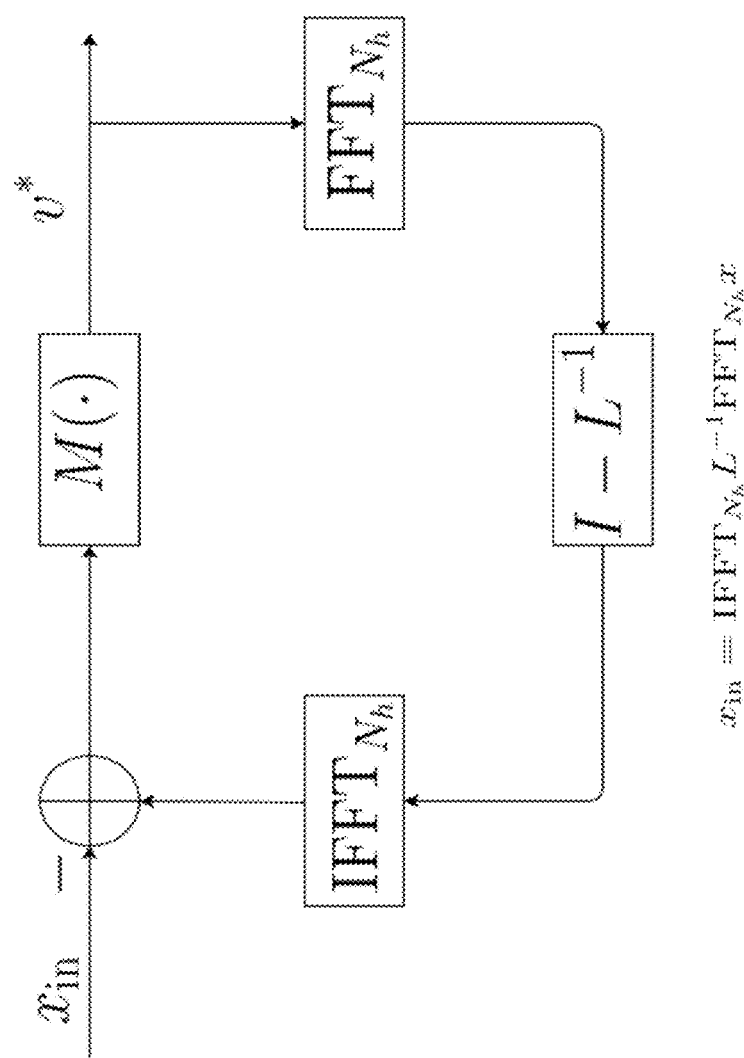
FIG. 37 is a block diagram of an exemplary filter.

In an exemplary embodiment, filters $L_T^{-1}$ defined at each time are used to define a single filter denoted $L^{-1}$ with:

$$(L^{-1}\tilde{j})(\cdot,T) = L_T^{-1}\tilde{j}(\cdot,T)$$

for all $T=1, 2, \ldots, N_h$. An exemplary filter block diagram is depicted in FIG. 37.

In summary, the disclosure includes descriptions of embodiments of equalization techniques for OTFS systems. These embodiments include performing Tomlinson-Harashima precoding of OTFS symbols in a hybrid delay-time domain. In one embodiment, a Tomlinson-Harashima precoder is computed across delay for each fixed time. The resulting Tomlinson-Harashima pre-coders are then applied using horizontal FFTs.

Bit Loading Using 2D Channel Estimation

In one embodiment the disclosure pertains to a method which includes estimating a two-dimensional model of a communication channel wherein the two-dimensional model of the communication channel is a function of time delay and frequency shift. The method further includes selecting, based upon the two-dimensional model of the communication channel, a set of OFDM subcarriers included within a plurality of available OFDM subcarriers. The selected OFDM subcarriers are then adaptively modulated based upon a stream of input data.

Spreading and Extracting Geometric Mean

In conventional OFDM systems such as LTE, subcarriers tend to be congregated into resource blocks which collectively occupy a very limited bandwidth. In one aspect an OFDM system is modified to instead use widely separated tones. This is motivated by a desire to obtain a relatively even error pattern, statistics, and distribution with respect to the forward error correction function. This enables the FEC to perform relatively well. Conversely, in cases in which error distribution is uneven, there is increased sensitivity to specific channels, Doppler conditions, and other factors. Stated differently, a sparser and evenly distributed grid may be used so that the error pattern, and the distribution of errors, may follow the diversity in the channel.

Accordingly, in one aspect the disclosure pertains to a method which includes estimating a two-dimensional model of a communication channel wherein the two-dimensional model of the communication channel is a function of time delay and frequency shift. The method further includes selecting randomly or pseudo randomly a set of OFDM subcarriers within a plurality of available OFDM subcarriers based on a desired distribution. The selected OFDM subcarriers are then modulated based upon a stream of input data.

Successive Interference Cancellation

In another aspect the disclosure pertains to a communication device including an antenna and a receiver configured to:

receive, from the antenna, a plurality of pilot signals associated with respective locations in a time-frequency plane wherein the plurality of pilot signals were transmitted from a corresponding plurality of transmit antenna elements;

receive signal energy transmitted by the plurality of transmit antenna elements; measure, based upon the plurality of pilot signals, a plurality of two-dimensional time-frequency coupling channels between the plurality of transmit antenna elements and the antenna; and perform, with respect to the signal energy, successive interference cancellation based upon the plurality of two-dimensional time-frequency coupling channels.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for signal transmission using precoded symbol information, the method comprising:
    estimating a two-dimensional model of a communication channel in a delay-Doppler domain wherein the two-dimensional model of the communication channel is a function of time delay and frequency shift;
    determining a perturbation vector in a delay-time domain wherein the delay-time domain is related to the delay-Doppler domain by an FFT operation;
    modifying user symbols based upon the perturbation vector so as to produce perturbed user symbols;
    determining, using a delay-time model of the communication channel, a set of Tomlinson-Harashima precoders corresponding to a set of fixed times in the delay-time domain;
    generating precoded user symbols by applying the Tomlinson-Harashima precoders to the perturbed user symbols; and
    providing, based upon the precoded user symbols, a modulated signal for transmission over the communication channel.

2. The method of claim 1 wherein the applying includes using FFT operations to apply the Tomlinson-Harashima precoders to the perturbed user symbols.

3. The method of claim 1 wherein the determining a set of Tomlinson-Harashima precoders includes performing a decomposition of the delay-time model of the communication channel.

4. The method of claim 3 in which the decomposition comprises an LQD decomposition where L is a lower triangular matrix, D is a diagonal matrix, and Q is a unitary matrix.

5. The method of claim 1 wherein the estimating the two-dimensional model of the communication channel includes:
    receiving at least a first pilot signal wherein the first pilot signal occupies a first predetermined coordinate position in a time-frequency plane,
    determining a first time shift of the first pilot signal and a first frequency shift of the first pilot signal.

6. A communication apparatus, comprising:
    a plurality of antennas;
    a processor configured to:
        estimate a two-dimensional model of a communication channel in a delay-Doppler domain wherein the two-dimensional model of the communication channel is a function of time delay and frequency shift;
        determine a perturbation vector in a delay-time domain wherein the delay-time domain is related to the delay-Doppler domain by an FFT operation;
        modify user symbols based upon the perturbation vector so as to produce perturbed user symbols;
        determine, using a delay-time model of the communication channel, a set of Tomlinson-Harashima precoders corresponding to a set of fixed times in the delay-time domain;
        generate precoded user symbols by applying the Tomlinson-Harashima precoders to the perturbed user symbols; and
    a transmitter configured to provide, based upon the precoded user symbols, a modulated signal to the plurality of antennas for transmission over the communication channel.

7. The communication apparatus of claim 6 wherein the processor is further configured to use FFT operations to apply the Tomlinson-Harashima precoders to the perturbed user symbols.

8. The communication apparatus of claim 6 wherein the processor is further configured to determine the set of Tomlinson-Harashima precoders by performing a decomposition of the delay-time model of the communication channel.

9. The communication apparatus of claim 8 where the decomposition comprises an LQD decomposition where L is a lower triangular matrix, D is a diagonal matrix, and Q is a unitary matrix.

10. The communication apparatus of claim 6 wherein the processor, as part of estimating the two-dimensional model of the communication channel, is further configured to:
    receive at least a first pilot signal wherein the first pilot signal occupies a first predetermined coordinate position in a time-frequency plane, and
    determine a first time shift of the first pilot signal and a first frequency shift of the first pilot signal.

* * * * *